US008620759B1

(12) United States Patent
Virgilio et al.

(10) Patent No.: US 8,620,759 B1
(45) Date of Patent: Dec. 31, 2013

(54) METHODS AND SYSTEMS FOR PROCESSING ORDERS

(75) Inventors: Joseph Virgilio, Pound Ridge, NY (US); Craig Viani, Easton, CT (US)

(73) Assignee: ConvergEx Group, LLC, New York, NY (US)

( * ) Notice: Subject to any disclaimer, the term of this patent is extended or adjusted under 35 U.S.C. 154(b) by 930 days.

(21) Appl. No.: 12/126,754

(22) Filed: May 23, 2008

Related U.S. Application Data

(60) Provisional application No. 60/931,328, filed on May 23, 2007.

(51) Int. Cl.
*G06Q 30/00* (2012.01)

(52) U.S. Cl.
USPC .......................................................... 705/26.1

(58) Field of Classification Search
USPC .................................... 705/26, 26.1, 27, 27.1
See application file for complete search history.

(56) References Cited

U.S. PATENT DOCUMENTS 4,674,044 A 6/1987 Kalmus et al.
5,038,284 A 8/1991 Kramer
5,077,665 A 12/1991 Silverman et al.
5,101,353 A 3/1992 Lupien et al.
5,136,501 A 8/1992 Silverman et al.
5,168,446 A 12/1992 Wiseman
5,270,922 A 12/1993 Higgins
5,297,031 A 3/1994 Gutterman et al.
5,297,032 A 3/1994 Trojan et al.
5,305,200 A 4/1994 Hartheimer et al.
5,375,055 A 12/1994 Togher et al.
5,463,547 A 10/1995 Markowitz
5,689,652 A 11/1997 Lupien et al.
5,724,524 A 3/1998 Hunt et al.
5,727,165 A 3/1998 Ordish et al.
5,758,328 A 5/1998 Giovannoli
5,774,877 A 6/1998 Patterson, Jr. et al.
5,793,301 A 8/1998 Patterson, Jr. et al.
5,809,483 A 9/1998 Broka et al.
5,873,071 A 2/1999 Ferstenberg et al.
5,884,286 A 3/1999 Daughtery, III
5,915,245 A 6/1999 Patterson, Jr. et al.
5,950,176 A 9/1999 Keiser et al.
6,016,483 A 1/2000 Rickard et al.

(Continued)

FOREIGN PATENT DOCUMENTS

BE 902761 10/1985
DK 0625275 10/1997

(Continued)

OTHER PUBLICATIONS

Anonymous, " NASDAQ Launches the OptiMark Trading System," PR Newswire, Oct. 11, 1999, p. 1.*

(Continued)

*Primary Examiner* — Brandy A Zukanovich
(74) *Attorney, Agent, or Firm* — Byrne Poh LLP

(57) ABSTRACT

Methods and systems for processing orders are provided. In some embodiments, methods for processing orders are provided, the methods comprising: receiving a user selection of a routing style; receiving a user selection of a post destination; routing at least a portion of an order according to the routing style; and posting at least a portion of the order at the posting destination selected by the user.

40 Claims, 45 Drawing Sheets

(56) References Cited

U.S. PATENT DOCUMENTS 6,061,663 A 5/2000 Bloom
6,195,647 B1 2/2001 Martyn
6,321,212 B1 11/2001 Lange
6,360,246 B1 3/2002 Begley
6,377,940 B2 4/2002 Tilfors et al.
6,405,180 B2 6/2002 Tilfors
6,493,682 B1 12/2002 Horrigan et al.
6,539,362 B1 3/2003 Patterson, Jr. et al.
6,618,707 B1 9/2003 Katz
6,766,304 B2 7/2004 Kemp, II et al.
6,772,132 B1 8/2004 Kemp, II et al.
6,938,011 B1 8/2005 Kemp, II et al.
6,941,280 B1 9/2005 Gastineau
6,968,318 B1 11/2005 Ferstenberg et al.
6,993,504 B1 1/2006 Friesen et al.
7,035,819 B1 4/2006 Gianakouros et al.
7,082,398 B1 7/2006 Apple
7,082,410 B1 7/2006 Anaya
7,099,838 B1 8/2006 Gastineau et al.
7,103,565 B1 9/2006 Vaid
7,136,834 B1 11/2006 Merrin
7,181,424 B1 2/2007 Ketchum
7,209,896 B1 4/2007 Serkin
7,212,999 B2 5/2007 Friesen et al.
7,222,096 B2 5/2007 Anaya
7,246,092 B1 7/2007 Peterson
7,246,093 B1 7/2007 Katz
7,249,091 B2 7/2007 Kinney
7,315,840 B1 1/2008 Keith
7,356,498 B2 4/2008 Kaminsky et al.
7,356,500 B1 4/2008 Waelbroeck et al.
7,392,218 B2 6/2008 Saliba
7,406,444 B2 7/2008 Eng
7,430,533 B1 9/2008 Cushing
7,454,372 B1 11/2008 Anaya
7,487,125 B2 2/2009 Littlewood
7,533,052 B2 5/2009 Tilfors
7,539,636 B2 5/2009 Madhavan et al.
7,565,313 B2 7/2009 Waelbroeck et al.
7,599,875 B1 10/2009 Ketchum
7,606,759 B2 10/2009 Swanson et al.
7,613,647 B1 11/2009 Cushing et al.
7,617,150 B2 11/2009 Littlewood
7,716,119 B2 5/2010 Cha
7,739,188 B2 6/2010 Littlewood
7,747,512 B2 6/2010 Gastineau et al.
7,747,515 B1 6/2010 Merrin
7,756,772 B1 7/2010 Konopnicki et al.
7,769,668 B2 8/2010 Balabon
7,774,263 B1 8/2010 Wunsch et al.
7,778,842 B2 8/2010 Apple
7,801,795 B2 9/2010 Nunes
7,809,629 B2 10/2010 Hustad et al.
7,814,001 B2 10/2010 Weber
7,818,236 B2 10/2010 Hansen et al.
7,822,672 B2 10/2010 Hausman
7,822,678 B2 10/2010 Weber et al.
7,870,056 B2 1/2011 Ketchum
7,885,882 B1 2/2011 Brander
7,912,779 B2 3/2011 Saliba
7,917,429 B2 3/2011 Weber
7,970,687 B2 6/2011 Gastineau et al.
7,974,906 B2 7/2011 Madhavan et al.
7,980,457 B2 7/2011 Kaminsky et al.
7,983,982 B2 7/2011 Cushing et al.
8,005,745 B1 8/2011 Cleaves et al.
8,024,258 B2 9/2011 Gastineau
8,027,911 B2 9/2011 Weber
8,046,290 B2 10/2011 Fitzpatrick et al.
8,055,577 B2 11/2011 Saliba
8,082,204 B2 12/2011 Mittal et al.
8,117,109 B2 2/2012 Lutnick et al.
8,140,416 B2 3/2012 Borkovec et al.
8,229,834 B2 7/2012 Borkovec et al.
8,359,260 B2 1/2013 Merrin et al.
2001/0003179 A1 6/2001 Martyn
2002/0007335 A1 1/2002 Millard et al.
2002/0010672 A1 1/2002 Waelbroeck et al.
2002/0023037 A1 2/2002 White, Jr.
2002/0052827 A1 5/2002 Waelbroeck et al.
2002/0073016 A1 6/2002 Furbush
2002/0091621 A1 7/2002 Conklin et al.
2002/0099645 A1 7/2002 Agarwal et al.
2002/0103732 A1* 8/2002 Bundy et al. .................... 705/35
2002/0133449 A1 9/2002 Segal
2002/0138299 A1 9/2002 Nations
2002/0161687 A1 10/2002 Serkin
2002/0178104 A1 11/2002 Hausman
2002/0184136 A1 12/2002 Cleary Neubert et al.
2002/0194115 A1 12/2002 Nordlicht et al.
2003/0004853 A1 1/2003 Ram et al.
2003/0004859 A1 1/2003 Shaw et al.
2003/0023542 A1 1/2003 Kemp, II et al.
2003/0040955 A1 2/2003 Anaya
2003/0046035 A1 3/2003 Anaya
2003/0050888 A1 3/2003 Satow
2003/0055768 A1 3/2003 Anaya
2003/0055776 A1 3/2003 Samuelson
2003/0083972 A1 5/2003 Williams
2003/0093343 A1 5/2003 Huttenlocher
2003/0163404 A1 8/2003 Hu et al.
2003/0177086 A1 9/2003 Gomber
2003/0177126 A1 9/2003 Weingard et al.
2004/0024690 A1 2/2004 Satow
2004/0024691 A1 2/2004 Satow
2004/0030634 A1 2/2004 Satow
2004/0034591 A1 2/2004 Waelbroeck et al.
2004/0111356 A1 6/2004 Srivastava et al.
2004/0143542 A1 7/2004 Magill et al.
2004/0177024 A1* 9/2004 Bok et al. ........................ 705/37
2004/0186803 A1 9/2004 Weber
2005/0055304 A1 3/2005 Lutnick et al.
2005/0055305 A1 3/2005 Lutnick et al.
2005/0080698 A1 4/2005 Perg et al.
2005/0097027 A1 5/2005 Kavanaugh
2005/0192888 A1 9/2005 Lennane et al.
2005/0267829 A1 12/2005 Ferstenberg et al.
2005/0283426 A1 12/2005 Krishnasami et al.
2006/0026090 A1 2/2006 Balabon
2006/0031157 A1 2/2006 Gianakouros et al.
2006/0036533 A1 2/2006 Frankel et al.
2006/0055304 A1 3/2006 Kang et al.
2006/0055305 A1 3/2006 Funahashi et al.
2006/0136326 A1 6/2006 Heckman et al.
2006/0173773 A1 8/2006 Ettinger, Jr.
2006/0224491 A1 10/2006 Pinkava
2006/0224492 A1 10/2006 Pinkava
2006/0224493 A1 10/2006 Pinkava
2006/0224494 A1 10/2006 Pinkava
2006/0253379 A1 11/2006 Adcock et al.
2006/0265309 A1 11/2006 Sweeting et al.
2006/0271475 A1 11/2006 Brumfield et al.
2006/0277136 A1 12/2006 O'Connor et al.
2006/0282356 A1 12/2006 Andres et al.
2007/0083456 A1 4/2007 Akers
2008/0040290 A1 2/2008 Harris
2008/0052221 A1 2/2008 Ferstenberg et al.
2008/0052222 A1 2/2008 Ferstenberg et al.
2008/0059359 A1 3/2008 Ferstenberg et al.
2008/0071666 A1 3/2008 Ferstenberg et al.
2008/0071693 A1 3/2008 Ferstenberg et al.
2008/0097893 A1 4/2008 Walsky et al.
2008/0168370 A1 7/2008 Maher et al.
2008/0275808 A1 11/2008 Mackay
2008/0288390 A1 11/2008 Maynard
2008/0301036 A1 12/2008 Schlifstein et al.
2008/0306856 A1 12/2008 Aloe et al.
2009/0006236 A1 1/2009 Fitzpatrick et al.
2009/0024512 A1 1/2009 Reid
2009/0083175 A1 3/2009 Cushing
2009/0089202 A1 4/2009 Rowley
2009/0112775 A1 4/2009 Chiulli et al.
2009/0144187 A1 6/2009 Borkovec et al.
2009/0194115 A1 8/2009 Squitieri

(56) References Cited

U.S. PATENT DOCUMENTS

| | | | |
|---|---|---|---|
| 2009/0299889 A1 | 12/2009 | Madhavan et al. |
| 2009/0327117 A1 | 12/2009 | Lee et al. |
| 2010/0076887 A1 | 3/2010 | Cushing |
| 2010/0121753 A1 | 5/2010 | Harris et al. |
| 2011/0125627 A1 | 5/2011 | Claus et al. |
| 2011/0246351 A1 | 10/2011 | Sulavka |
| 2011/0302073 A1 | 12/2011 | Saliba |
| 2012/0011055 A1 | 1/2012 | Fitzpatrick et al. |
| 2012/0233055 A1 | 9/2012 | Saliba |

FOREIGN PATENT DOCUMENTS

| | | |
|---|---|---|
| EP | 0401203 | 5/1990 |
| EP | 0411748 | 2/1991 |
| EP | 0434224 | 6/1991 |
| EP | 0752135 | 1/1997 |
| EP | 1081614 | 7/2001 |
| EP | 1319211 | 6/2003 |
| EP | 1321870 | 6/2003 |
| EP | 1870851 | 12/2007 |
| EP | 2000971 | 10/2008 |
| EP | 2278547 | 1/2011 |
| NO | 974926 | 12/1997 |
| NO | 991346 | 5/1999 |
| NO | 20012875 | 8/2001 |
| NO | 20060090 | 8/2001 |
| WO | WO/94/28496 | 12/1994 |
| WO | WO/96/05566 | 2/1996 |
| WO | WO/96/18160 | 6/1996 |
| WO | WO/96/34357 | 10/1996 |
| WO | WO/97/30407 | 8/1997 |
| WO | WO/98/12659 | 3/1998 |
| WO | WO/98/21667 | 5/1998 |
| WO | WO/98/26363 | 6/1998 |
| WO | WO/98/52133 | 11/1998 |
| WO | WO/99/27477 | 6/1999 |
| WO | WO/00/11587 | 3/2000 |
| WO | WO/00/51043 | 8/2000 |
| WO | WO/01/13196 | 2/2001 |
| WO | WO/01/50317 | 7/2001 |
| WO | WO/01/50378 | 7/2001 |
| WO | WO/01/52166 | 7/2001 |
| WO | WO/02/37380 | 5/2002 |
| WO | WO/03/007122 | 1/2003 |
| WO | WO/2004/097553 | 11/2004 |
| WO | WO/2004/104791 | 12/2004 |
| WO | WO/2005/098710 | 10/2005 |
| WO | WO/2006/047712 | 5/2006 |
| WO | WO/2007/149378 | 12/2007 |
| WO | WO/2008/109141 | 9/2008 |
| WO | WO/2008/153909 | 12/2008 |
| WO | WO/2010/077376 | 7/2010 |

OTHER PUBLICATIONS

"Divided SEC Adopts Regulation NMS," Dechert On Point, Dechert LLP, Issue 15, Sep. 2005.
DEx Newsletter, BNY Brokerage, VII, QII, 2005.
"Holistic Execution Platform": The Future of DMA Technology, TraderForum Buyside Electronic Trading Workshop, BNY Brokerage, Jul. 19-20, 2005.
International Patent Application No. PCT/US2008/054188, filed Feb. 16, 2008.
International Patent Application No. PCT/US2008/0641299, filed May 21, 2008.
U.S. Appl. No. 09/569,135, filed May 11, 2000.
U.S. Appl. No. 09/570,562, filed May 12, 2000.
U.S. Appl. No. 16/032,535, flied Jan. 21, 2002.
U.S. Appl. No. 11/759,830, filed Jun. 17, 2007.
U.S. Appl. No. 12/013,169, flied Jan. 11, 2008.
U.S. Appl. No. 12/032,682, filed Feb. 17, 2008.
U.S. Appl. No. 12/761,143, flied Apr. 15, 2010.
U.S. Appl. No. 12/951,834, filed Nov. 22, 2010.
U.S. Appl. No. 12/983,697, filed Jan. 3, 2011.
U.S. Appl. No. 13/016,853, filed Jan. 28, 2011.
U.S. Appl. No. 13/418,100, filed Mar. 12, 2012.
U.S. Appl. No. 60/880,319, filed Jan. 12, 2007.
U.S. Appl. No. 60/113,655, filed on May 11, 1999.
U.S. Appl. No. 60/134,207, filed on May 14, 1999.
U.S. Appl. No. 60/334,163, filed on Nov. 23, 2001.
U.S. Appl. No. 60/336,775, filed on Dec. 5, 2001.
U.S. Appl. No. 60/400,467, filed on Aug. 1, 2002.
U.S. Appl. No. 60/667,876, filed Apr. 1, 2005.
U.S. Appl. No. 60/901,919, filed Feb. 16, 2007.
U.S. Appl. No. 60/931,328, filed May 23, 2007.
U.S. Appl. No. 61/291,958, filed Jan. 1, 2010.
U.S. Appl. No. 61/451,809, filed Mar. 11, 2011.
"A Smart Light in the Dark for Buy-Side and Sell-Side Traders", In Algos 3.0: Developments in Algorithmic Trading, Traders Magazine, Nov. 20, 2007.
"Dark Algorithms Directory", Advanced Trading, Aug. 7, 2010, available at http://advancedtrading.thewallstreetwiki.com/directories/directory-dark-algorithms.php.
"Dark Liquidity Seeking Algorithms, Barclays Capital", The Trade, No. 23, 2010, available at: http://www.thetradenews.com/GuidesCompany.aspx?id=7057.
"Dark Liquidity Seeking Algorithms, Wells Fargo", The Trade, No. 29, 2011, available at: http://www.thetradenews.com/GuidesCompany.aspx?id=7471.
Abstract for: "Margin Loans for IPOs Likely", Bangkok Post, Nov. 13, 2001.
Abstract for: "Strategies for Success and Profitability", Global Investor, pp. 1, Oct. 2006.
Abstract for: "The IPO Boom: Selling a Small Number of Shares Shows Some Big Successes . . . ", Wall Street Journal, col. 3, sec. C, Aug. 9, 1993, p. 1.
Abstract for: Gresse, C., "The Effect of Crossing-Network Trading on Dealer Market's Bid-Ask Spreads", in European Financial Management, vol. 12, No. 2, 2006, pp. 143-60.
Abstract for: Hintze, J., "Pondering What's Next: As NYSE Transitiosn to a Hybrid Model, Floor Traders and Specialists Reevaluate Their Roles", Investment Dealers' Digest, Apr. 16, 2007.
Abstract for: Menon, R., "Balance of Trade [Trading Automation]", Banking Techonolgoy, vol. 20, No. 9, Nov. 2004, pp. 42-4.
Almgren, R. and Chriss, N., "Optimal Execution of Portfolio Transactions", in Journal of Risk, vol. 3, No. 2, Winter 2000/2001, pp. 5-39.
Almgren, R., et al. "Direct Estimation of Equity Market Impact", Technical Report, May 10, 2005.
Balarkas, R. and Ewen, G., "Algorithms to Help you Trade Aggressively", Algorithmic Trading, Second Edition, 2007, pp. 1-10.
Balarkas, R., "Every Trader Needs an Algorithm", Automated Trader Magazine, issue Oct. 3, 2006, available at http://www.automatedtrader.net/articles/sponsored-articles/980/every-trader-needs-an-algorithm.
Balvers, R.J. and Mitchell, D.W., "Autocorrelated Returns and Optimal Intertemporal Portfolio Choice", in Managment Science, vol. 43, No. 11, Nov. 1997, pp. 1537-1551.
BNY Brokerage, "Introducing DEx", White Paper, 2004.
BNY ConvergEx Group, "ConvergEx Launches New 101 Trade Messenger Technology", Press Release, Mar. 2, 2010.
International Preliminary Report on Patentability in International Patent Application No. PCT/US2008/054188, filed Feb. 16, 2007, issued Aug. 19, 2009.
International Preliminary Report on Patentability in International Patent Application No. PCT/US2008/064299, filed May 21, 2008, issued Dec. 7, 2009.
International Search Report in International Patent Application No. PCT/US2008/054188, filed Feb. 16, 2007, mailed Jun. 5, 2008.
International Search Report in International Patent Application No. PCT/US2008/064299, filed May 21, 2008, mailed Jul. 28, 2008.
Kaur, S., "OSK-UOB Sees Good Response to 'First of its Kind' Fund", Business Times (Malaysia), Jan. 25, 2007, available at: http://www.accessmylibrary.com/article-1G1-158375204/osk-uob-sees-good.html.

(56) References Cited

OTHER PUBLICATIONS

Konstance, M., "Goldman Sachs Alogrithmic Trading: Insight and Outlook", In Algos 3.0: Developments in Algorithmic Trading, Traders Magazine, Nov. 20, 2007.
Office Action dated Jan. 17, 2013 in U.S. Appl. No. 12/032,682.
Office Action dated Oct. 19, 2012 in U.S. Appl. No. 13/016,853.
Office Action dated Oct. 5, 2012 in U.S. Appl. No. 12/983,697.
Office Action dated Dec. 17, 2012 in U.S. Appl. No. 12/761,143.
Office Action dated Feb. 27, 2012 in U.S. Appl. No. 13/016,853.
Office Action dated Feb. 29, 2012 in U.S. Appl. No. 12/983,697.
Office Action dated Mar. 19, 2010 in U.S. Appl. No. 12/013,169.
Office Action dated Apr. 17, 2012 in U.S. Appl. No. 12/951,834.
Office Action dated May 10, 2011 in U.S. Appl. No. 12/013,169.
Office Action dated May 3, 2012 in U.S. Appl. No. 12/761,143.
Office Action dated Jun. 24, 2011 in U.S. Appl. No. 12/951,834.
Office Action dated Jul. 8, 2010 in U.S. Appl. No. 12/032,682.
Office Action dated Aug. 18, 2011 in U.S. Appl. No. 12/032,682.
Office Action dated Aug. 30, 2010 in U.S. Appl. No. 12/013,169.
Rafalaf, A., "Order Management Vendors, like MacGregor and Decalog, Build 'Intelligent' Links to ATS", Wall Street & Technology, Oct. 25, 1999, available at: http://www.wallstreetandtech.com/electronic-trading/order-management-vendors-like-macgregor/14705081.
Rakita, I., "Essays on New Equity Offerings in Canada", PhD Thesis, Concordia Univiersity, Dec. 1999, pp. 1-156.
Safarik, D., "Dark Books: The Next Chapter", Wall Street & Technology, Nov. 28, 2006, available at: http://www.wallstreetandtech.com/resourcecenters/etrading/dark-books-the-next-chapter/196513636.
Written Opinion in International Patent Application No. PCT/US2008/054188, filed Feb. 16, 2007, mailed Jun. 5, 2008.
Written Opinion in International Patent Application No. PCT/US2008/064299, filed May 21, 2008, mailed Jul. 28, 2008.
Office Action dated Apr. 15, 2013 in U.S. Appl. No. 13/016,853.
"Liquidnet H2O", available at: http://web.archive.org/web/20101021063452/http://www.liquidnet.com/, Oct. 21, 2010.
"Nyfix Millennium", Nyfix, Inc., available at: http://web.archive.org/web/20090116231248/http://nyfix.com/sellside-solutions/nyfix-millennium, Jan. 16, 2009.
Albanesius, C., "Instinet's 'Nighthawk' Takes Flight", Jun. 26, 2006, available at: http://www.waterstechnology.com/sell-side-technology/feature/1612628/instinet-nighthawk-takes-flight#.
Goldman Sachs, "Sigma X", Technical Report, available at: http://gset.goldmansachs.wallst.com/gcl/offering/liquidityaccess.asp, Year 2007.
Notice of Allowance dated Nov. 19, 2012 in U.S. Appl. No. 12/951,834.
Notice of Allowance dated Dec. 23, 2010 in U.S. Appl. No. 12/062,348.
Notice of Allowance dated Mar. 3, 2011 in U.S. Appl. No. 12/472,364.
Notice of Allowance dated May 9, 2008 in U.S. Appl. No. 10/786,196.
Notice of Allowance dated Jul. 22, 2010 in U.S. Appl. No. 11/759,830.
Notice of Allowance dated Sep. 1, 2011 in U.S. Appl. No. 13/038,253.
Notice of Allowance dated Sep. 28, 2004 in U.S. Appl. No. 09/621,769.
Office Action dated Oct. 20, 2003 in U.S. Appl. No. 09/621,769.
Office Action dated Oct. 21, 2009 in U.S. Appl. No. 11/759,830.
Office Action dated Nov. 23, 2011 in U.S. Appl. No. 13/181,183.
Office Action dated Nov. 7, 2007 in U.S. Appl. No. 10/786,196.
Office Action dated Feb. 4, 2013 in U.S. Appl. No. 13/418,100.
Office Action dated Mar. 24, 2008 in U.S. Appl. No. 10/786,196.
Office Action dated Jun. 10, 2011 in U.S. Appl. No. 13/038,253.
Office Action dated Jul. 6, 2010 in U.S. Appl. No. 12/062,348.
U.S. Appl. No. 12/472,364, filed May 26, 2009.
Walker, J.A., "Equity Options Strategies", In How the Options Markets Work, Ch. 6, Oct. 1990, pp. 97-102.
Wipperfurth, H., "Schwab Inks Deal with Cincinnati to Trade NYSE Stocks", In Investment Dealers' Digest, vol. 65, No. 35, Sep. 6, 1999, pp. 1-3.
Office Action dated Feb. 7, 2011 in U.S. Appl. No. 12/032,682.
Office Action dated Feb. 7, 2012 in U.S. Appl. No. 12/032,682.
Office Action dated Apr. 6, 2012 in U.S. Appl. No. 13/151,505.
Office Action dated Oct. 11, 2012 in U.S. Appl. No. 13/151,505.

* cited by examiner

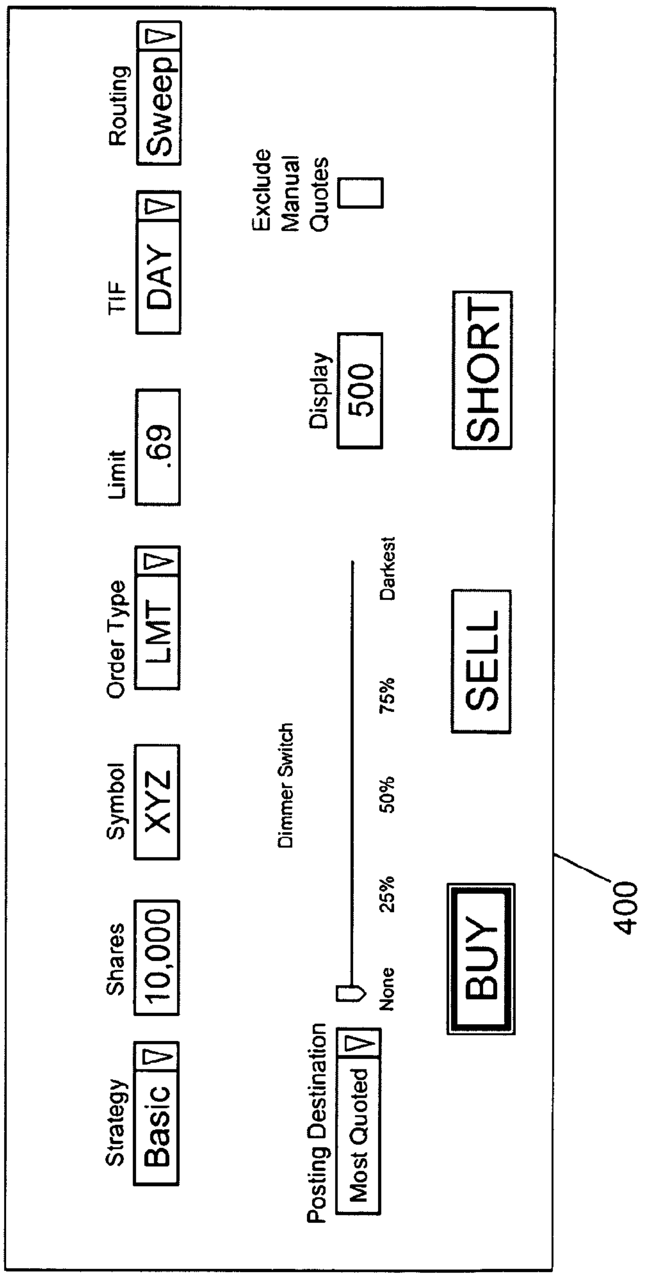
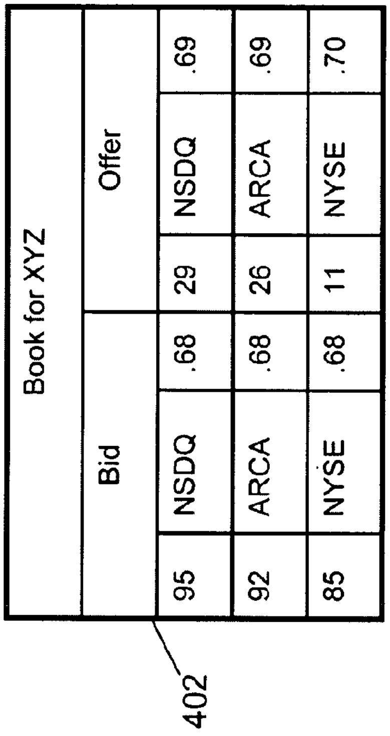
FIG. 4

900

| Book for XYZ | | | | | |
|---|---|---|---|---|---|
| Bid | | | Offer | | |
| 95 | NSDQ | .68 | 29 | NSDQ | .69 |
| 92 | ARCA | .68 | 26 | ARCA | .69 |
| 85 | NYSE | .68 | 11 | NYSE | .70 |

902

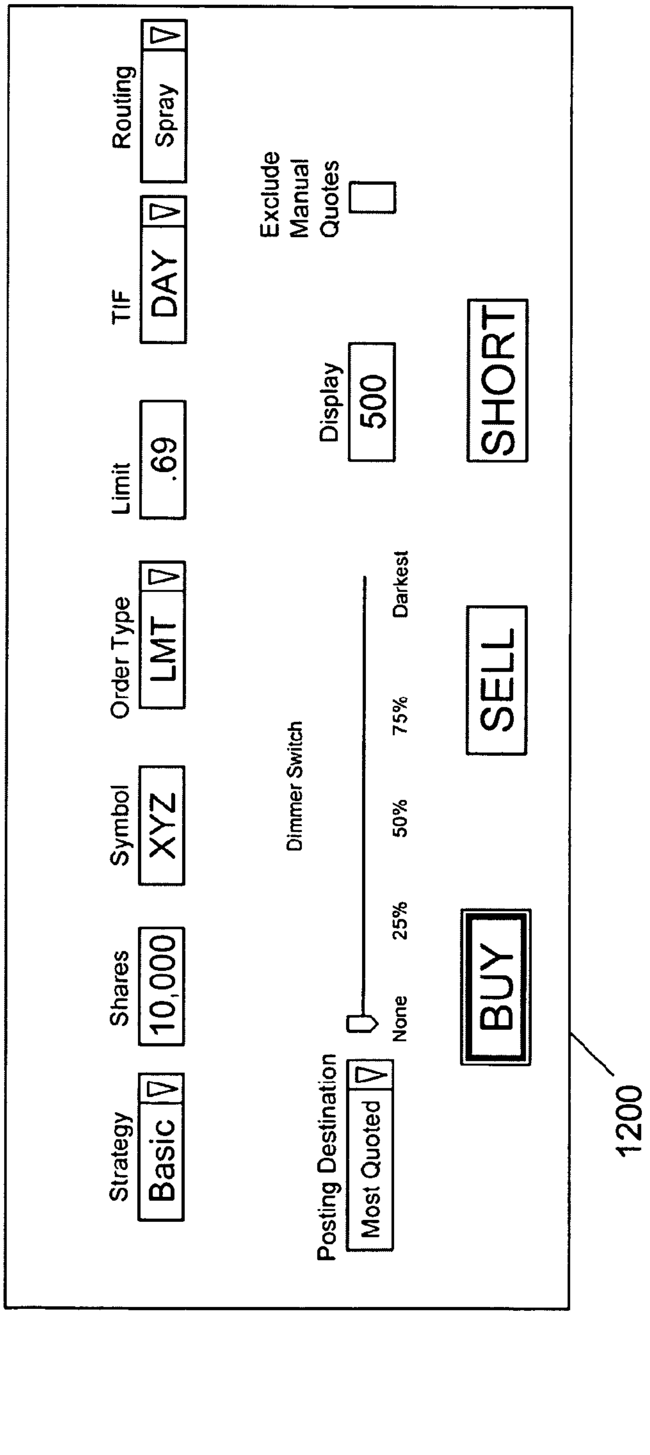
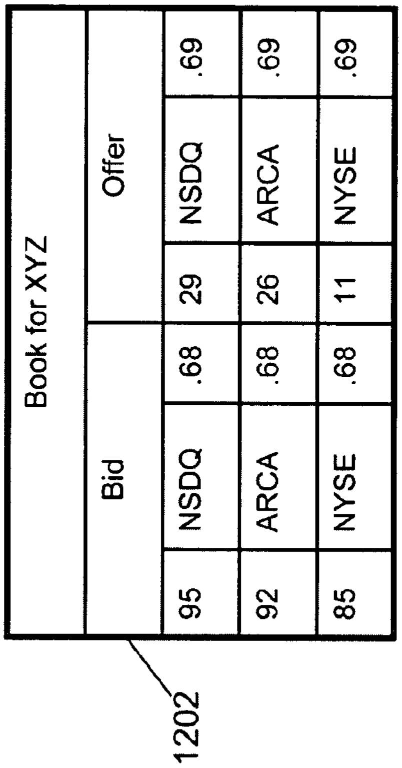
FIG. 12

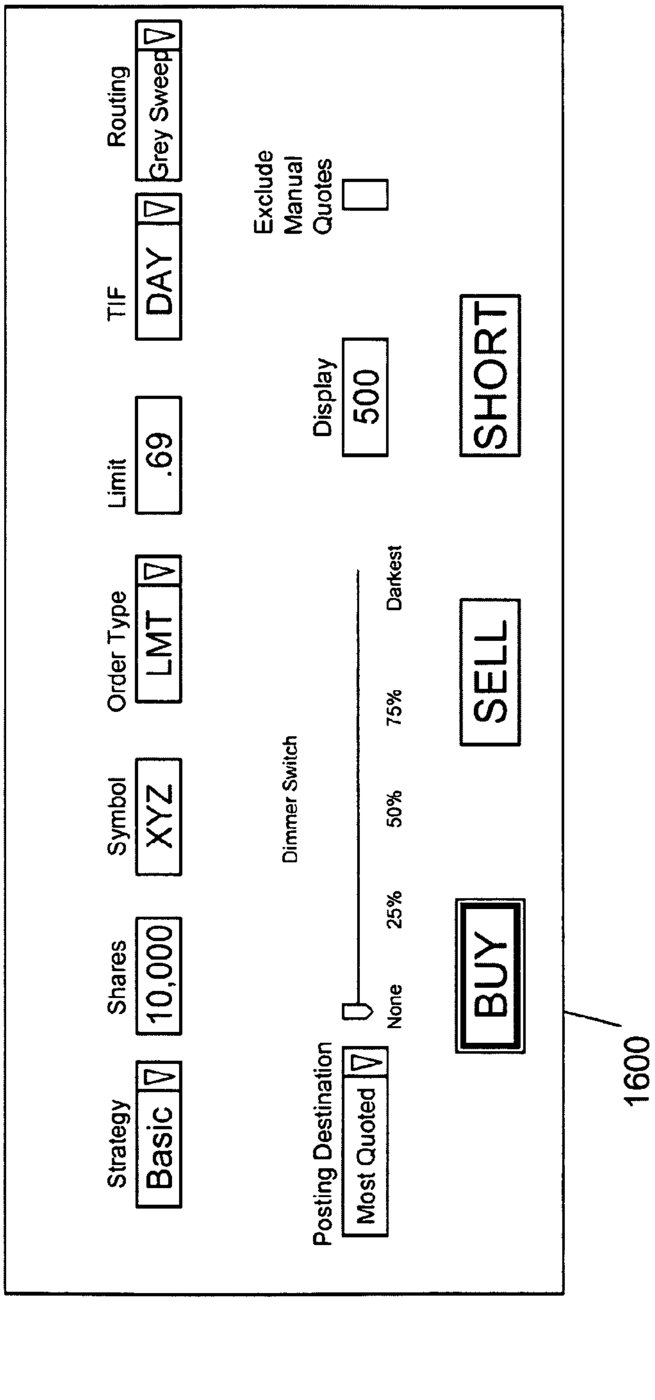
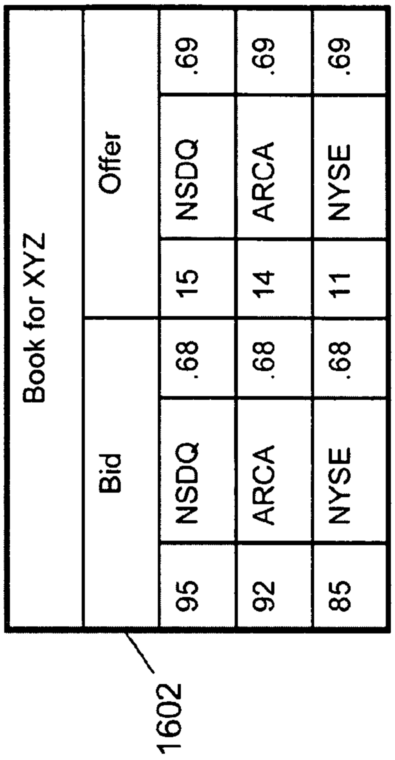
FIG. 16
Order entry form 1600:
- Strategy: Basic ▽
- Shares: 10,000
- Symbol: XYZ
- Order Type: LMT ▽
- Limit: .69
- TIF: DAY ▽
- Routing: Grey Sweep ▽
- Display: 500
- Exclude Manual Quotes: ☐
- Posting Destination: Most Quoted ▽
- Dimmer Switch: None — 25% — 50% — 75% — Darkest
- BUY | SELL | SHORT
Book for XYZ (1602):
| Bid | | Offer | |
|---|---|---|---|
| 95 | NSDQ | .68 | NSDQ | .69 |
| 92 | ARCA | .68 | ARCA | .69 |
| 85 | NYSE | .68 | NYSE | .69 |
| Bid | | | Offer | | |
|---|---|---|---|---|---|
| 95 | NSDQ | .68 | 15 | NSDQ | .69 |
| 92 | ARCA | .68 | 14 | ARCA | .69 |
| 85 | NYSE | .68 | 11 | NYSE | .69 |

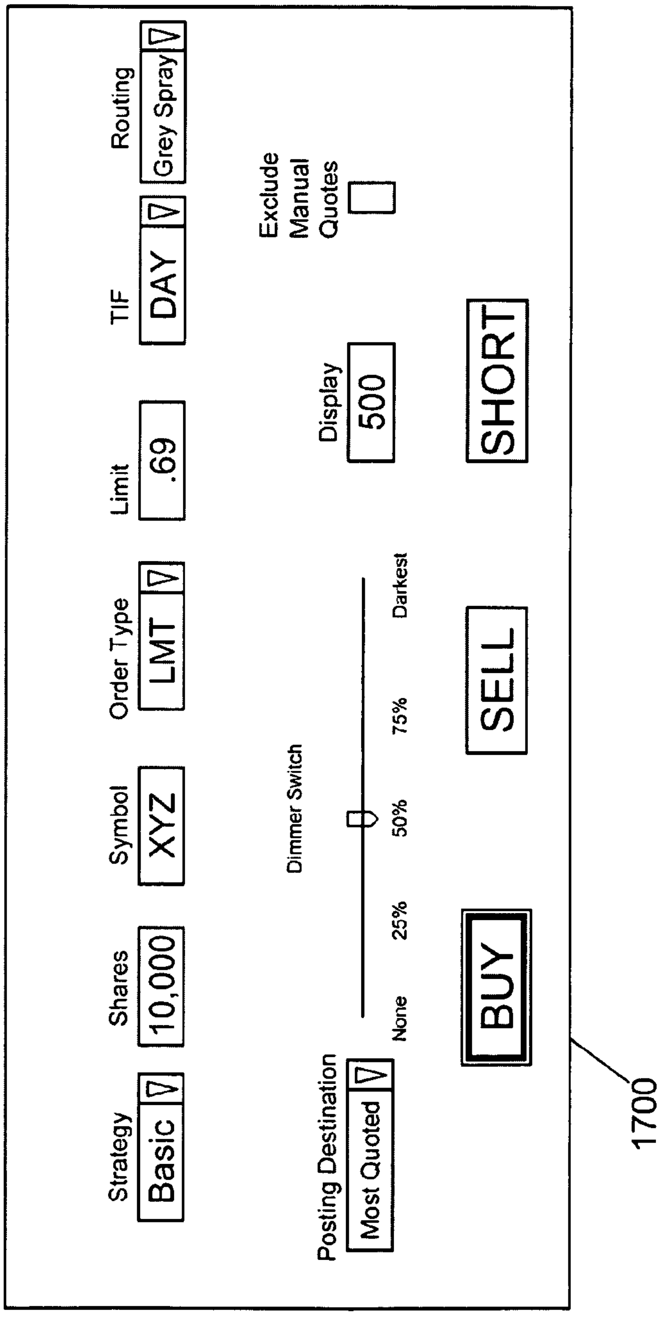
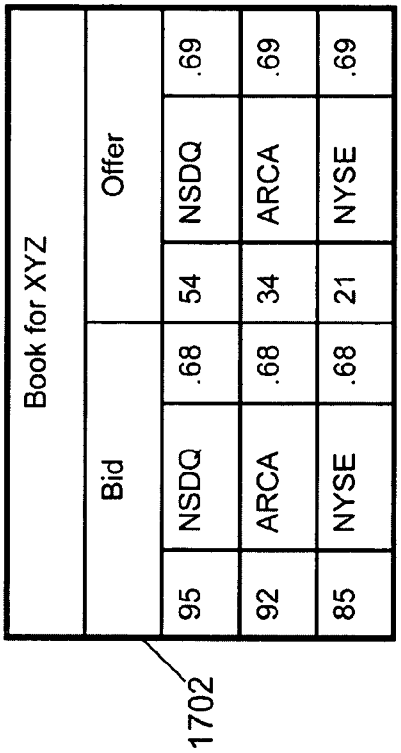
FIG. 17

| Strategy | Shares | Symbol | Order Type | Limit | TIF | Routing |
|---|---|---|---|---|---|---|
| Basic ▽ | 10,000 | XYZ | LMT ▽ | .69 | DAY ▽ | Primary Only ▽ |

Display: 500

Exclude Manual Quotes ☐

Posting Destination: Primary ▽

Dimmer Switch: None — 25% — 50% — 75% — Darkest

[BUY]  [SELL]  [SHORT]

1900

Book for XYZ

| Bid | | Offer | |
|---|---|---|---|
| NSDQ | .68  95 | NSDQ | .69  29 |
| ARCA | .68  92 | ARCA | .69  26 |
| NYSE | .68  85 | NYSE | .69  11 |

| Strategy | Shares | Symbol | Order Type | Limit | TIF | Routing |
|---|---|---|---|---|---|---|
| Basic ▽ | 10,000 | XYZ | LMT ▽ | .69 | DAY ▽ | ATS Only ▽ |

Posting Destination: ATS ▽

Dimmer Switch: None — 25% — 50% — 75% — Darkest

Display ☐

Exclude Manual Quotes ☐

BUY   SELL   SHORT

2200

Book for XYZ

| Bid | | Offer | |
|---|---|---|---|
| 95 | NSDQ .68 | NSDQ | .69 |
| 92 | ARCA .68 | ARCA | .69 |
| 85 | NYSE .68 | NYSE | .69 |

(Bid sizes: 29, 26, 11 — Offer column)

| Bid | | | Offer | |
|---|---|---|---|---|
| 95 | NSDQ | .68 | .69 NSDQ | 29 |
| 92 | ARCA | .68 | .69 ARCA | 26 |
| 85 | NYSE | .68 | .69 NYSE | 11 |

| Strategy | Shares | Symbol | Order Type | Limit | TIF | Routing |
|---|---|---|---|---|---|---|
| Patrol ▽ | 10,000 | XYZ | LMT ▽ | .68 | DAY ▽ | None ▽ |

Posting Destination: Most Quoted ▽

Dimmer Switch: None — 25% — 50% — 75% — Darkest

Display: 500     Exclude Manual Quotes ☐

Patrol Rules

| Peg to | Offset | Replenish Delay | Discretion Offset | "I would" Price |
|---|---|---|---|---|
| Bid ▽ | 0.01 | 5 sec | None | None |

[BUY]   [SELL]   [SHORT]

3000

Book for XYZ

| Bid | | Offer | |
|---|---|---|---|
| NSDQ | .65 | 14 | .70 | NSDQ |
| ARCA | .65 | 10 | .70 | BSX |
| NYSE | .65 | 11 | .70 | NYSE |

(Bid column also shows: 90, 57, 85)

3002

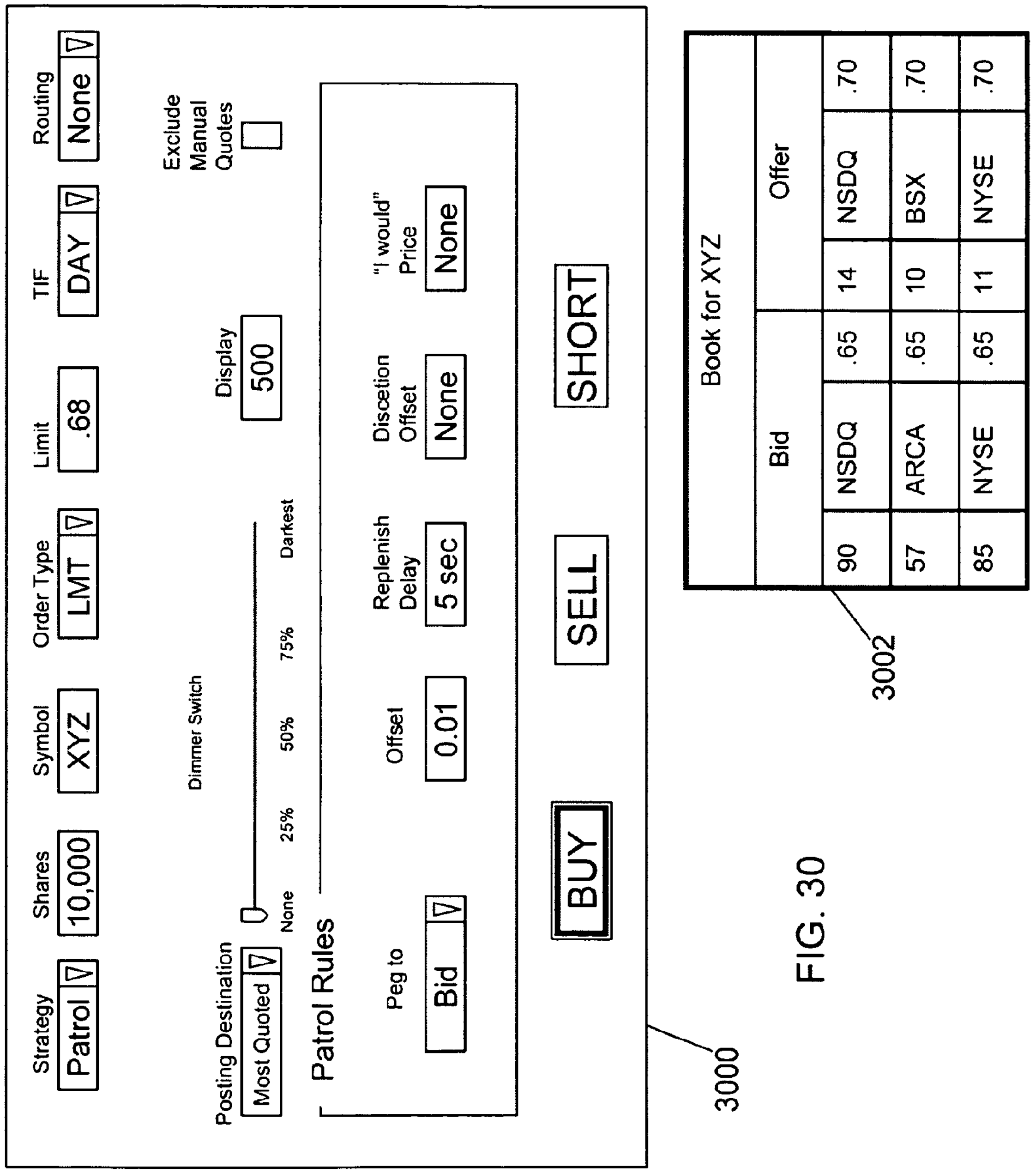

FIG. 30

| Book for XYZ | | | | | |
|---|---|---|---|---|---|
| Bid | | | Offer | | |
| 90 | NSDQ | .65 | 14 | NSDQ | .70 |
| 57 | ARCA | .65 | 10 | BSX | .70 |
| 85 | NYSE | .65 | 11 | NYSE | .70 |

3102

| Strategy | Shares | Symbol | Order Type | | Limit | TIF | Routing |
|---|---|---|---|---|---|---|---|
| Patrol ▽ | 10,000 | XYZ | LMT ▽ | | .70 | DAY ▽ | Sweep ▽ |

Posting Destination
Most Quoted ▽

Dimmer Switch
None — 25% — 50% — 75% — Darkest

Display 500

Exclude Manual Quotes ☐

Patrol Rules

| Peg to | Offset | Replenish Delay | Discretion Offset | "I would" Price |
|---|---|---|---|---|
| Offer ▽ | -0.01 | 5 sec | 0.02 | None |

[ BUY ]  [ SELL ]  [ SHORT ]

3300

Book for XYZ

| Bid | | | Offer | |
|---|---|---|---|---|
| 90 | NSDQ | .65 | 14 | NSDQ | .70 |
| 57 | ARCA | .65 | 10 | BSX | .70 |
| 85 | NYSE | .65 | 11 | NYSE | .70 |

3302

| Strategy | Shares | Symbol | Order Type | Limit | TIF | Routing |
|---|---|---|---|---|---|---|
| Patrol ▽ | 10,000 | XYZ | LMT ▽ | .68 | DAY ▽ | None ▽ |

Posting Destination: Protected ▽

Display: 500    Exclude Manual Quotes ☐

Dimmer Switch: None — 25% — 50% — 75% — Darkest

Patrol Rules

| Peg to | Offset | Replenish Delay | Discretion Offset | "I would" Price |
|---|---|---|---|---|
| Bid ▽ | -0.01 | None | None | None |

[ BUY ]    SELL    SHORT

3500

Book for XYZ

| Bid | | Offer | |
|---|---|---|---|
| 90 | NSDQ .65 | 14 | NSDQ .70 |
| 57 | ARCA .65 | 10 | ARCA .70 |
| 85 | NYSE .65 | 11 | NYSE .70 |

3502

| Book for XYZ | | | | | |
|---|---|---|---|---|---|
| Bid | | | Offer | | |
| 90 | NSDQ | .68 | 14 | NSDQ | .69 |
| 57 | ARCA | .68 | 10 | ARCA | .69 |
| 85 | NYSE | .68 | 11 | NYSE | .69 |

3602

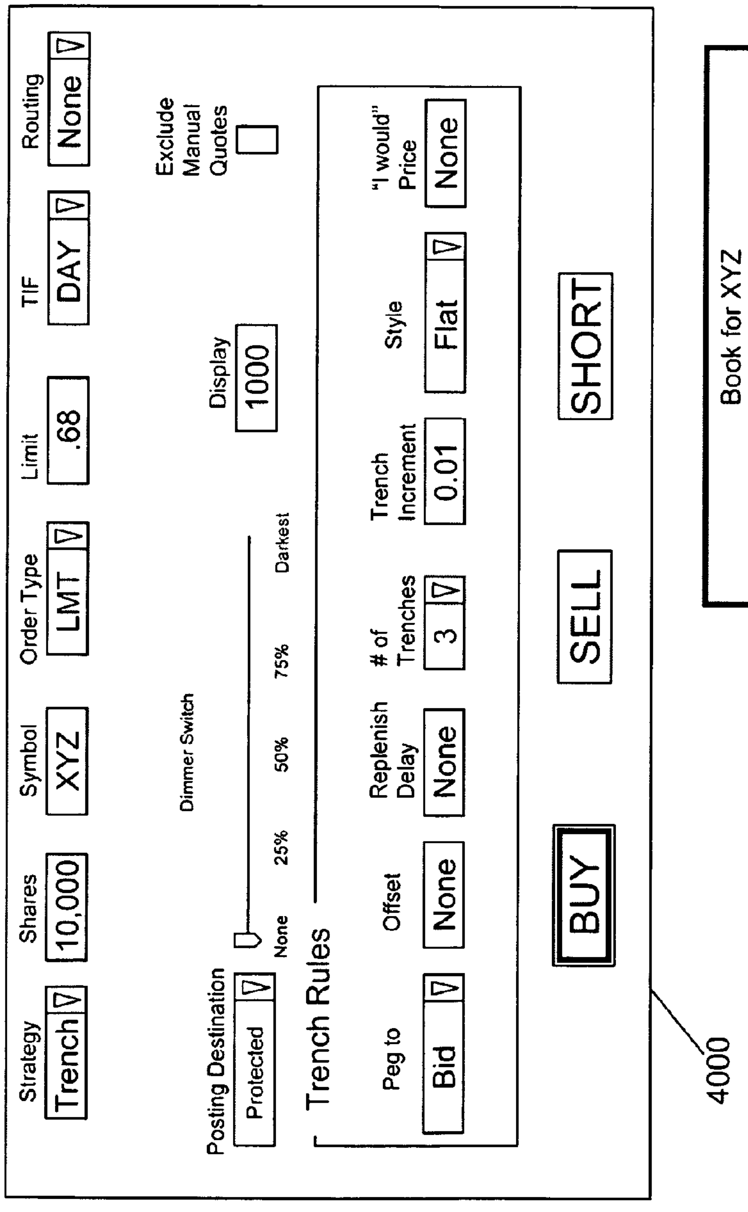
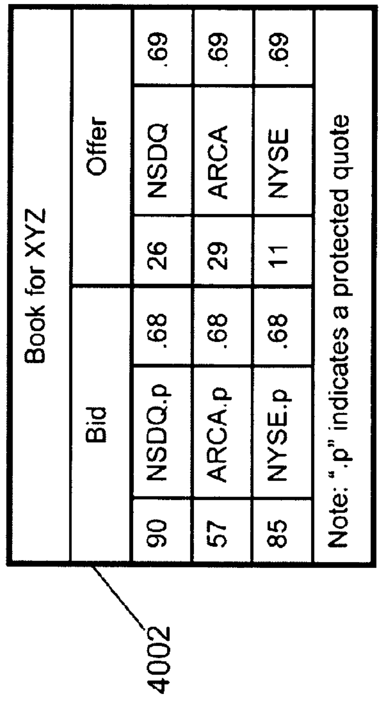
FIG. 40

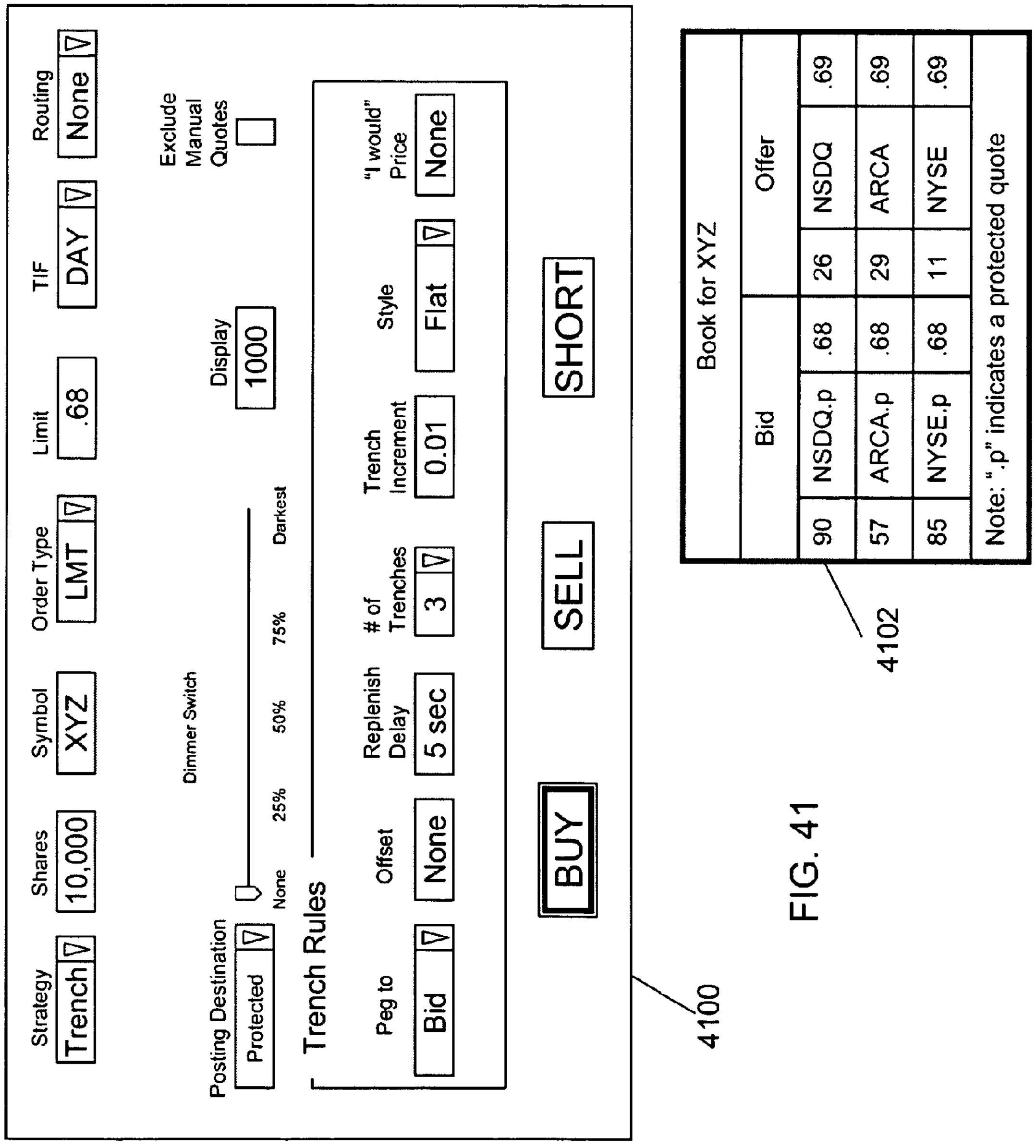

FIG. 41

Trench Order Entry Form (4100):

- Strategy: Trench
- Shares: 10,000
- Symbol: XYZ
- Order Type: LMT
- Limit: .68
- TIF: DAY
- Routing: None Posting Destination: Protected Dimmer Switch: None — 25% — 50% — 75% — Darkest Exclude Manual Quotes: ☐

Display: 1000

Trench Rules

| Peg to | Offset | Replenish Delay | # of Trenches | Trench Increment | Style | "I would" Price |
|---|---|---|---|---|---|---|
| Bid | None | 5 sec | 3 | 0.01 | Flat | None |

[BUY] [SELL] [SHORT]

Book for XYZ (4102):

| Bid | | Offer | |
|---|---|---|---|
| NSDQ.p | 90 .68 | 26 .69 | NSDQ |
| ARCA.p | 57 .68 | 29 .69 | ARCA |
| NYSE.p | 85 .68 | 11 .69 | NYSE |

Note: ".p" indicates a protected quote

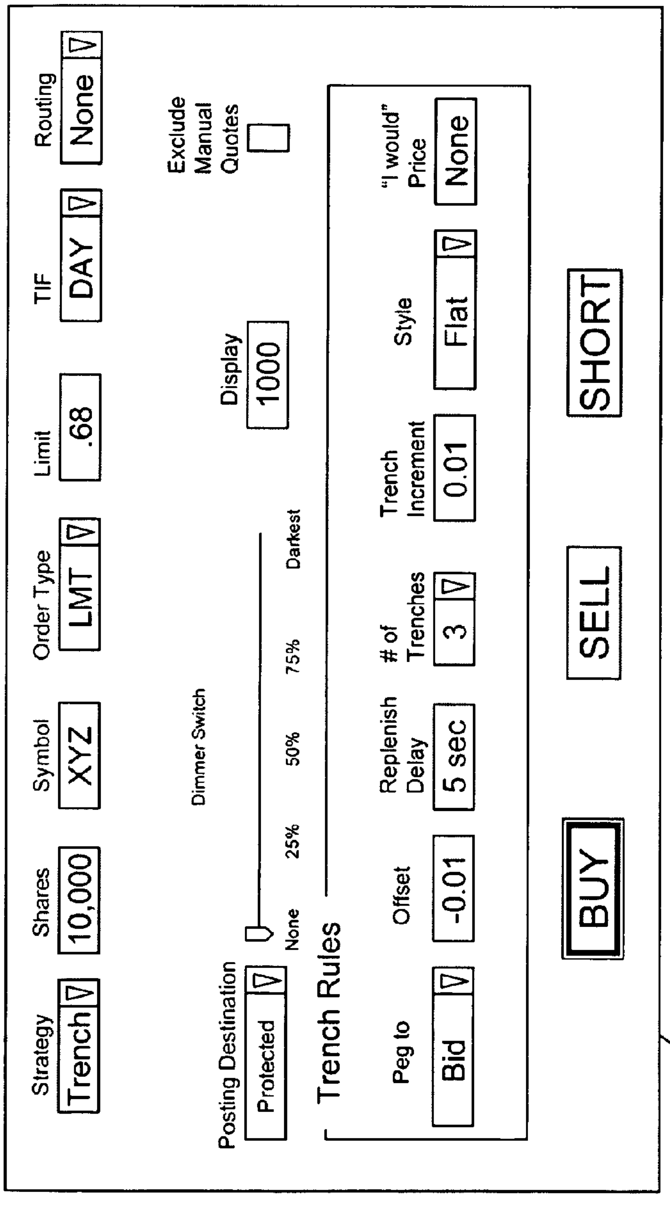

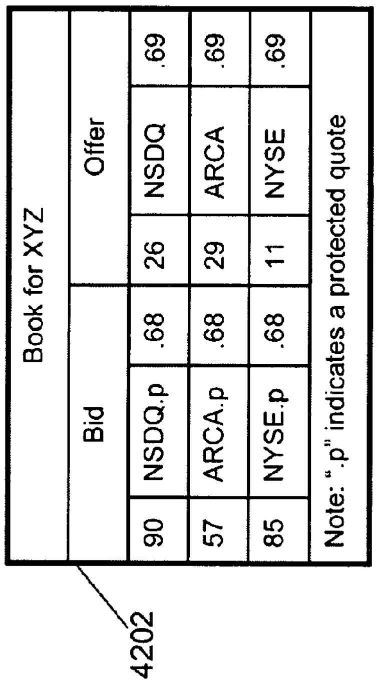

FIG. 42

| Book for XYZ | | | | | |
|---|---|---|---|---|---|
| Bid | | | Offer | | |
| 90 | NSDQ.p | .68 | .69 | NSDQ | 26 |
| 57 | ARCA.p | .68 | .69 | ARCA | 29 |
| 85 | NYSE.p | .68 | .69 | NYSE | 11 |
| Note: ".p" indicates a protected quote | | | | | |

4202

Strategy: Trench ▽
Shares: 10,000
Symbol: XYZ
Order Type: LMT ▽
Limit: .68
TIF: DAY ▽
Routing: None ▽

Posting Destination: Protected ▽
Dimmer Switch: None — 25% — 50% — 75% — Darkest
Exclude Manual Quotes: ☐

Trench Rules

Peg to: Bid ▽
Offset: -0.01
Replenish Delay: 5 sec
# of Trenches: 3 ▽
Trench Increment: 0.01
Display: 1000
Style: Flat ▽
"I would" Price: None

BUY   SELL   SHORT

4200

4402

METHODS AND SYSTEMS FOR PROCESSING ORDERS

CROSS REFERENCE TO RELATED APPLICATION

This application claims the benefit of U.S. Provisional Patent Application No. 60/931,328, filed May 23, 2007, which is hereby incorporated by reference herein in its entirety.

TECHNICAL FIELD

The disclosed subject matter relates to methods and systems processing orders.

BACKGROUND

The capital markets are essential components of the world's economies. Through these markets, among other things, companies and governments can raise money to support their operations by selling securities (such as stocks and bonds) to investors.

A wide variety of mechanisms are available for buying and selling securities. These include stock exchanges (e.g., the New York Stock Exchange), electronic liquidity providers (ELPs), dark pools, and alternative trading systems. A dark pool is an aggregation of undisclosed liquidity that attempts to hide the available liquidity for a given security so that the price for the security is not adversely impacted by the liquidity.

It is desirable in many instances to be able to execute trades through a combination of these different mechanisms, and control the manner in which those trades are routed and posted.

SUMMARY

Methods and systems for processing orders are provided. In some embodiments, methods for processing orders in an electronic trading system are provided, the methods comprising: receiving a user selection of a routing style; receiving a user selection of a post destination; routing at least a portion of an order according to the routing style; and posting at least a portion of the order at the posting destination selected by the user.

In some embodiments, methods for process orders in an electronic trading system are provided, the methods comprising: receiving a user selection of a routing style; routing at least a portion of an order according to the routing style; receiving a user selection of a percentage at which at least a portion of the order will be posted to dark pools; and posting the percentage of the order at one or more dark pools.

In some embodiments, methods for processing orders in an electronic trading system are provided, the methods comprising: receiving a user selection of a post destination; routing at least a portion of an order; receiving a user selection of a percentage at which at least a portion of the order will be posted to dark pools; and posting the percentage of the order at one or more dark pools.

In some embodiments, systems for process orders are provided, the systems comprising: at least one processor that: receives a user selection of a routing style; receives a user selection of a post destination; routes at least a portion of an order according to the routing style; and posts at least a portion of the order at the posting destination selected by the user.

In some embodiments, systems for processing orders are provided, the systems comprising: at least one processor that: receives a user selection of a routing style; routes at least a portion of an order according to the routing style; receives a user selection of a percentage at which at least a portion of the order will be posted to dark pools; and posts the percentage of the order at one or more dark pools.

In some embodiments, systems for processing orders are provided, the systems comprising: at least one processor that: receives a user selection of a post destination; routes at least a portion of an order; receives a user selection of a percentage at which at least a portion of the order will be posted to dark pools; and posts the percentage of the order at one or more dark pools.

BRIEF DESCRIPTION OF THE DRAWINGS

FIGS. 3-23 are diagrams of user interfaces in examples of uses of a basic strategy in accordance with some embodiments of the invention.

FIGS. 28-37 are diagrams of user interfaces in examples of uses of a patrol strategy in accordance with some embodiments of the invention.

FIGS. 40-43 are diagrams of user interfaces in examples of uses of a trench strategy in accordance with some embodiments of the invention.

DETAILED DESCRIPTION

In accordance with various embodiments of the invention, methods and systems for processing orders are provided. These methods and systems provide mechanisms through which traders can trade securities, such as debt, equity, listed, NASDAQ NM, and unregistered securities, and/or any other suitable securities. Traders may include any party, and/or mechanism for, trading a security, whether for the benefit of the party or owner of the mechanism, or another. For example, a trader may be a person trading his or her own stock, a broker or an agent selling stock of another, a computer initiating an automated trade, etc.

Figure 1:
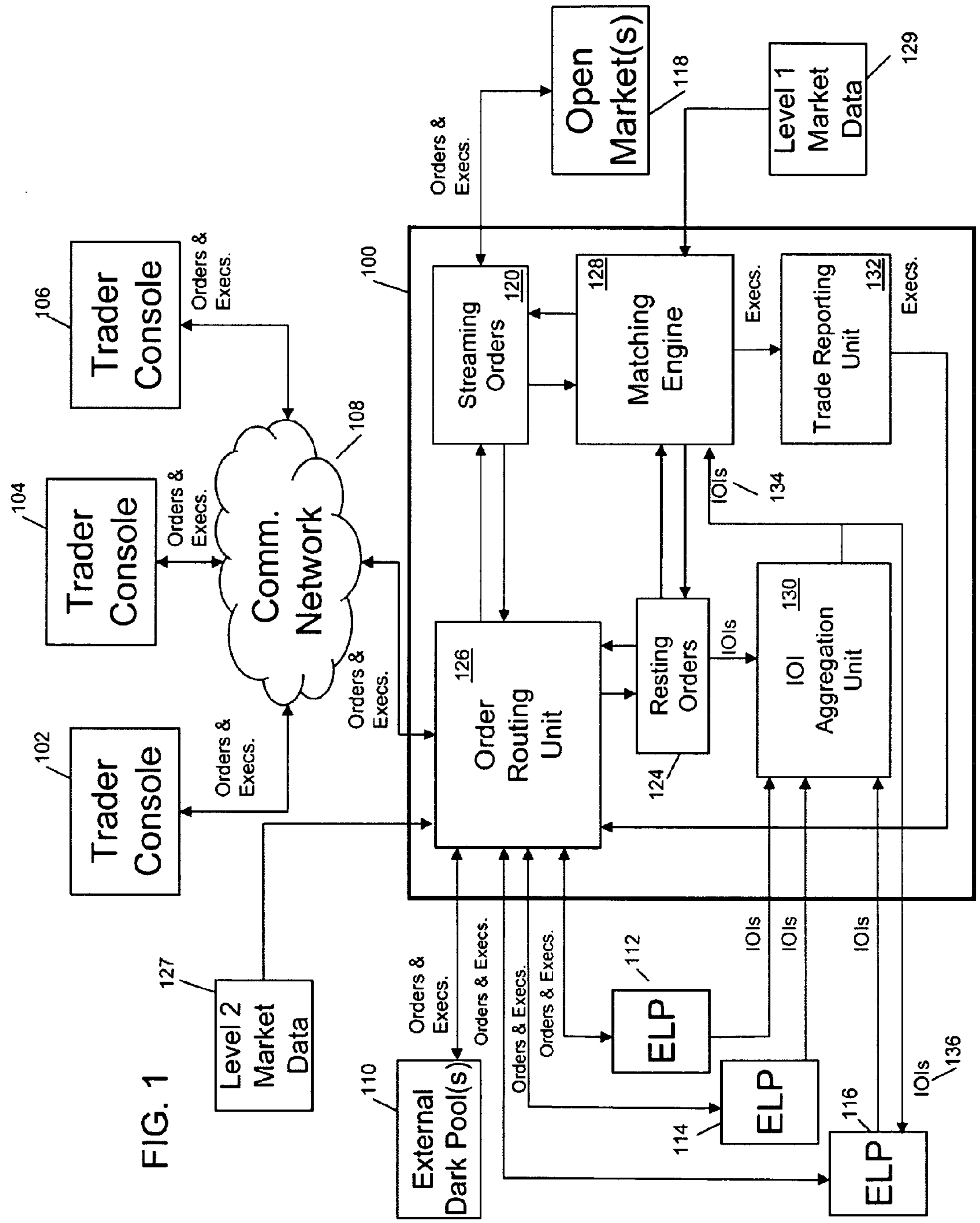
FIG. 1 is a block diagram of a system in accordance with some embodiments of the invention.

As shown in FIG. 1, in some embodiments, a mechanism for trading 100 may be coupled to trader consoles 102, 104, and 106 through a communication network 108. Trader consoles 102, 104, and 106 may be any suitable mechanisms for submitting orders and receiving execution information (such as special or general purpose computers), and may be interactive with a human or fully automated. For example, traders may gain access to mechanism 100 by using an order management system, an execution management system, a manual order (e.g., a verbal order) submitted through an agent trading desk having a trader console, etc. Although three trader consoles are illustrated, any suitable number of trader consoles may be used. Communication network 108 may be any suitable communication network, and may include the Internet, wired networks, wireless networks, and/or any suitable communication mechanism.

Mechanism 100 may also be coupled to one or more external dark pools 110, electronic liquidity providers (ELPs) 112, 114, and 116, one or more open markets 118, one or more sources of Level 2 market data 127, and one or more sources of Level 1 market date 129. External dark pools 110 may be any suitable mechanisms for managing and executing orders of undisclosed liquidity. ELPs 112, 114, and 116 may be any suitable electronic liquidity providers, and any suitable number of ELPs may be used. For example, ELPs may include internal dark pools, external dark pools, external alternative trading systems, an exchange, a market maker, a non-market-maker broker-dealer, an order management system scraping engine, etc. Open markets 118 may be any suitable one or more markets for executing orders in securities. For example, open markets 118 may include an exchange, such as the NY Stock Exchange, the American Stock Exchange, etc., an ECN, such as BATS, Direct Edge, etc., and/or an alternative trading system.

Mechanism 100 may be implemented using any suitable hardware and/or software. For example, mechanism 100 may be implemented in one or more computers, servers, digital processing devices, etc. (any of which may include a processor), using any suitable software for performing any suitable combination, set, and/or subset of the functions described herein.

Communication between mechanism 100 and trader consoles 102, 104, and 106, external dark pools 110, ELPs 112, 114, and 116, and open markets 118 may be performed using any suitable communication technique or protocol. For example, in some embodiments, communication may be performed using the Financial Information eXchange (FIX) protocol. Communication between mechanism 100 and external dark pools 110, ELPs 112, 114, and 116, and open markets 118 may be via any suitable one or more communication networks (such as communication network 108) and any one or more of such communication networks may be the same type of network as, or similar to, communication network 108.

In operation, mechanism for trading 100 may receive orders from trader consoles 102, 104, and/or 106 through communication network 108. These orders may include "streaming" orders and "resting" orders. As used herein, a streaming order is an order that may be routed to one or more open markets if a match for the order cannot be identified by mechanism 100. All other orders may be referred to as resting orders. In some embodiments, streaming orders and/or resting orders may have Times-In-Force (TIFs) of "DAY" or "Immediate or Cancel" (IOC). Orders may be designated as streaming or resting, and as having a TIF of DAY or IOC, using any suitable mechanism.

Once an order is received, the order may be routed by routing unit 126 according to settings associated with the order. For example, in some instances, the order may be routed by routing unit 126 and compared to other orders and/or Indications of interest (IOIs) (described below) by matching engine 128. As a more particular example, a resting order with a TIF of DAY received by mechanism 100 may be routed by order routing unit 126, and compared to streaming orders 120, other resting orders 124, and/or Indications Of Interest (IOIs) 134 (described below) by matching engine 128. If a match is found, the match may then be executed (as further described below). Otherwise, the order may rest in mechanism 100 for the day or until the order is completed or cancelled.

As another example, a resting order with a TIF of IOC received by mechanism 100 may be routed by order routing unit 126, and compared to streaming orders 120, other resting orders 124, and/or IOIs 134 by matching engine 128. If a match is found, the match may then be executed. Otherwise, the order may be cancelled and a suitable notification sent to the corresponding trader console.

As still another example, a streaming order, whether with a TIF of DAY or IOC, received by mechanism 100 may be routed by order routing unit 126, and compared to other streaming orders 120, resting orders 124, and/or IOIs 134 by matching engine 128. If a match is found, the match may then be executed. Otherwise, the order may be routed to open market 118.

A resting order may generate an IOI used for matching by matching engine 128. A resting order may additionally or alternatively be routed (by order routing unit 126) to one or more external dark pools 110. An expiration time may be set for the IOI based on the TIF of the order. For example, a DAY order may result in an IOI that does not expire for the day (unless cancelled by the trader generating the order). As another example, an IOC order may result in an IOI that expires after some period of time, such as two seconds. The expiration time for an IOC order may be dynamically altered (e.g., by increasing the expiration time in increments of 100 milliseconds to increase the likelihood of the IOI being matched). If an IOI for an order is routed to an external dark pool, and a match for the order is subsequently identified by matching engine 128, the IOI may be retrieved from the external dark pool and executed by mechanism 100.

Indications Of Interest (IOIs) may be used by ELPs 112, 114, and 116 and resting orders 124 to indicate an intention to buy or sell a certain size of a certain security. In some embodiments, no price is indicated in an IOI. In response to these IOIs, an order may be routed to a corresponding ELP or matched against a corresponding resting order. In some embodiments, an indication may be provided in an IOI as to whether oversized orders are permitted to be received by an ELP in response to the IOI. When such an indication is provided, an order routed to the ELP may be oversized.

IOIs may be provided by the ELPs and the resting orders to IOI aggregation unit 130. The IOI aggregation unit may aggregate some or all like IOIs (i.e., IOIs for the same trade side (e.g., buy or sell) and security) into aggregated IOIs. These aggregated IOIs and non-aggregated IOIs may be provided to matching engine 128 as IOIs 134.

In some embodiments, when one or more IOIs 134 cannot be matched by matching engine, the one or more IOIs 134 may be provided to one or more ELPs 116 as IOIs 136. If an ELP 116 has an order that matches an IOI 136, the ELP may then send an IOC resting order to mechanism 100 for execution. This IOC resting order may then be matched and executed against the order(s) and/or IOI(s) underlying the corresponding IOI 136.

Any suitable pricing arrangement may be used in various embodiments. These pricing arrangements may be determined by settings associated with an order in some embodiments. For example, in some embodiments, orders matched by mechanism 100 may be executed at the mid-point of the National Best Bid and Offer (NBBO), at a relative mid-point between the limits of the orders, at some other point within the NBBO, etc. As a more particular example, if one or more of the limits of the buy and sell orders for a trade are outside the NBBO, then the trade may be executed at the mid-point of the NBBO. As another more particular example, if the limits of the buy and sell orders for a trade are within the NBBO, then the trade may be executed at the mid-point of the limits.

As orders are matched and executed in mechanism 100, the executions may be reported to trade reporting unit 132 and any suitable reporting, auditing, clearance, settlement, compliance, etc. functions performed as known in the art.

Although different blocks are illustrated in FIG. 1 for order routing unit 126, matching engine 120, IOI aggregation unit 130, and trade reporting unit 132 of mechanism 100, this illustration is only provided to simplify understanding of the operation of mechanism 100. The functions provided by these components may be combined or split up in any suitable arrangement in some embodiments.

In some embodiments, the routing of orders to ELPs 112, 114, and 116 presenting IOIs may additionally take into account a ranking of such ELPs to account for situations in which multiple ELPs present IOIs that match an order. Such a ranking may be based on, for example, trading patterns, response times, percentages of fills on an order and/or a share basis, price improvement statistics, order/quote latency statistics, order rejection rates, best execution statistics, fees and/or commissions charged, the activity of securities after orders in those securities by an ELP (e.g., the order price for securities consistently goes down after sell orders by an ELP), and/or any other suitable metric. For example, a ranking may be based on a formula which gives one or more weights to each of several metrics. An ELP may have a single ranking applied to it (e.g., for all securities traded by that ELP), or may have multiple rankings applied to it (e.g., one for each security traded by that ELP). The ranking(s) may be applied over one or more periods of time, e.g., since opening of trading day, for past five days, for past ten days, and/or any other suitable period of time.

Figure 2:
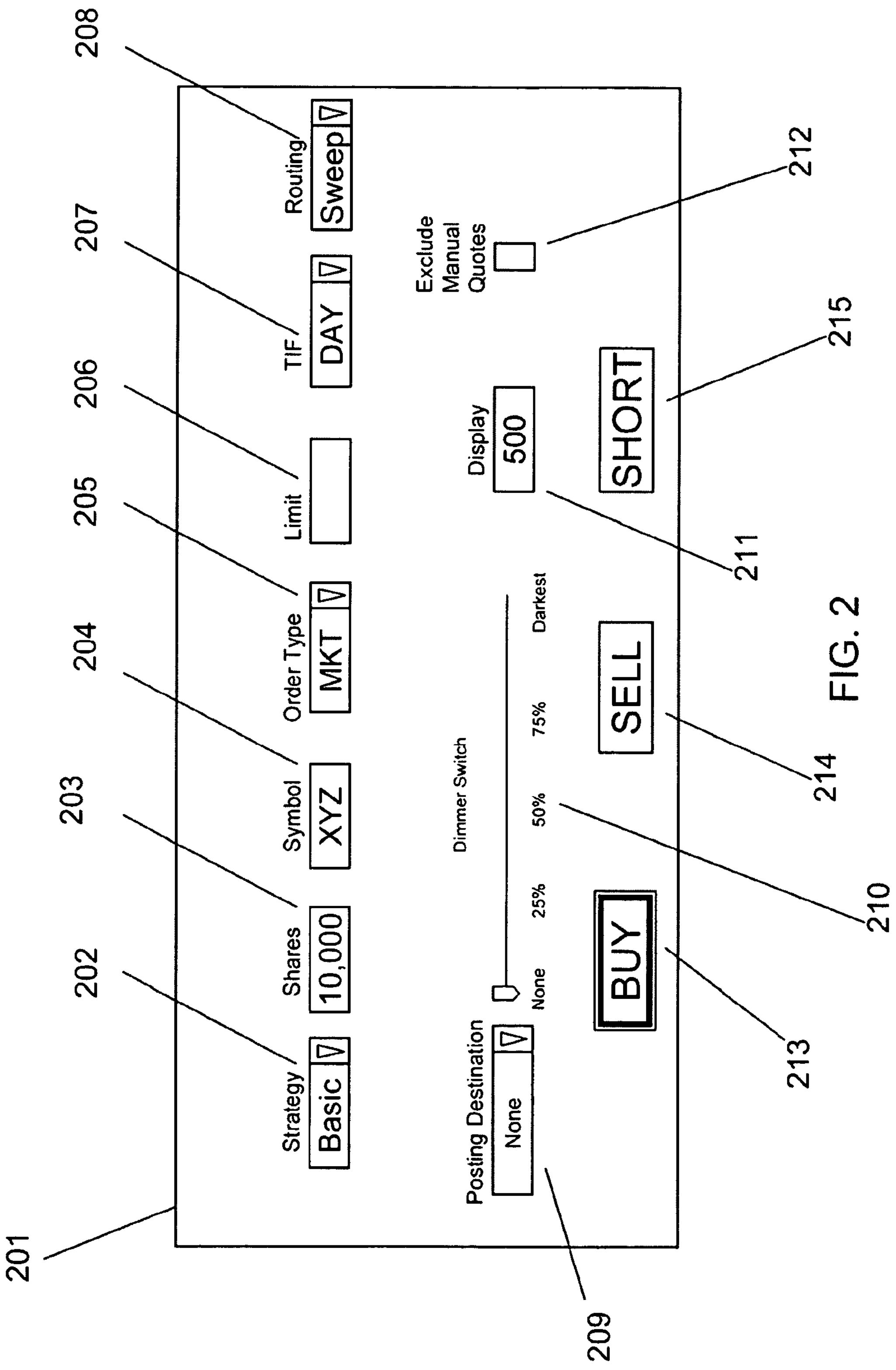
FIG. 2 is a diagram of a user interface for a basic strategy in accordance with some embodiments of the invention.

An example of a user interface 201 for submitting and routing orders to trade securities that may be provided on trader consoles 102, 104, and/or 106 (FIG. 1) is illustrated in FIG. 2. As shown, this interface may include a variety of fields for entering settings containing order information and specifying how an order is to be routed. For example, a strategy menu 202, a shares field 203, a symbol field 204, an order type menu 205, a limit price field 206, a time-in-force (TIF) menu 207, a routing menu 208, a posting destination menu 209, a dimmer switch 210, a display field 211, an exclude manual quote check box 212, a buy button 213, a sell button 214, and a short button 215 may be provided in user interface 201. Strategy menu 202 may enable a user to select from multiple strategies for handling an order, which strategies may use any suitable combination of the features described herein. As illustrated, by selecting the "Basic" strategy, the user may be presented with the interface shown in FIG. 2. Other examples of strategies are reflected in other of the figures contained herein. Shares field 203 may enable a user to enter the number of shares to be traded. Symbol field 204 may enable a user to specify the security to be traded. Order type menu 205 may enable a user to specify the type of order to be placed. For example, the order may be placed as a market order, a limit order, or any other suitable type of order. Limit field 206 may enable a user to specify a limit price to be placed on an order. The time-in-force (TIF) menu 207 may enable a user to specify how long an order is to remain in force. For example, a time in force may be set as a DAY, immediate-or-cancel, or any other suitable time. Routing menu 208 may enable a user to specify a routing style that indicates how orders are to be routed to one or more destination. For example, orders may be routed using a sweep approach (e.g., where sub-orders associated with an order are routed to multiple destinations sequentially), a spay approach (e.g., where sub-orders associated with an order are routed to multiple destinations simultaneously), a dark pool approach (e.g., where orders are routed to dark-pools only), a primary approach (e.g., where orders are routed to the primary market for the symbol associated with the orders), an Electronic Communication Network (ECN) approach (e.g., where orders are only routed to ECNs), a manual approach (e.g., where orders are only routed to destinations that have manual quotes), an alternative trading system (ATS) approach (e.g., where orders are routed only to one or more specific ATSs), and/or a mix of these approaches, examples of which are provided herein. Posting destination menu 209 may enable a user to specify a destination for when a user's order is to be posted. For example, as described in more detail below, a destination may include explicit destinations and synthetic destinations, such as the most-quoted destination for a symbol, the last quoted destination for a symbol, the primary destination for a symbol, a protected destination for a symbol, the destination at the National Best Bid and Offer (NBBO) for a symbol, ATSs only, dark pools only, ECNs only, and/or a mixture of these. Dimmer switch 210 may enable a user to specify a percentage at which orders are to be posted to dark pools (such as certain ATSs) relative to other types of destinations. For example, a user may select 50% to indicate that half of the size should be posted with one or more dark pools and the remaining half should be posted with one or more other types of destinations. Display field 211 may enable a user to indicate the size associated with the order that will be shown to other traders if the order is posted. Exclude manual quote check box 212 may enable a user to prevent orders from being traded against manual quotes. Buy button 213 may enable a user to specify that the order is a buy order. Sell button 214 may enable a user to specify that the order is a sell order. Short button 215 may enable a user to indicate that order is to short sell a security.

As mentioned above, in accordance with some embodiments, a user may be able to indicate that the routing of orders by order routing unit 126 (FIG. 1) is to be to explicit destinations and/or synthetic destinations. As used herein, an explicit destination is a destination that is specifically identified. The New York Stock Exchange (NYSE), the National Association of Securities Dealers Automated Quotations system (NASDAQ), the American Stock Exchange (AMEX), etc. are examples of explicit destinations.

As used herein, a synthetic destination is a mechanism that will select an explicit destination based on one or more criterion. For example, a synthetic destination can select an explicit destination based on which destination is "most-quoted" for the security of the order to be posted. For example, if the client is seeking to sell a particular security, the user's order may be routed by order routing unit 126 (FIG. 1) to a destination market that has been selected as being most-quoted based on a real-time calculation of the most-effective destination for a security associated with the order, where the most-effective destination may be based on the highest calculated frequency of where the security is both quoted and executed.

As another example, a synthetic destination can select an explicit destination based on which destination had the last sale for the security in the order. In some embodiments, the destination may be re-evaluated even after a relative destination has been selected and an order has been posted at that destination. For example, if a contra side order is posted at another destination after an original order has been posted at an original destination, the original order at the original destination may be canceled, the liquidity (contra-side order) at the new destination may be taken, and a new post may be made at the other destination for any residual size.

As yet another example, a synthetic destination can select an explicit destination based on which destination is the primary listing agent for the order's security. The primary listing agent can be determined using any suitable mechanism.

As yet another example, a synthetic destination can select an explicit destination based on where the order can be represented as a new, protected quote. Such a destination may be a protected trading center under the United States Security and Exchange Commission Regulation NMS. Such a destination may have automated quotes. For example, such a destination may include: New York Stock Exchange Arca (ARCA); NASDAQ Stock Exchange (NSDQ); New York Stock Exchange (NYSE); American Stock Exchange (AMEX); International Securities Exchange (ISE); EDGX (ADF); National Stock Exchange (NSX); Philadelphia Stock Exchange (PHLX); Chicago Board Options Exchange Stock Exchange (CBSX); Chicago Stock Exchange (CHX); Lava Flow (ADF); and Track (ADF). A protected quote may include a quote which is the best bid or best offer for the security in a protected market center. In some embodiments, if the order is posted as a quote and is the best bid or best offer for the security in the protected market center but then another, better quote is posted, the order may be re-posted in another destination in which it is the best bid or best offer for the security. In some embodiments, once the order's limit is worse than the best bid or best offer for that security in all of the available destinations, the order may stay posted at the destination with the closest best bid or closest best offer even though the order will not be the best bid or best offer in that destination.

As yet another example, a synthetic destination can select an explicit destination based on which market centers are currently at the National Best Bid and Offer (NBBO). In some embodiments, if the limit of the order is better than the NBBO, then the quotes of the order will be posted at the NBBO until the NBBO is better than the limit. Once the limit is worse than the NBBO (i.e., making the quote non-marketable), quotes for the order will stay or be posted at destinations at the NBBO.

As yet another example, a synthetic destination can select as destinations other orders that match a user's order, and execute those orders against each other. If an order designated for matching with other orders does not immediately match another order, the order may be designated as to wait some period of time for a matching order to be found, and may be referred to as a resting order. For example, such a time may be for the remainder of the trading day, or any other suitable period of time. Some orders may additionally or alternatively be designated as to be sent to another destination if the order does not immediately match another order, or if the order does not match another order within some period of time (e.g., before the end of the trading day). An order that is sent to another destination if it does not immediately match another order may be referred to as a streaming order. A new resting order may be matched against any suitable order, such as an existing resting order or a streaming order. A resting order may additionally or alternatively be matched against an Indication Of Interest (IOI) (as described below) and/or an unplaced order that is scraped from an entry in an order management system (OMS).

In some embodiments, when two orders in the present system are matched, the orders may be executed against each other at the midpoint of the NBBO. Thus, in such cases, the limits on each of the two orders may be checked to make sure that they allow the orders to be executed at this price prior to, at the time of, or after being matched.

In some embodiments, two orders may be manually designated by two traders to be matched against each other. Any suitable mechanism may be used to perform this designation, such as specifying an identifier of the other trader in addition to other trade information, for example. In some embodiments, limit prices of such manual orders may be compared to the NBBO. If the limit prices are within the NBBO, then the orders may be matched and executed. Otherwise, each order may be held for the time in force (TIF) of the order to see if the NBBO moves, or may be executed against other orders (for example, using the routing techniques, such as sweep and spray, described herein) until a partial execution against the other manual order can be performed.

In accordance with some embodiments, a synthetic destination can select a destination based on Indications Of Interest (IOIs) sent by potential destinations (e.g., ELPs 112, 114, and/or 116). Such an IOI may, for example, indicate a security, side (e.g., buy or sell), and a size. These Indications Of Interest may indicate that the destination is willing to trade the specified security. If an order represents the opposite side of all or a portion of the IOI (i.e., the order matches the IOI), the order may be routed to the destination with the corresponding IOI. In some embodiments, the order may be an Immediate Or Cancel (IOC) order. In some embodiments, a resting order may be routed to a destination sending a matching IOI, even if that IOI arrives after the resting order was initially created.

In some embodiments, an order may be split so that some portion (e.g., half) is routed to destinations based on IOIs and another portion (e.g., half) is routed to destinations not sending IOIs. For example, a dark pool may send IOIs or not send IOIs. In some embodiments, half of an order may be routed to one or more dark pools that send IOIs and the remaining half of the order may be routed to one or more other dark pools not sending IOIs. In some embodiments, matching and execution of a streaming or resting order to a streaming or resting order may be considered a dark pool.

In some embodiments, an order can be split between the open market, destinations sending IOIs, destinations not sending IOIs, and resting orders. The manner of splitting the order may be user selectable. For example, a user can select to route half of an order to the open market, a quarter to destinations sending IOIs and resting orders, and a quarter to destinations not sending IOIs. As another example, the user can select to send 75% to the open market, 12.5% to destinations sending IOIs and resting orders, and 12.5% to destinations not sending IOIs.

Figure 3:
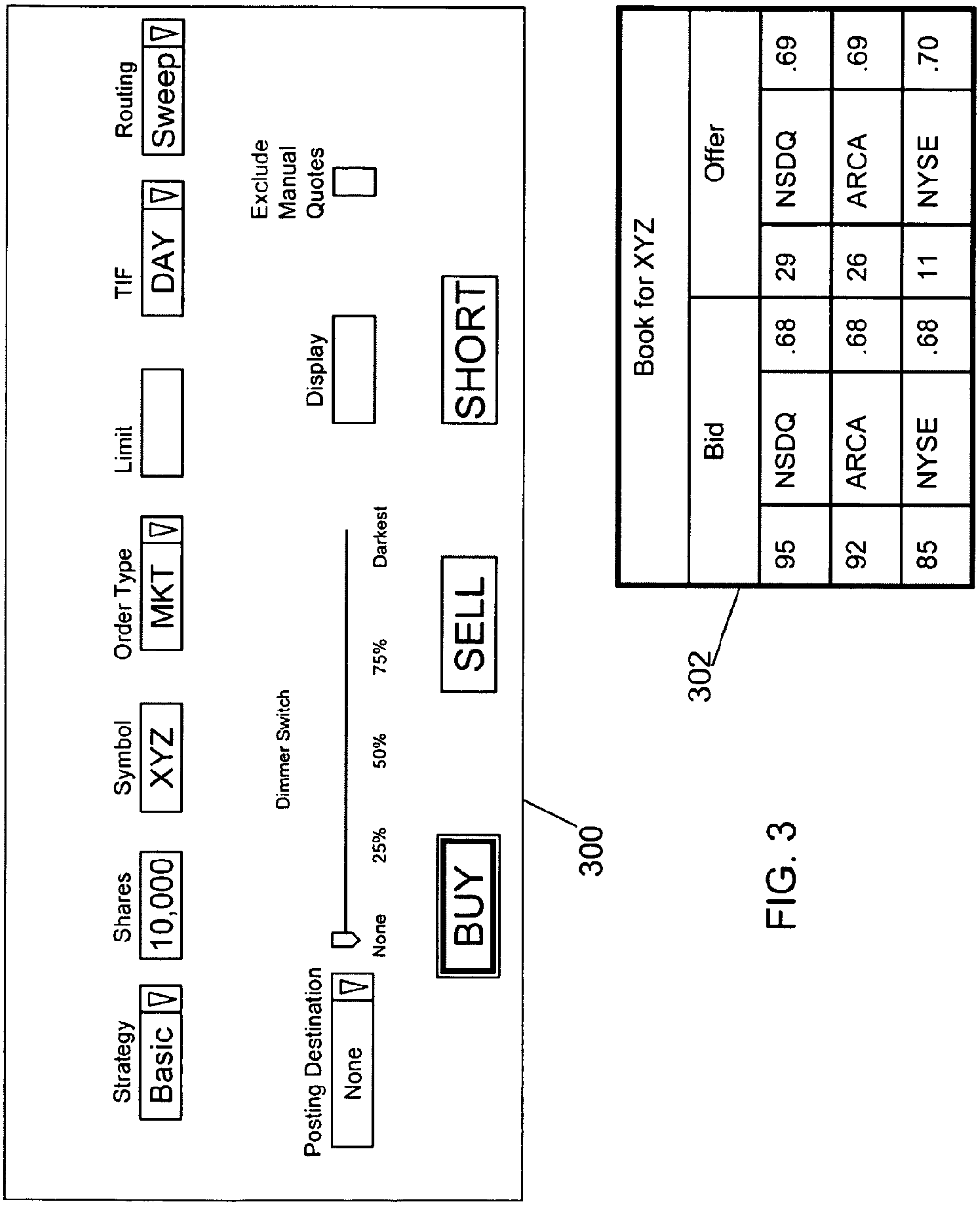

Another example of a user interface for receiving order settings is shown in FIG. 3. As illustrated, using user interface 300, a user may be able to enter an order to buy 10,000 shares of a security at a market price with a TIF of DAY using sweep routing. In such a case, the order may be processed so that orders for the entire unexecuted size (initially 10,000) get sequentially routed by order routing unit 126 (FIG. 1) to the best offers in the open markets. For example, as illustrated in book 302, a first oversized order of 10,000 shares with a limit price of 0.69 may be sent to the top market (in a book of markets for the security) (e.g., NSDQ) showing 2,900 shares (illustrated as "29" in book 302) with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, a third oversized order of 2,400 shares with a limit price of 0.70 may be sent to the next highest market (e.g., NYSE) in the book showing 1,100 shares with an offer price of 0.70. This process may continue until all of the shares in the order are executed or the TIF of the order has elapsed.

As another example, using a user interface 400 illustrated in FIG. 4, a user may be able to enter an order to buy 10,000 shares of a security with a limit price of 0.69 and a TIF of DAY using sweep routing and a display size of 500. In such a case, the order may be processed so that orders for the entire unexecuted size (initially 10,000) get sequentially routed by order routing unit 126 (FIG. 1) to the best offers in the open markets with a maximum price of 0.69. For example, as shown in book 402, a first oversized order of 10,000 shares with a limit price of 0.69 may be sent to the top market (in a book of markets for the security) (e.g., NSDQ) showing 2,900 shares with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, and when no other offers meet the 0.69 limit, a post to any suitable market (such as the most-quoted market as illustrated by book 602 and posting destination menu 609) may be made at a size of 2,400, a limit price of 0.69, a display size of 500 (per display field 211), and a reserve size of 1,900. This post may remain in the suitable market until all size is executed, or until the end of the TIF.

Figure 5:
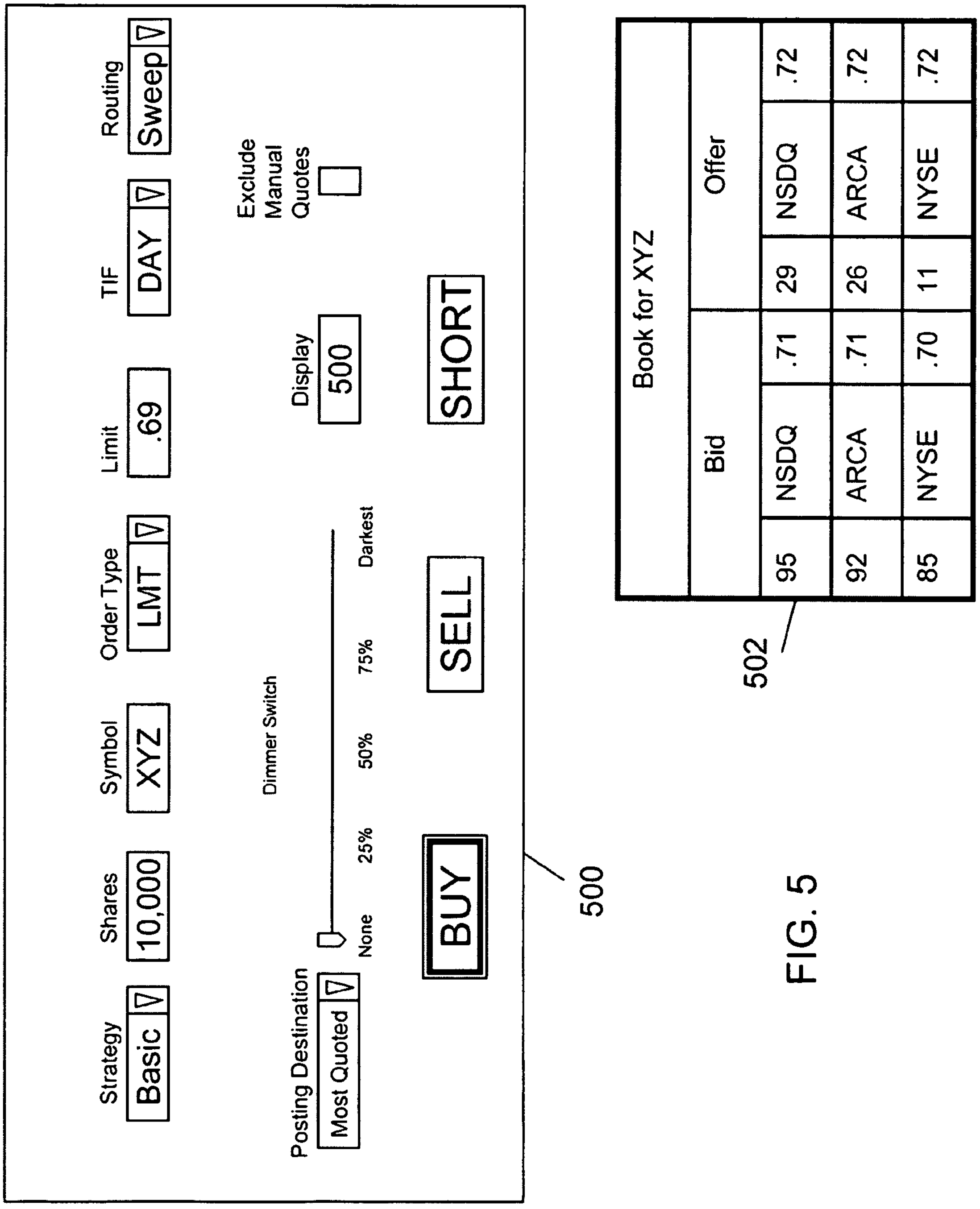

As another example, using a user interface 500 illustrated in FIG. 5, a user may be able to enter a buy order to buy 10,000 shares of a security at a limit price of 0.69. If the best offers in the markets for the security are all in excess of the limit of 0.69 as shown in book 502, the order may be considered to be non-marketable and thus may be posted to any suitable market (such as the most-quoted market as illustrated).

Figure 6:
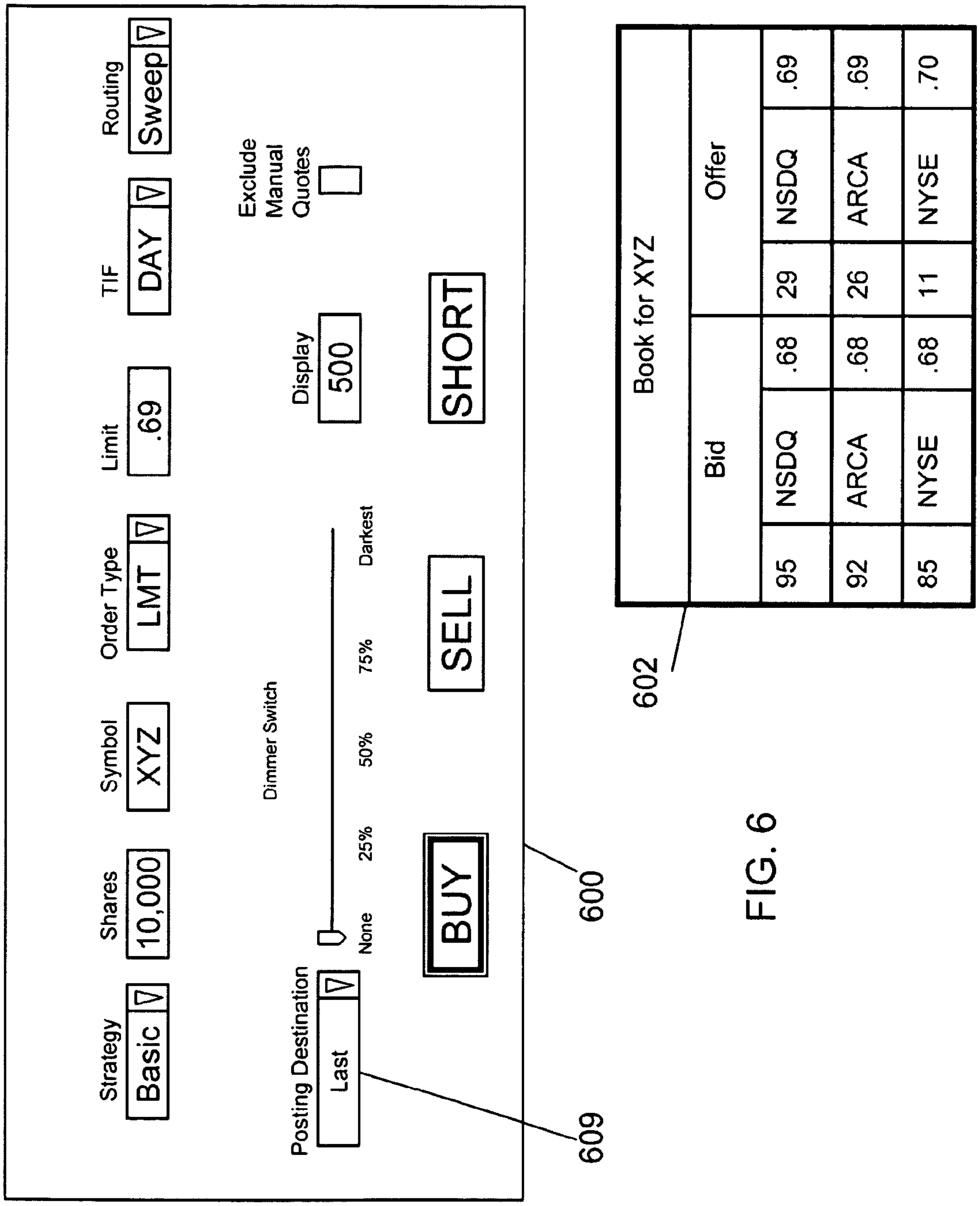

As another example, using a user interface 600 illustrated in FIG. 6, a user may be able to enter an order to buy 10,000 shares of a security with a limit price of 0.69 and a TIF of DAY using sweep routing and a display size of 500. In such a case, the order may be processed so that orders for the entire unexecuted size (initially 10,000) get sequentially routed by order routing unit 126 (FIG. 1) to the best offers in the open markets with a maximum price of 0.69. For example, as shown in book 602, a first oversized order of 10,000 shares with a limit price of 0.69 may be sent to the top market (in a book of markets for the security) (e.g., NSDQ) showing 2,900 shares with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, and when no other offers meet the 0.69 limit, a post to any suitable market (such as the last market, ARCA, as illustrated) may be made at a size of 2,400, a limit price of 0.69, a display size of 500, and a reserve size of 1,900. This post may remain in the suitable market until all size is executed, or until the end of the TIF.

Figure 7:
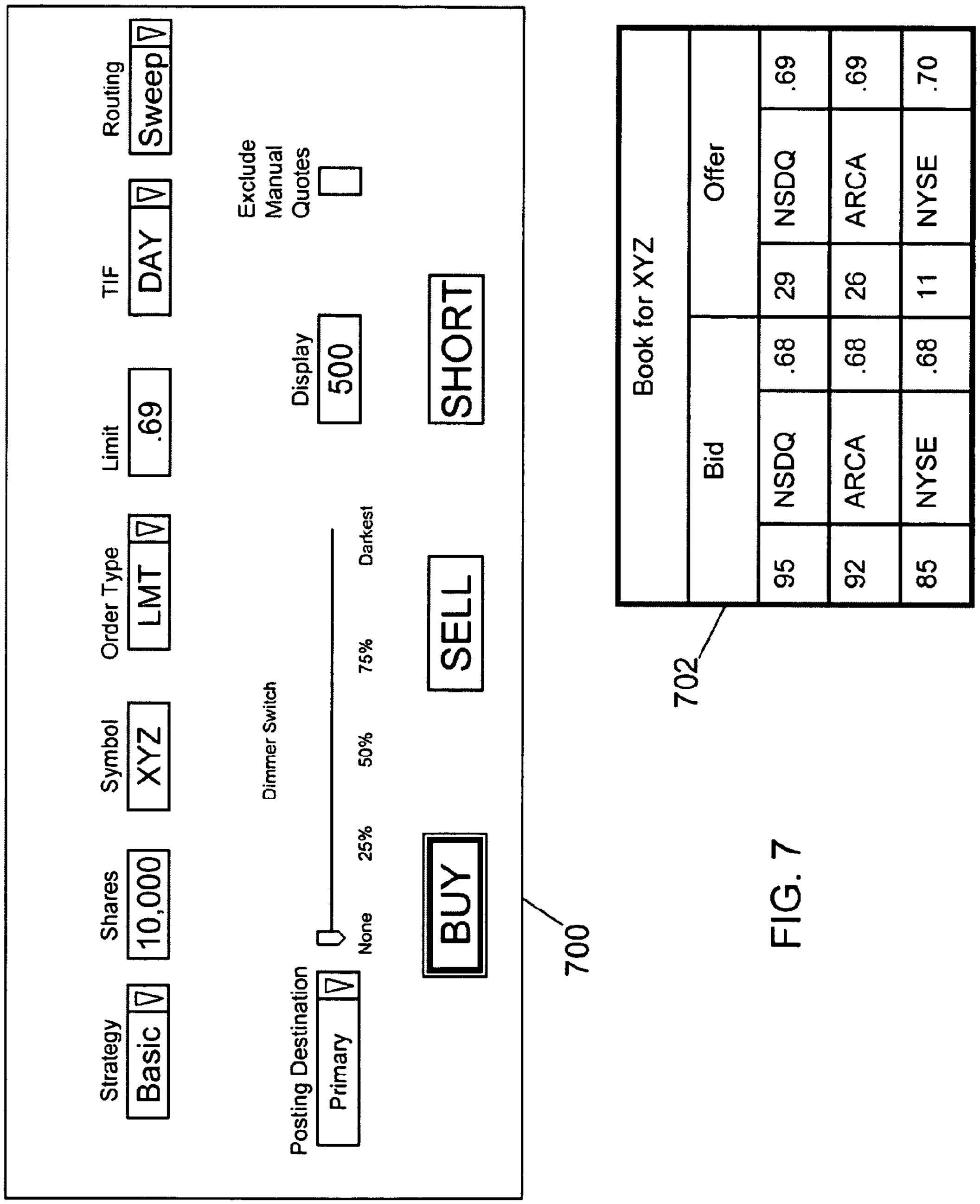

As another example, using a user interface 700 illustrated in FIG. 7, a user may be able to enter an order to buy 10,000 shares of a security with a limit price of 0.69 and a TIF of DAY using sweep routing and a display size of 500. In such a case, the order may be processed so that orders for the entire unexecuted size (initially 10,000) get sequentially routed by order routing unit 126 (FIG. 1) to the best offers in the open markets with a maximum price of 0.69. For example, as shown in book 702, a first oversized order of 10,000 shares with a limit price of 0.69 may be sent to the top market (in a book of markets for the security) (e.g., NSDQ) showing 2,900 shares with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, and when no other offers meet the 0.69 limit, a post to any suitable market (such as the primary market as illustrated) may be made at a size of 2,400, a limit price of 0.69, a display size of 500, and a reserve size of 1,900. This post may remain in the suitable market until all size is executed, or until the end of the TIF.

Figure 8:
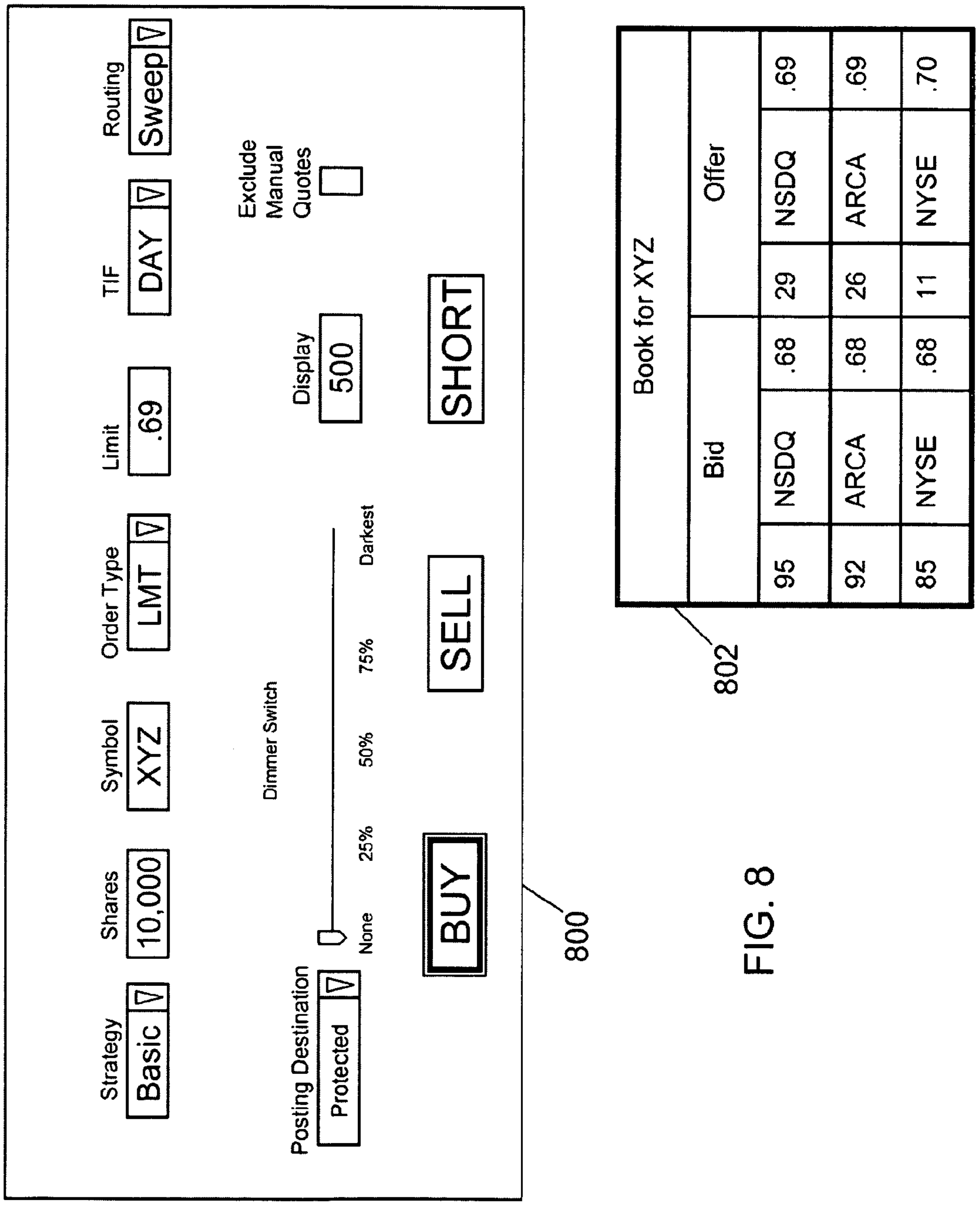

As another example, using a user interface 800 illustrated in FIG. 8, a user may be able to enter an order to buy 10,000 shares of a security with a limit price of 0.69 and a TIF of DAY using sweep routing and a display size of 500. In such a case, the order may be processed so that orders for the entire unexecuted size (initially 10,000) get sequentially routed by order routing unit 126 (FIG. 1) to the best offers in the open markets with a maximum price of 0.69. For example, as shown in book 802, a first oversized order of 10,000 shares with a limit price of 0.69 may be sent to the top market (in a book of markets for the security) (e.g., NSDQ) showing 2,900 shares with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, and when no other offers meet the 0.69 limit, a post of a protected order to any suitable market (such as a protected market as illustrated) may be made at a size of 2,400, a limit price of 0.69, a display size of 500, and a reserve size of 1,900. This post may remain in the suitable market until all size is executed, or until the end of the TIF.

Figure 9:
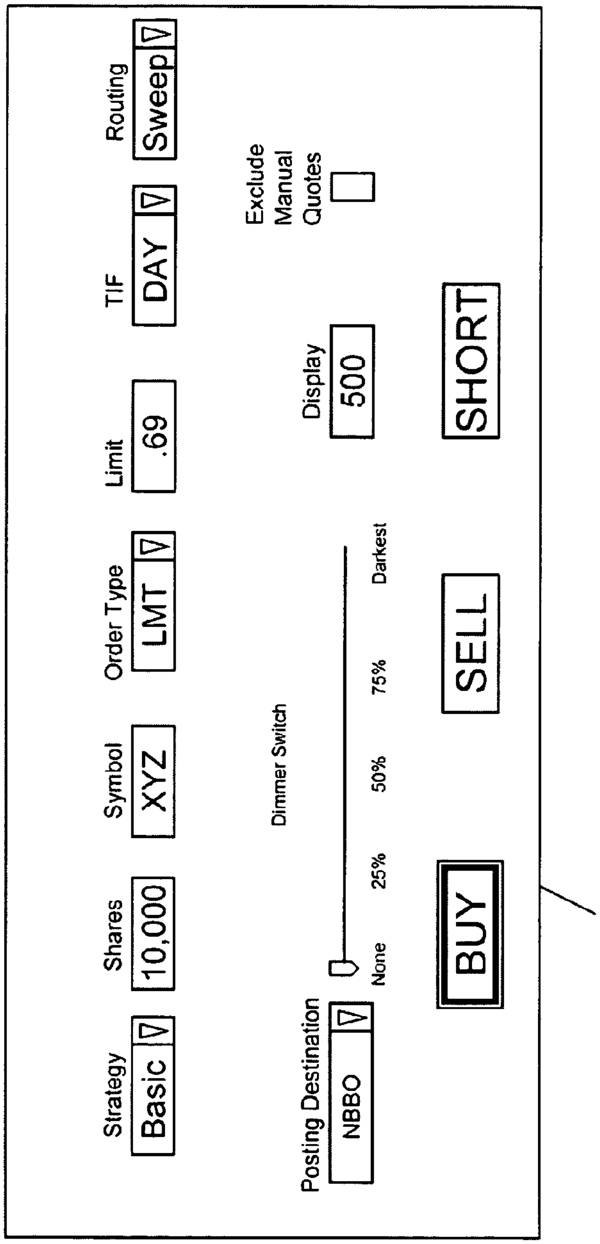

As another example, using a user interface 900 illustrated in FIG. 9, a user may be able to enter an order to buy 10,000 shares of a security with a limit price of 0.69 and a TIF of DAY using sweep routing and a display size of 500. In such a case, the order may be processed so that orders for the entire unexecuted size (initially 10,000) get sequentially routed by order routing unit 126 (FIG. 1) to the best offers in the open markets with a maximum price of 0.69. For example, as shown in book 902, a first oversized order of 10,000 shares with a limit price of 0.69 may be sent to the top market (in a book of markets for the security) (e.g., NSDQ) showing 2,900 shares with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, and when no other offers meet the 0.69 limit, a post to any suitable market (such as the NBBO market as illustrated) may be made at a size of 2,400, a limit price of 0.69, a display size of 500, and a reserve size of 1,900. This post may remain in the suitable market until all size is executed, or until the end of the TIF.

Figure 10:
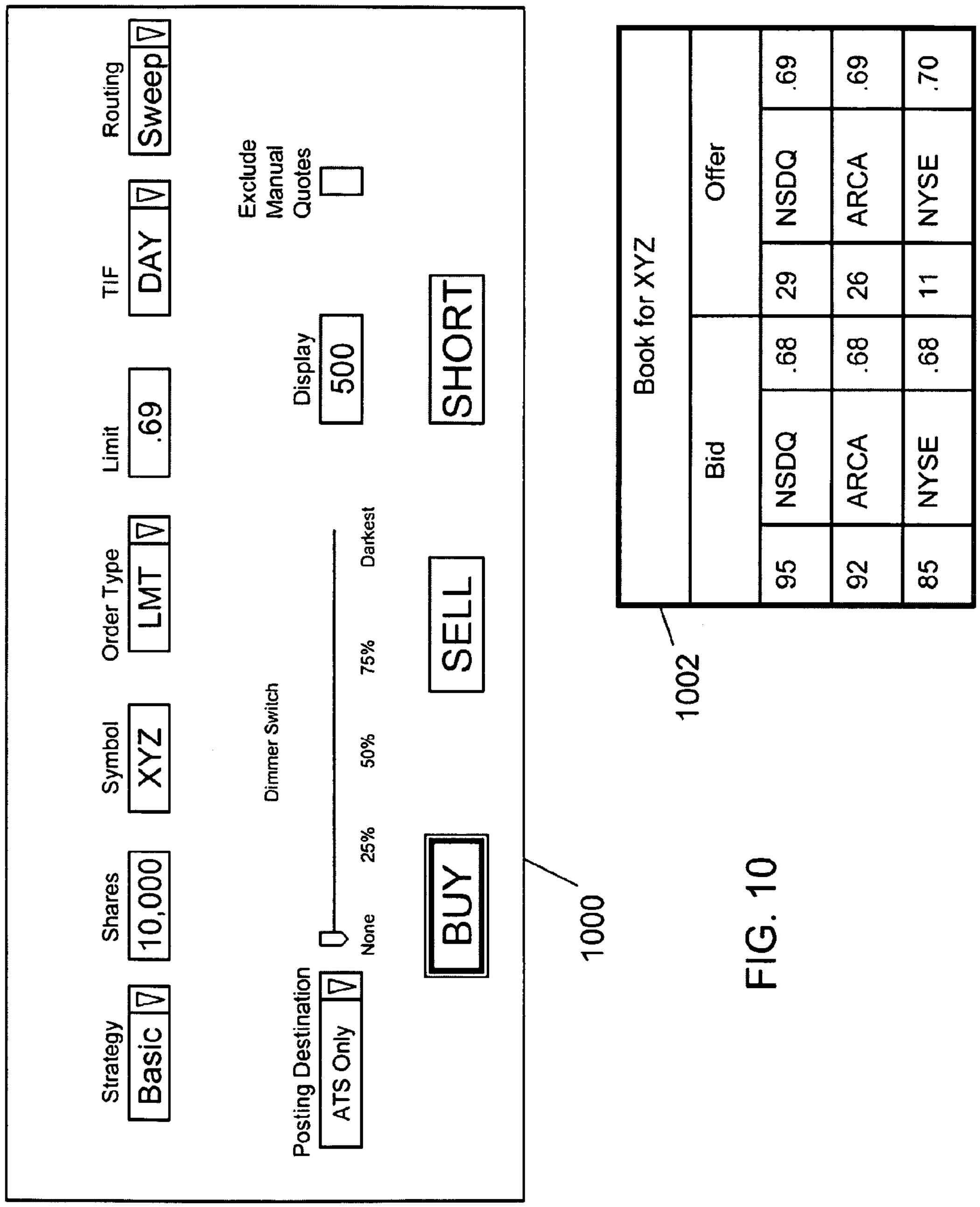

As another example, using a user interface 1000 illustrated in FIG. 10, a user may be able to enter an order to buy 10,000 shares of a security with a limit price of 0.69 and a TIF of DAY using sweep routing and a display size of 500. In such a case, the order may be processed so that orders for the entire unexecuted size (initially 10,000) get sequentially routed by order routing unit 126 (FIG. 1) to the best offers in the open markets with a maximum price of 0.69. For example, as shown in book 1002, a first oversized order of 10,000 shares with a limit price of 0.69 may be sent to the top market (in a book of markets for the security) (e.g., NSDQ) showing 2,900 shares with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, and when no other offers meet the 0.69 limit, a post to any suitable market (such as the ATS only market as illustrated) may be made at a size of 2,400, a limit price of 0.69, a display size of 500, and a reserve size of 1,900. This post may remain in the suitable market until all size is executed, or until the end of the TIF.

Figure 11:
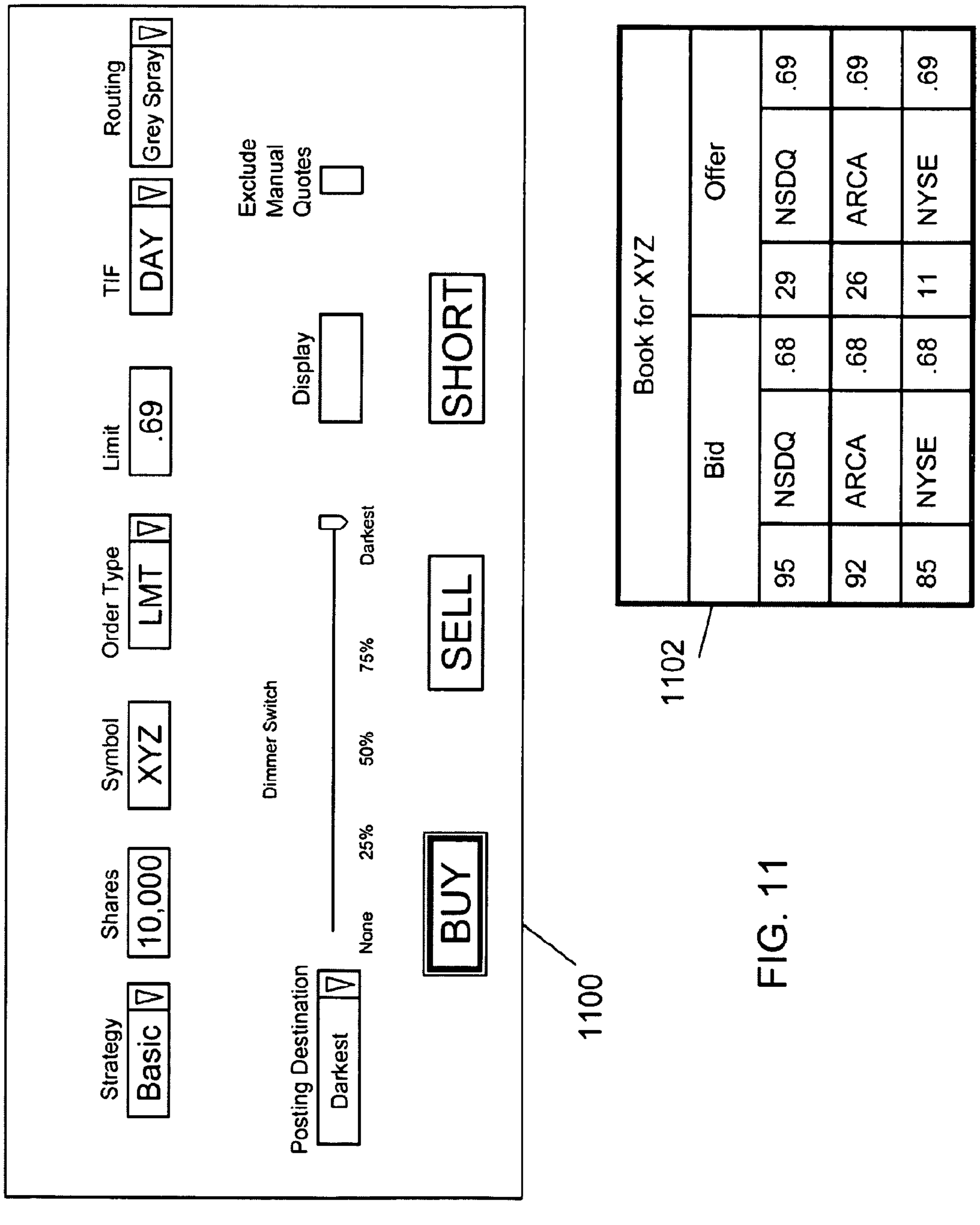

As another example, using a user interface 1100 illustrated in FIG. 11, a user may be able to enter an order to buy 10,000 shares of a security with a limit price of 0.69 and a TIF of DAY using grey spray routing and no display size. "Grey" spray routing is a routing in which some percentage of the routing is done to open markets and the remaining portion is done to dark ATSs and/or ELPs. The percentage may be fixed (e.g., 50% to open markets and 50% to one or more ATSs and/or ELPs) or may be user configurable (e.g., using any suitable user input mechanism (such as an entry field or a slider). For example, in such a case, the order may be processed so that orders for 50% (or any other suitable amount) of the entire size (10,000) get nearly simultaneously routed by order routing unit 126 (FIG. 1) to the best offers in the open markets with a maximum price of 0.69. The size of the orders may be equal, nearly equal, weighted by display size, or based on any suitable criteria or criterion. As a more particular example, as shown in book 1102, a first ISO order of 1,700 shares with a limit price of 0.69 may be sent to the top market (in a book of markets for the security) (e.g., NSDQ) showing 2,900 shares with an offer price of 0.69. At nearly the same time, a second ISO order of 1,700 shares with a limit price of 0.69 may be sent to the next highest market (e.g., ARCA) in the book showing 2,600 shares with an offer price of 0.69. Also at nearly the same time, a third oversized ISO order of 1,600 shares with a limit price of 0.69 may be sent to the next highest market (e.g., NYSE) in the book showing 1,100 shares with an offer price of 0.69. Still also at nearly the same time, orders for the remaining 50% (or any other suitable amount) of the user's order may be sent to an ATS and/or an electronic liquidity provider (ELP) (e.g., such as a dark pool). For example, 50% of the remaining size (i.e., 25% of the user's order) may be sent to an ATS and 50% of the remaining size (i.e., 25% of the user's order) may be sent to an ELP.

As another example, using a user interface 1200 illustrated in FIG. 12, a user may be able to enter an order to buy 10,000 shares of a security with a limit price of 0.69 and a TIF of DAY using spray routing and a display size of 500. In such a case, the order may be processed so that orders for the entire size (10,000) get nearly simultaneously routed by order routing unit 126 (FIG. 1) to the best offers in the open markets with a maximum price of 0.69. The sizes of the orders may be equal, nearly equal, weighted by display size, or based on any suitable criteria or criterion. For example, as shown in book 1202, a first oversized ISO order of 3,400 shares with a limit price of 0.69 may be sent to the top market (in a book of markets for the security) (e.g., NSDQ) showing 2,900 shares with an offer price of 0.69. At nearly the same time, a second oversized ISO order of 3,300 shares with a limit price of 0.69 may be sent to the next highest market (e.g., ARCA) in the book showing 2,600 shares with an offer price of 0.69. Also at nearly the same time, a third oversized ISO order of 3,300 shares with a limit price of 0.69 may be sent to the next highest market (e.g., NYSE) in the book showing 1,100 shares with an offer price of 0.69. After an execution in those markets for a total of 6,600 shares, a post to any suitable market (such as the most-quoted market as illustrated) may be made at a size of 3,400, a limit price of 0.69, a display size of 500, and a reserve size of 2,900. This post may remain in the suitable market until all size is executed, or until the end of the TIF.

Figure 13:
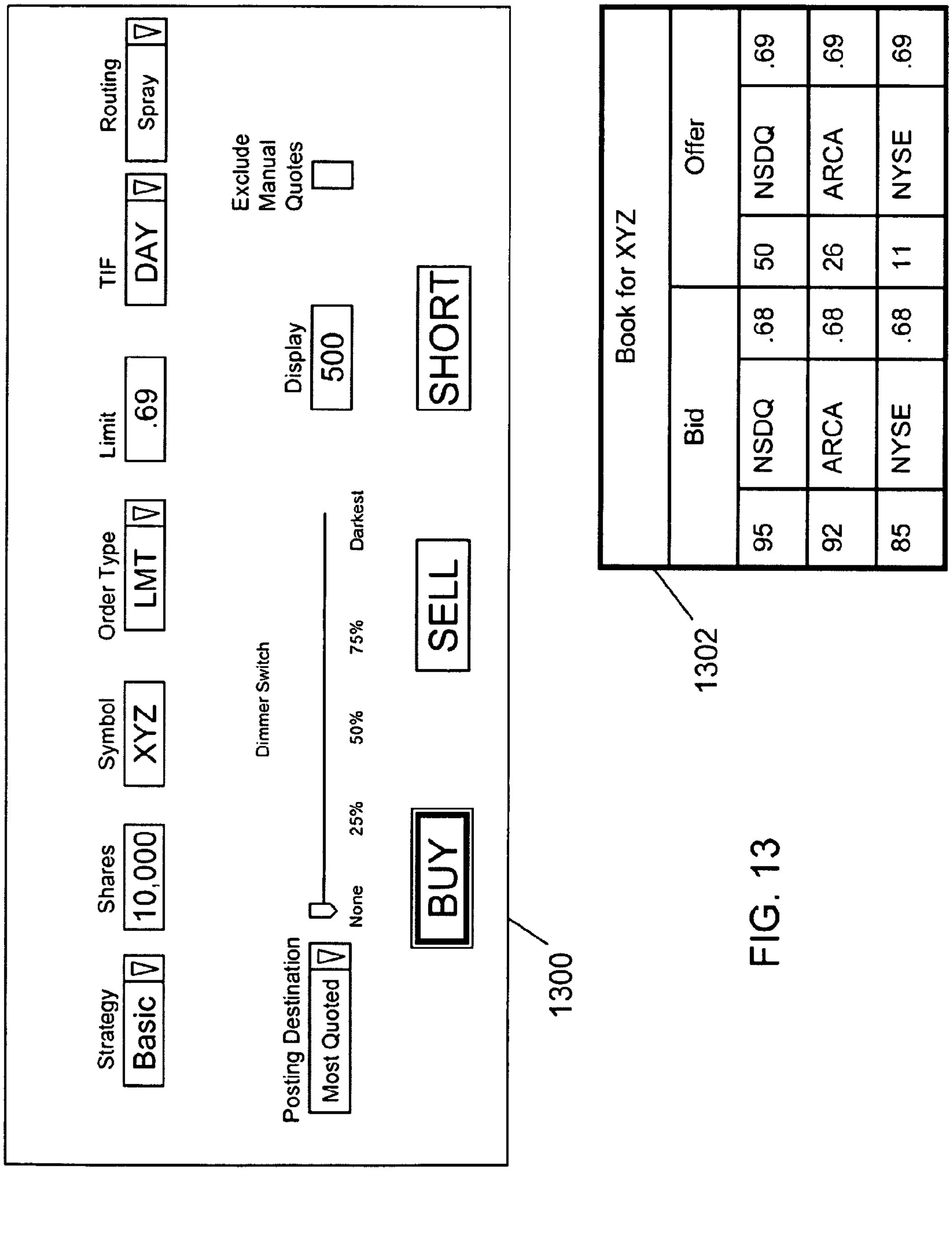

As another example, using a user interface 1300 illustrated in FIG. 13, a user may be able to enter an order to buy 10,000 shares of a security with a limit price of 0.69 and a TIF of DAY using spray routing and a display size of 500. In such a case, the order may be processed so that orders for the entire size (10,000) get nearly simultaneously routed by order routing unit 126 (FIG. 1) to the best offers in the open markets with a maximum price of 0.69. The sizes of the orders may be equal, nearly equal, weighted by display size, or based on any suitable criteria or criterion. For example, the sizes of the orders may be based on the sized being displayed by the best offer in each market plus a nearly equal share of the size above the total size displayed in each market. As a more particular example, as shown in book 1302, a first oversized ISO order of 5,500 shares (i.e., 5,000 displayed plus 500 split of remaining shares) with a limit price of 0.69 may be sent to the top market (in a book of markets for the security) (e.g., NSDQ) showing 5,000 shares with an offer price of 0.69. At nearly the same time, a second oversized ISO order of 3,000 shares (i.e., 2,600 displayed plus 400 split of remaining shares) with a limit price of 0.69 may be sent to the next highest market (e.g., ARCA) in the book showing 2,600 shares with an offer price of 0.69. Also at nearly the same time, a third oversized ISO order of 1,500 shares (i.e., 1,100 displayed plus 400 split of remaining shares) with a limit price of 0.69 may be sent to the next highest market (e.g., NYSE) in the book showing 1,100 shares with an offer price of 0.69. After an execution in those market for a total of 8,700 shares, a post to any suitable market (such as the most-quoted market as illustrated) may be made at a size of 1,300, a limit price of 0.69, a display size of 500, and a reserve size of 800. This post may remain in the suitable market until all size is executed, or until the end of the TIF.

Figure 14:
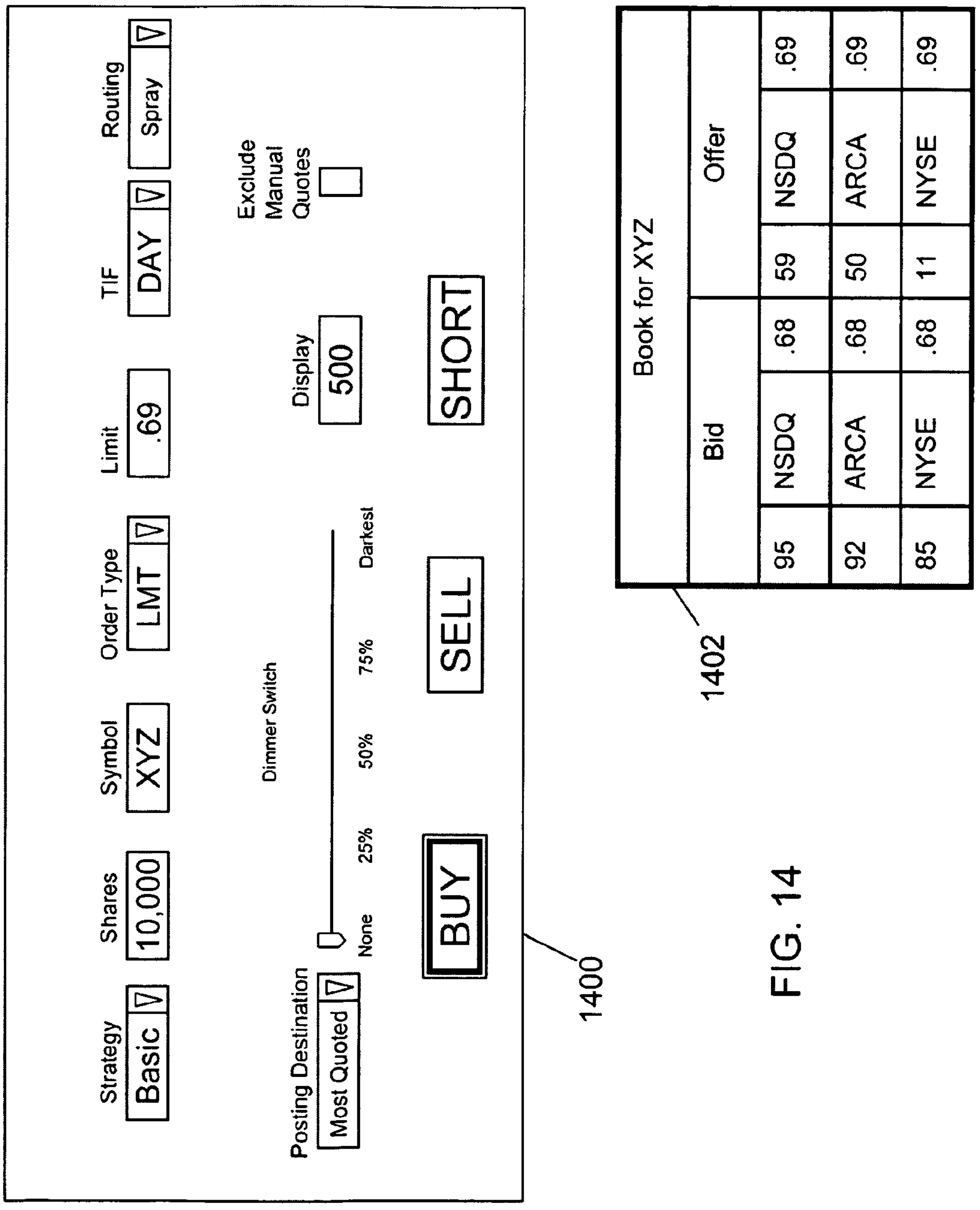

As another example, using a user interface 1400 such as that illustrated in FIG. 14, a user may be able to enter an order to buy 10,000 shares of a security with a limit price of 0.69 and a TIF of DAY using spray routing and a display size of 500. In such a case, the order may be processed so that orders for the entire size (10,000) get nearly simultaneously routed by order routing unit 126 (FIG. 1) to the best offers in the open markets with a maximum price of 0.69. The sizes of the orders may be equal, nearly equal, weighted by display size, or based on any suitable criteria or criterion. For example, the sizes of the orders may be based on the sizes being displayed by the best offer in each market so that each of the markets gets at most its display size with priority being given to markets higher in the book. As a more particular example, as shown in book 1402, a first ISO order of 5,900 shares with a limit price of 0.69 may be sent to the top market (in a book of markets for the security) (e.g., NSDQ) showing 5,900 shares with an offer price of 0.69. At nearly the same time, a second ISO order of 4,100 shares (i.e., 10,000 total shares minus 5,900 shares in the first order) with a limit price of 0.69 may be sent to the next highest market (e.g., ARCA) in the book showing 5,000 shares with an offer price of 0.69. If any portion of these shares is not executed, a post to any suitable market (such as the most-quoted market as illustrated) may be made for the remaining size, a limit price of 0.69, and a display size of 500. This post may remain in the suitable market until all size is executed, or until the end of the TIF.

Figure 15:
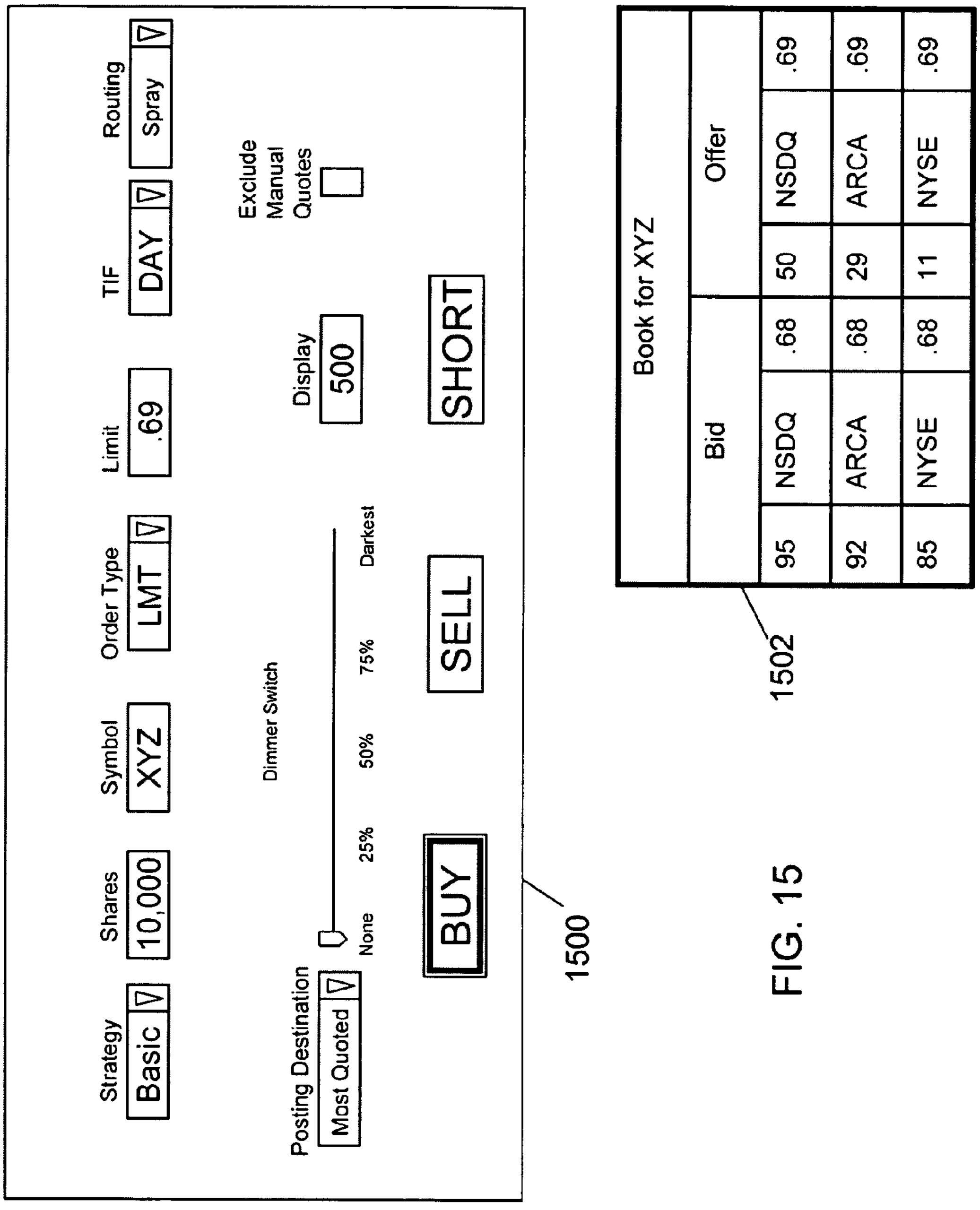

As another example, using a user interface 1500 illustrated in FIG. 15, a user may be able to enter an order to buy 10,000 shares of a security with a limit price of 0.69 and a TIF of DAY using spray routing and a display size of 500. In such a case, the order may be processed so that orders for the entire size (10,000) get nearly simultaneously routed by order routing unit 126 (FIG. 1) to the best offers in the open markets with a maximum price of 0.69. The sizes of the orders may be equal, nearly equal, weighted by display size, or based on any suitable criteria or criterion. For example, the sizes of the orders may be based on whether the corresponding market is protected. If a market is not protected, then the order to that market may be limited to the display size for that market. If a market is protected, then the order to that market may have a size that is the display size for that market plus a near equal portion of the size remaining of the user's order after subtracting all of the display sizes. As a more particular example, as shown in book 1502, a first oversized ISO order of 5,500 shares (i.e., 5,000 displayed shares plus 500 of the remaining shares) with a limit price of 0.69 may be sent to the top market (in a book of markets for the security) (e.g., NSDQ) showing 5,000 shares with an offer price of 0.69. At nearly the same time, a second oversized ISO order of 3,400 shares (i.e., 2,900 displayed shares plus 500 of the remaining shares) with a limit price of 0.69 may be sent to the next highest market (e.g., ARCA) in the book showing 2,900 shares with an offer price of 0.69. Also at nearly the same time, a third ISO order of 1,100 shares with a limit price of 0.69 may be sent to the next highest, unprotected market (e.g., NYSE) in the book showing 1,100 shares with an offer price of 0.69. If any portion of these shares is not executed, a post to any suitable market (such as the most-quoted market as illustrated) may be made for the remaining size, a limit price of 0.69, and a display size of 500. This post may remain in the suitable market until all size is executed, or until the end of the TIF.

As another example, using a user interface 1600 illustrated in FIG. 16, a user may be able to enter an order to buy 10,000 shares of a security with a limit price of 0.69 and a TIF of DAY using grey sweep routing and a display size of 500. "Grey" sweep routing is a routing in which some percentage of the routing is done to open markets and the remaining portion is done to dark ATSs and/or ELPs. In such a case, the order may be processed so that orders for the unexecuted portion of 50% (or any other suitable amount) of the entire size (10,000) get sequentially routed by order routing unit 126 (FIG. 1) to the best offers in the open markets with a maximum price of 0.69. For example, as shown in book 1602, a first oversized ISO order of 5,000 shares with a limit price of 0.69 may be sent to the top market (in a book of markets for the security) (e.g., NSDQ) showing 1,500 shares with an offer price of 0.69. After execution of 1,500 shares, a second oversized ISO order of 3,500 shares with a limit price of 0.69 may be sent to the next highest market (e.g., ARCA) in the book showing 1,400 shares with an offer price of 0.69. After execution of 1,400 shares, a third oversized ISO order of 2,100 shares with a limit price of 0.69 may be sent to the next highest market (e.g., NYSE) in the book showing 1,100 shares with an offer price of 0.69. At nearly the same time as the first order, orders for the remaining 50% (or any other suitable amount) of the user's order may be sent to an ATS and/or an electronic liquidity provider (ELP) (e.g., such as a dark pool). For example, 50% of the remaining size (i.e., 25% of the user's order) may be sent to an ATS and 50% of the remaining size (i.e., 25% of the user's order) may be sent to an ELP. Any remaining unexecuted shares after the third order may be combined with any unexecuted shares from the ATS and ELP, and posted to any suitable market (such as the most-quoted market). This post may remain in the suitable market until all size is executed, or until the end of the TIF.

As another example, using a user interface 1700 illustrated in FIG. 17, a user may be able to enter an order to buy 10,000 shares of a security with a limit price of 0.69 and a TIF of DAY using grey spray routing and no display size. In such a case, the order may be processed so that orders for 50% (or any other suitable amount) of the entire size (10,000) get nearly simultaneously routed by order routing unit 126 (FIG. 1) to the best offers in the open markets with a maximum price of 0.69. The size of the orders may be equal, nearly equal, weighted by display size, or based on any suitable criteria or criterion. For example, all of the 50% (or any other suitable amount) of the entire size may be allocated to one market if the market is at the top of the book of markets for the security and that market is displaying a greater size. As a more particular example, as shown in book 1702 a first ISO order of 5,000 shares with a limit price of 0.69 may be sent to the top market (e.g., NSDQ) showing 5,400 shares with an offer price of 0.69. At nearly the same time, orders for the remaining 50% (or any other suitable amount) of the user's order may be sent to one or more ATSs and/or ELPs (e.g., such as one or more dark pools). For example, 50% of the remaining size (i.e., 25% of the user's order) may be sent to an ATS and 50% of the remaining size (i.e., 25% of the user's order) may be sent to an ELP.

Figure 18:
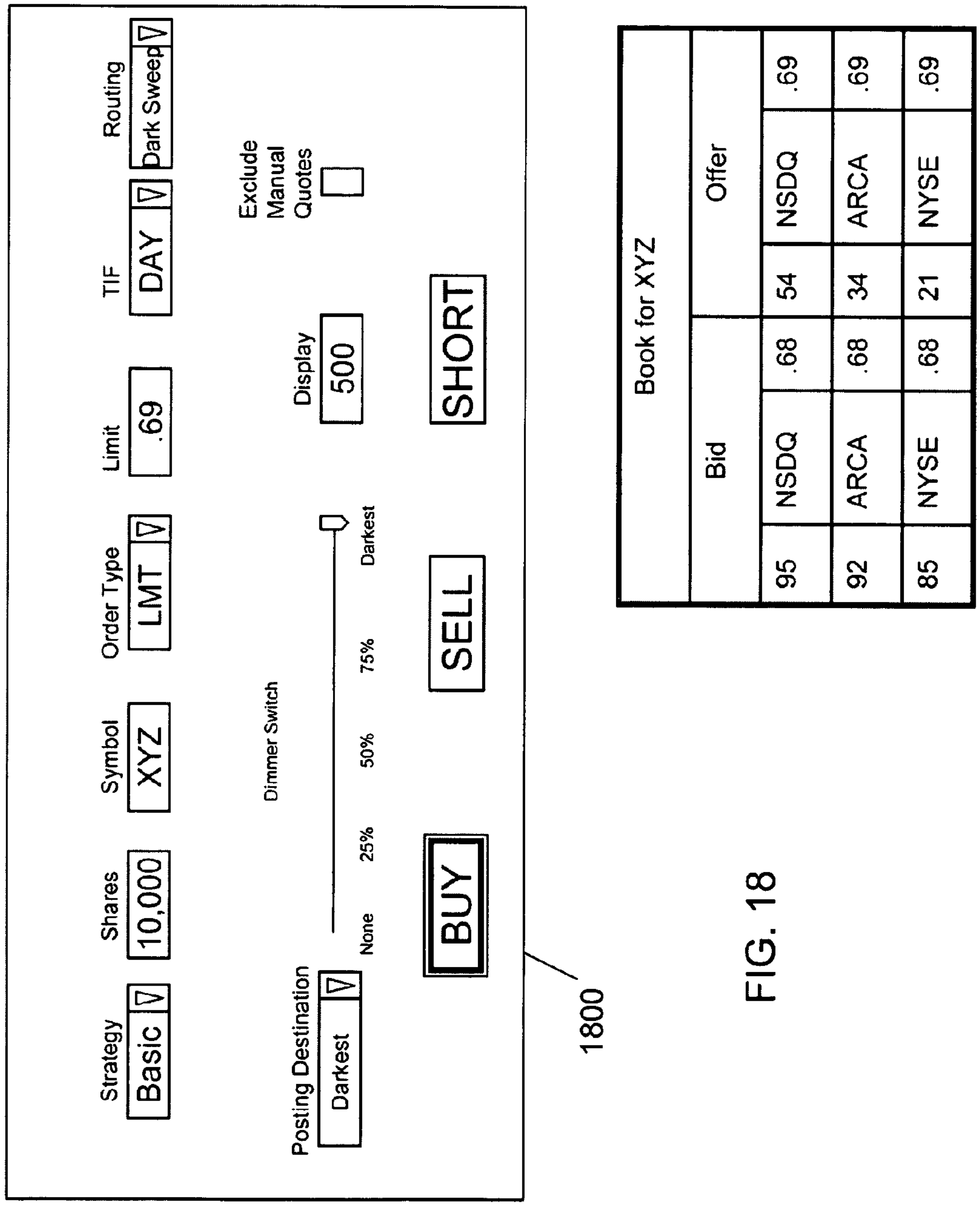

As another example, using a user interface 1800 illustrated in FIG. 18, a user may be able to enter an order to buy 10,000 shares of a security with a limit price of 0.69 and a TIF of DAY using dark sweep routing and no display size. In such a case, the order may be processed so that orders for the entire size (10,000) get sequentially routed by order routing unit 126 (FIG. 1) to different ATSs and/or ELPs (e.g., such as dark pools) and none to the open markets because of the "Dark Sweep" routing setting. For example, 50% of the size of the user's order may be sent to an ATS and 50% of the size of the user's order may be sent to an ELP.

Figure 19:
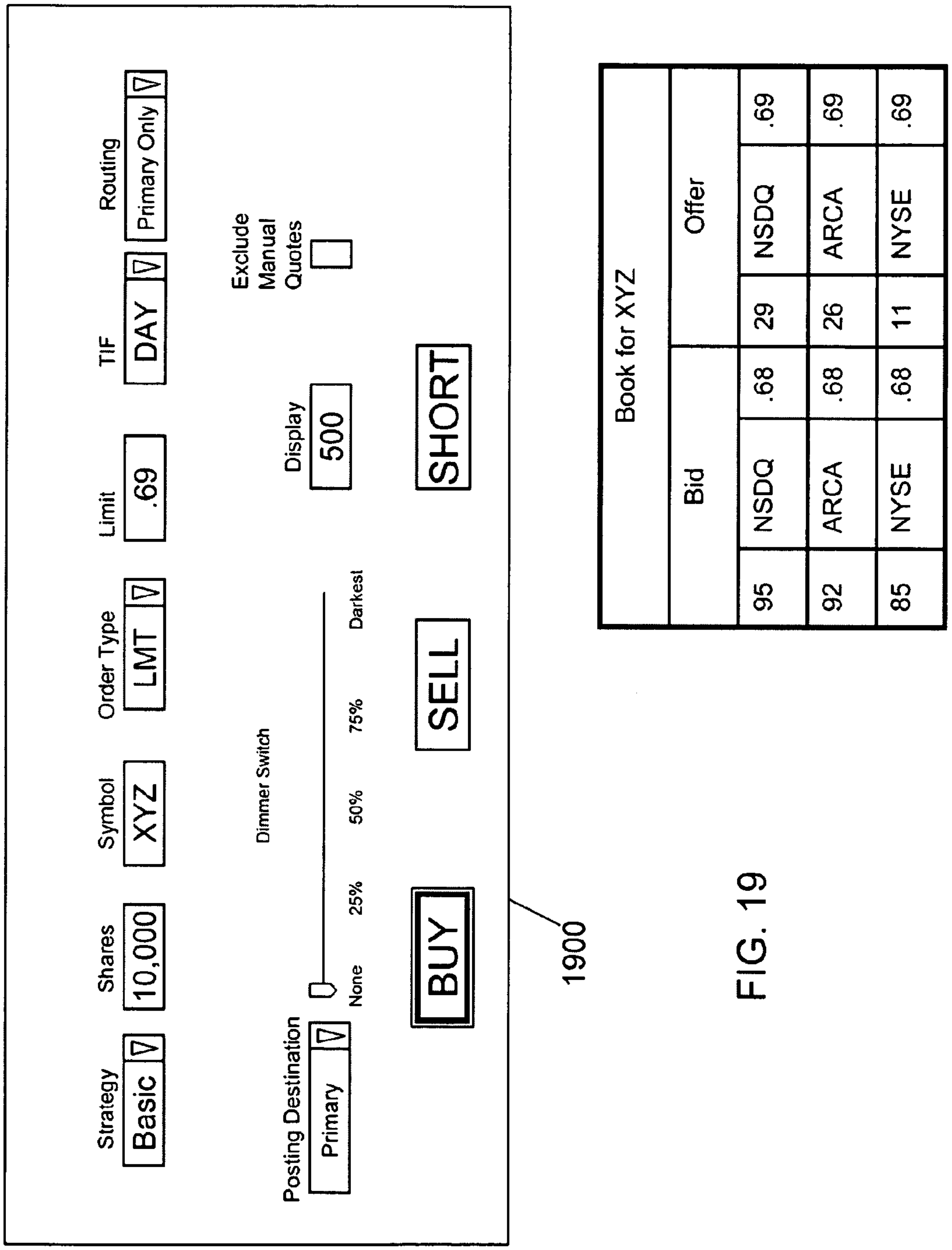

As another example, using a user interface 1900 illustrated in FIG. 19, a user may be able to enter an order to buy 10,000 shares of a security with a limit price of 0.69 and a TIF of DAY using primary only routing and a display size of 500. In such a case, the order may be processed so that an order for the entire size (10,000) gets routed by order routing unit 126 (FIG. 1) to the primary market for the security with a maximum price of 0.69.

Figure 20:
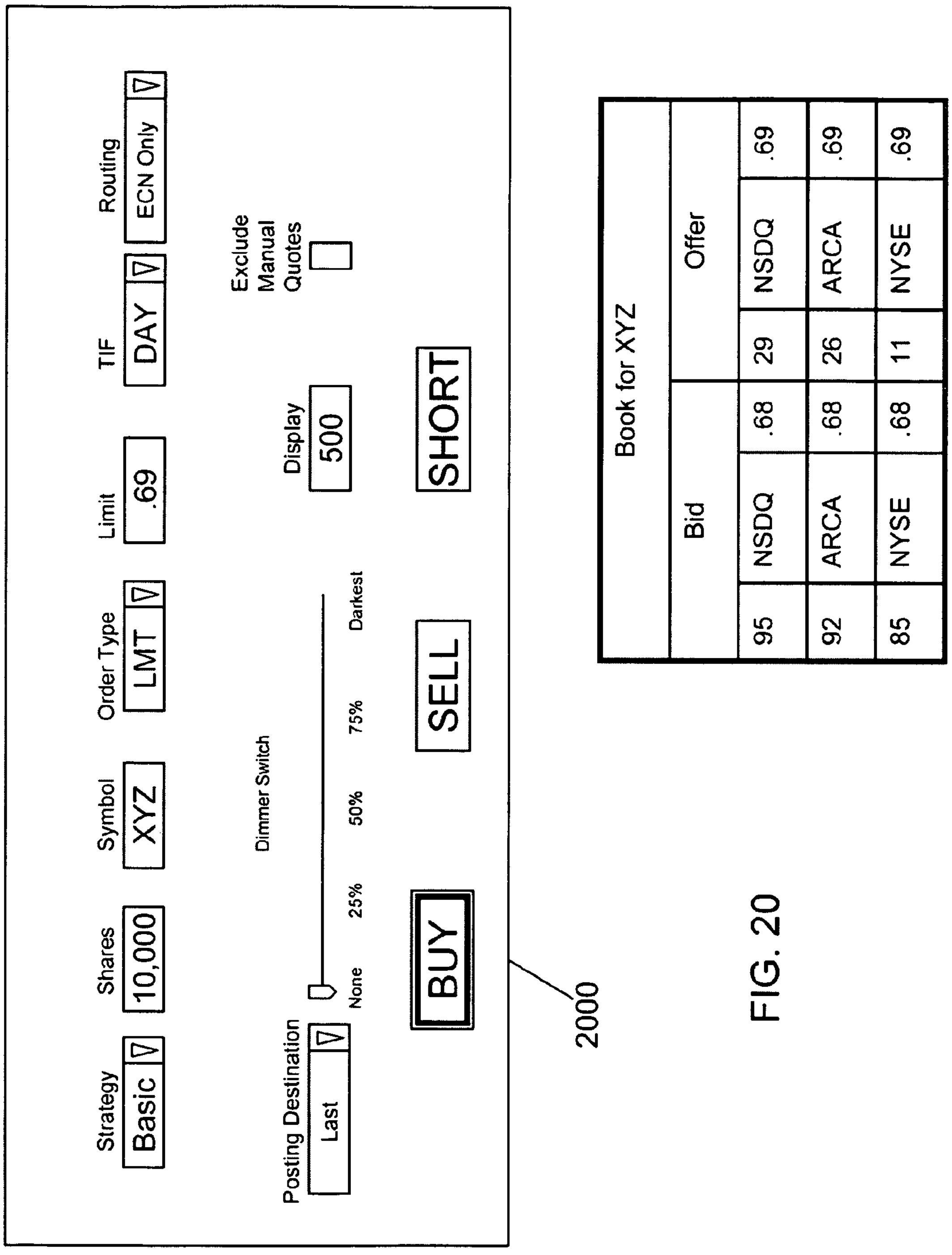

As another example, using a user interface 2000 illustrated in FIG. 20, a user may be able to enter an order to buy 10,000 shares of a security with a limit price of 0.69 and a TIF of DAY using ECN only routing and a display size of 500. In such a case, the order may be processed so that an order for the entire size (10,000) gets routed by order routing unit 126 (FIG. 1) to an ECN with a maximum price of 0.69. If no ECN is available to receive the order, the order may be held until an ECN is available.

Figure 21:
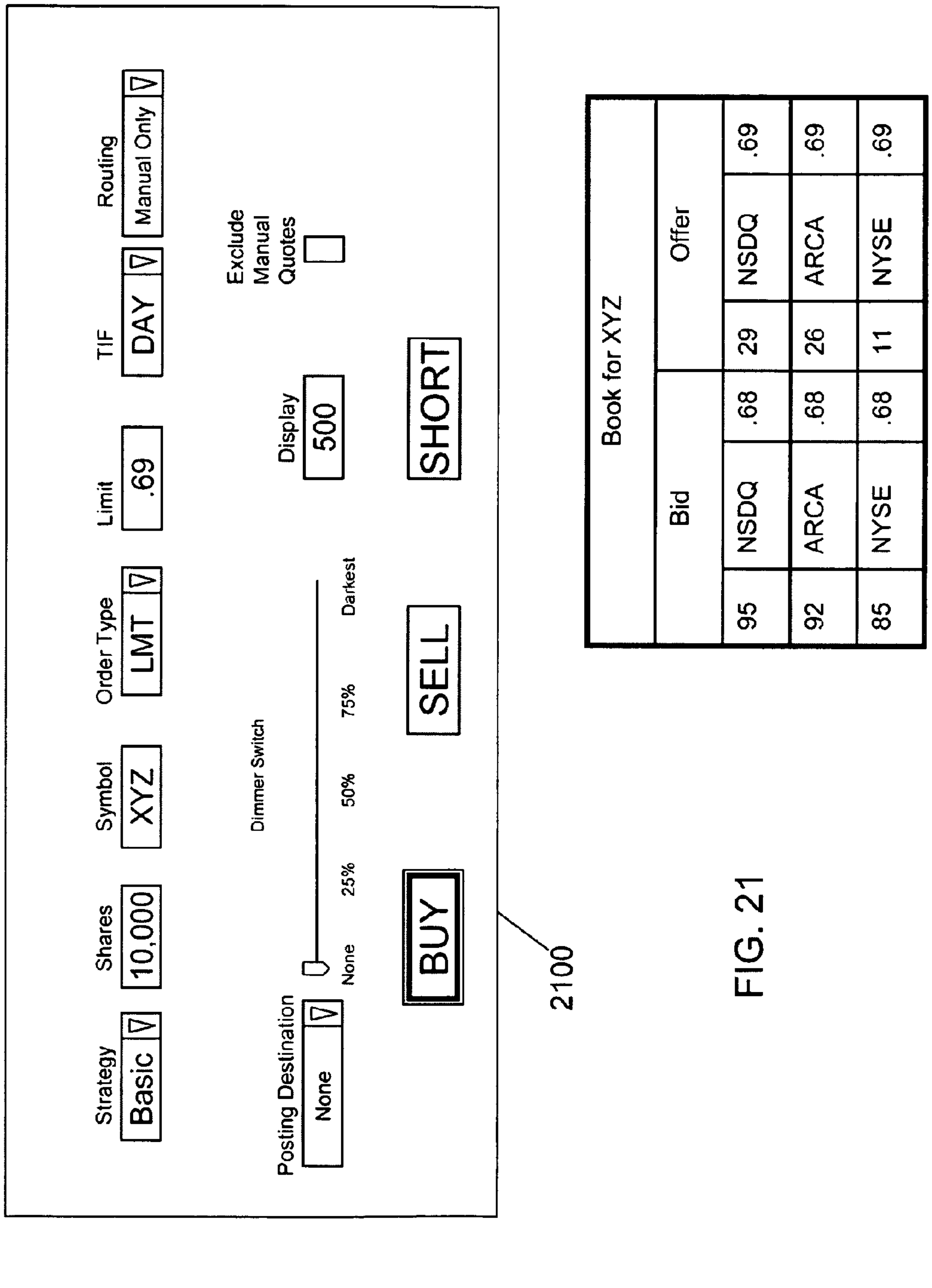

As another example, using a user interface 2100 illustrated in FIG. 21, a user may be able to enter an order to buy 10,000 shares of a security with a limit price of 0.69 and a TIF of DAY using manual only routing and a display size of 500. In such a case, the order may be processed so that an order for the entire size (10,000) gets routed by order routing unit 126 (FIG. 1) to a market having manual quotes with a maximum price of 0.69.

Figure 22:
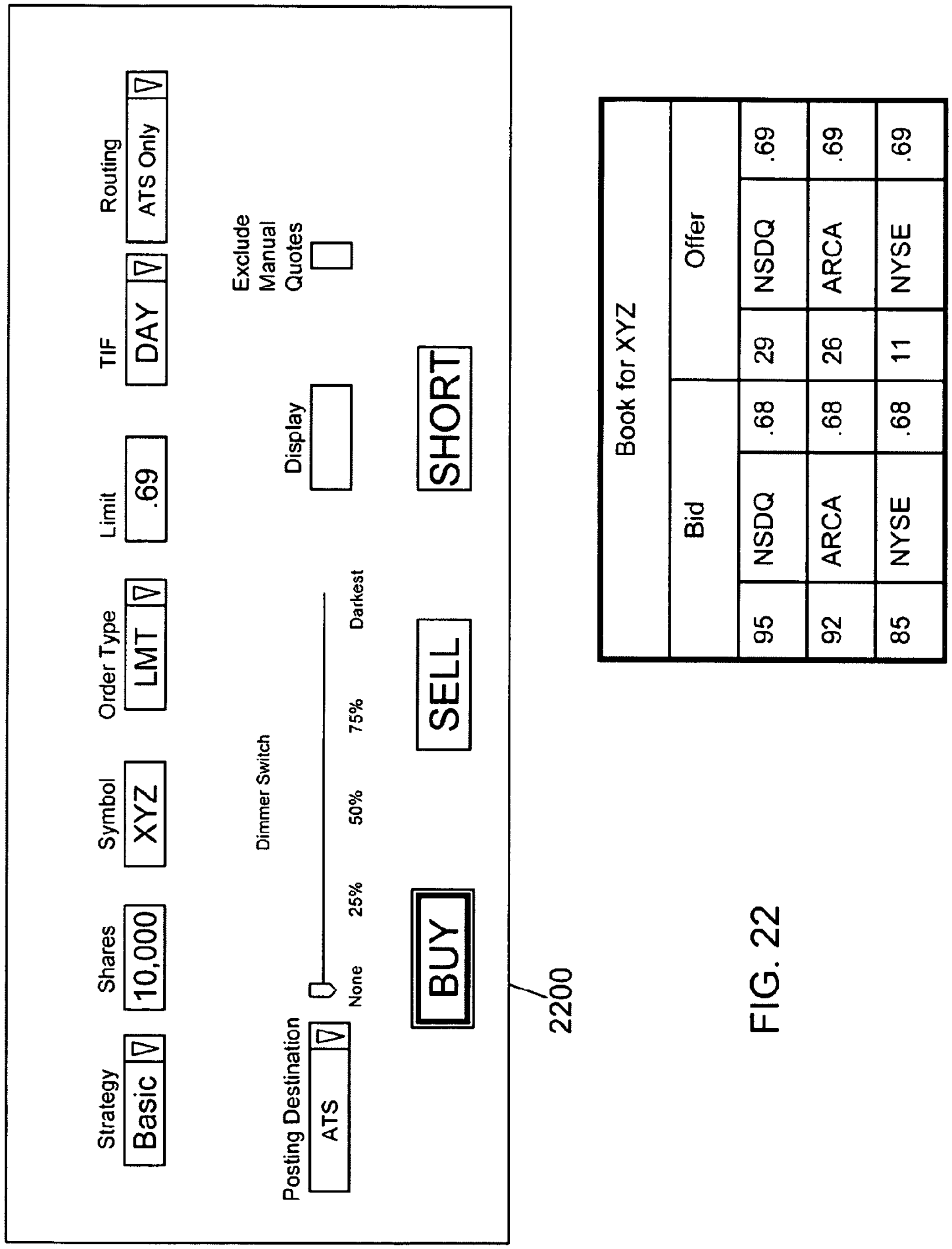

As another example, using a user interface 2200 illustrated in FIG. 22, a user may be able to enter an order to buy 10,000 shares of a security with a limit price of 0.69 and a TIF of DAY using ATS only routing and a display size of 500. In such a case, the order may be processed so that an order for the entire size (10,000) gets routed by order routing unit 126 (FIG. 1) to an alternative trading system (ATS) with a maximum price of 0.69. An ATS may be a matching engine, such as matching engine 128, that matches and executes resting and/or streaming orders as described above.

Figure 23:
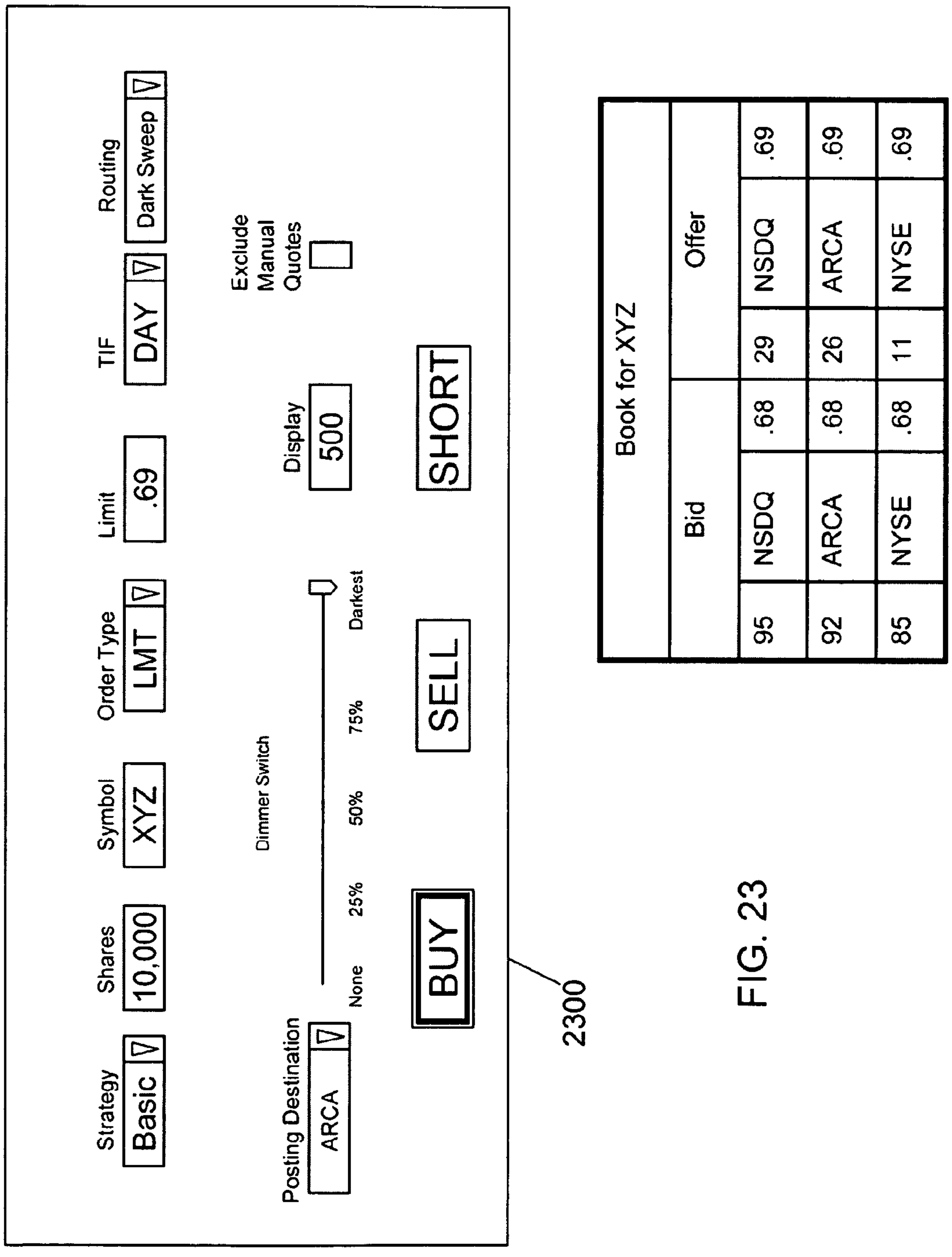

As another example, using a user interface 2300 illustrated in FIG. 23, a user may be able to enter an order to buy 10,000 shares of a security with a limit price of 0.69 and a TIF of DAY using dark sweep routing and no display size. In such a case, the order may be processed so that orders for the entire size (10,000) get nearly simultaneously routed by order routing unit 126 (FIG. 1) to one or more ATSs and/or ELPs (e.g., such as one or more dark pools) and none to the open markets because of the "Dark Sweep" routing setting. For example, 50% of the size of the user's order may be sent to an ATS and 50% of the size of the user's order may be sent to an ELP. If the orders with the ATS and ELP become no longer marketable, an order for the remaining size may be posted to any suitable market (such as ARCA as illustrated) with a limit price of 0.69 and a display size of 500.

Figure 24:
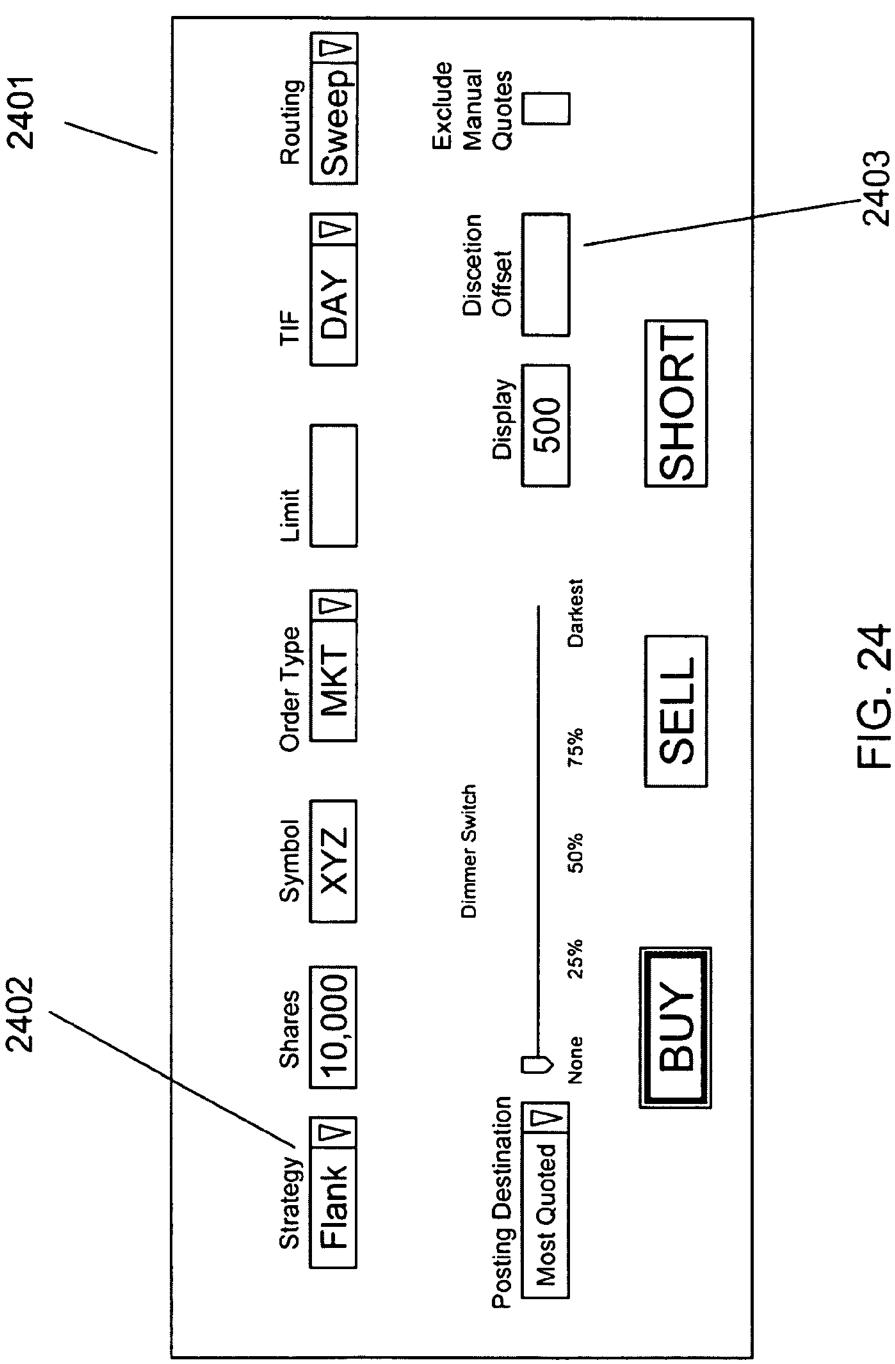
FIG. 24 is a diagram of a user interface for a flank strategy in accordance with some embodiments of the invention.

Turning to FIG. 24, another user interface 2401 in accordance with some embodiments is illustrated. As shown, in strategy menu 2402, a "Flank" option has been selected. This selection may result in a discretion offset field 2403 being presented. Discretion offset field 2403 may enable a user to specify an amount of discretion in pricing that may be applied to the user's limit price in order to facilitate executing a trade without showing that price.

Figure 25:
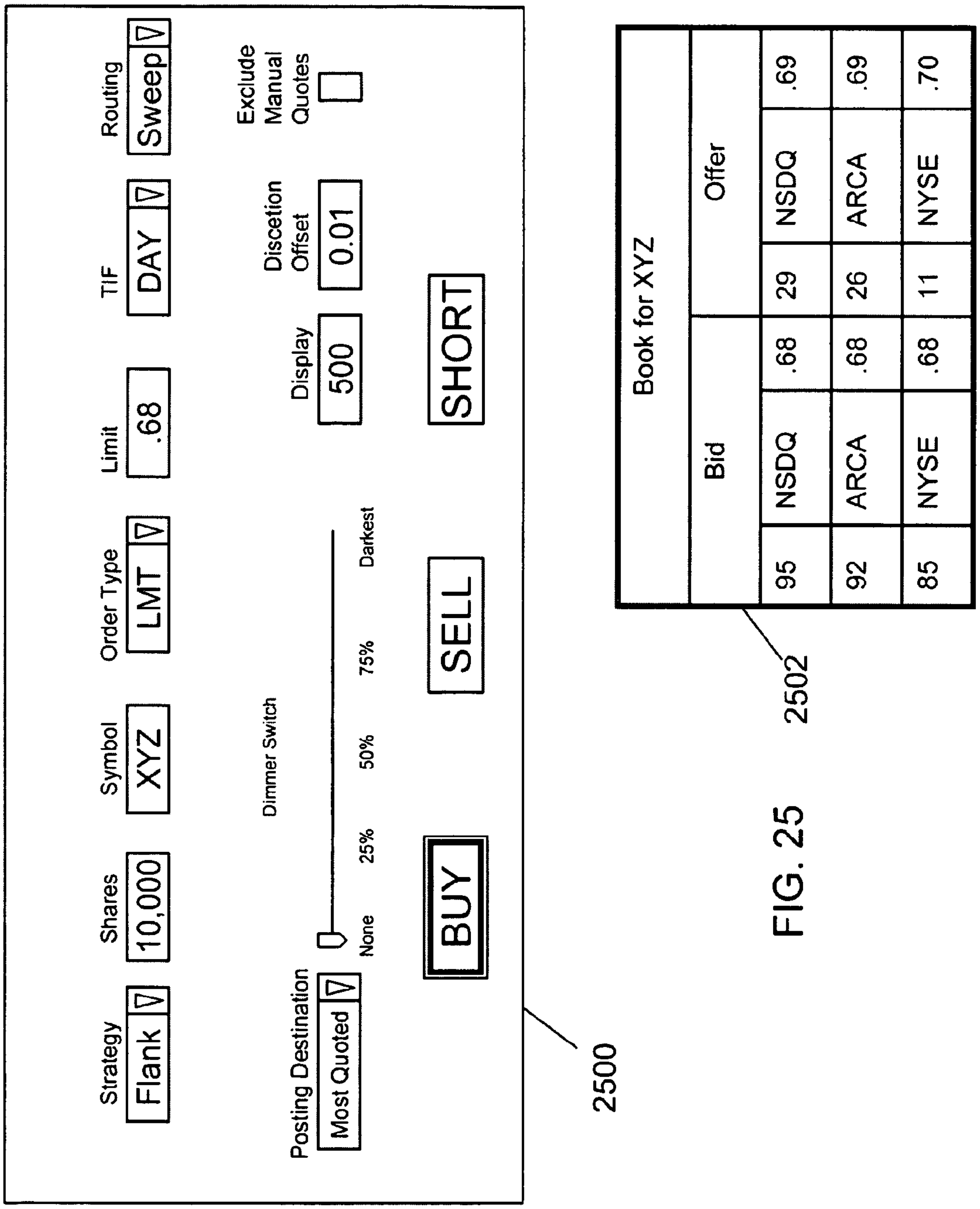
FIGS. 25-26 are diagrams of user interfaces in examples of uses of a flank strategy in accordance with some embodiments of the invention.

For example, using a user interface 2500 illustrated in FIG. 25, a user may be able to enter an order to buy 10,000 shares of a security with a limit price of 0.68 and a TIF of DAY using sweep routing, a display size of 500, and a discretion offset of 0.01. In such a case, the order may be processed so that orders for the entire unexecuted size (initially 10,000) get sequentially routed by order routing unit 126 (FIG. 1) to the best offers in the open markets with a maximum price of 0.69 based on the limit price and the discretion offset. For example, as shown in book 2502, a first oversized order of 10,000 shares with a limit price of 0.69 may be sent to the top market (in a book of markets for the security) (e.g., NSDQ) showing 2,900 shares with an offer price of 0.69. After an execution in that market for 5,000 shares, a second oversized order of 5,000 shares with a limit price of 0.69 may be sent to the next highest market (e.g., ARCA) in the book showing 2,600 shares with an offer price of 0.69. After an execution in that market for 2,600 shares, and when no other offers meet the 0.69 limit, a post to any suitable market (such as the most-quoted market as illustrated) may be made at a size of 2,400, a limit price of 0.69, a display size of 500, and a reserve size of 1,900. This post may remain in the suitable market until all size is executed, or until the end of the TIF.

Figure 26:
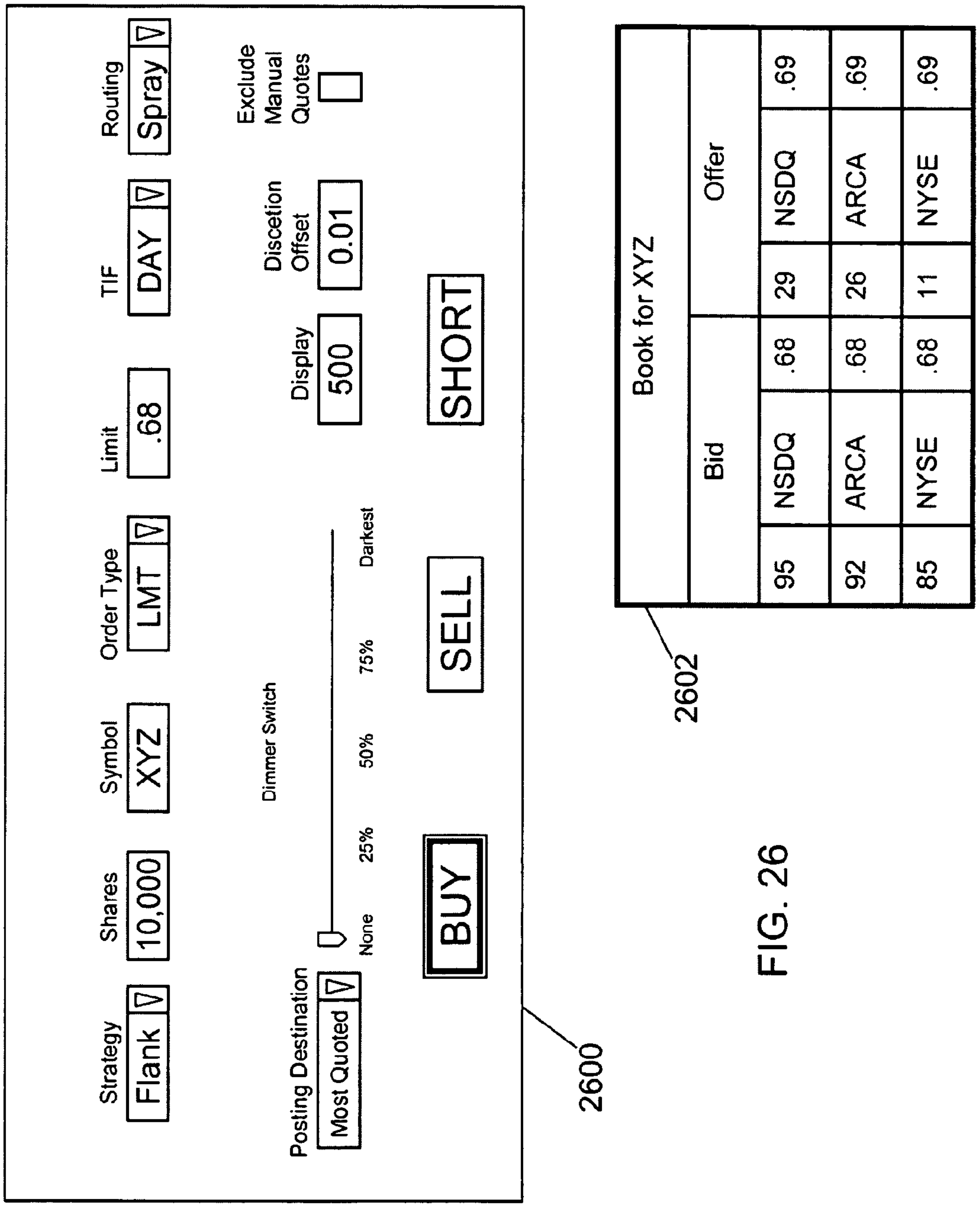

As another example, using a user interface 2600 illustrated in FIG. 26, a user may be able to enter an order to buy 10,000 shares of a security with a limit price of 0.68 and a TIF of DAY using spray routing, a display size of 500, and a discretion offset of 0.01. In such a case, the order may be processed so that orders for nearly equal sizes totaling the entire size (10,000) get nearly simultaneously routed by order routing unit 126 (FIG. 1) to the best offers in the open markets with a maximum price of 0.69 based on the limit price and the discretion offset. For example, as shown in book 2602, a first oversized order of 3,400 shares with a limit price of 0.69 may be sent to the top market (in a book of markets for the security) (e.g., NSDQ) showing 2,900 shares with an offer price of 0.69. At nearly the same time, a second oversized order of 3,300 shares with a limit price of 0.69 may be sent to the next highest market (e.g., ARCA) in the book showing 2,600 shares with an offer price of 0.69. Also at nearly the same time, a third oversized order of 3,300 shares with a limit price of 0.69 may be sent to the next highest market (e.g., NYSE) in the book showing 1,100 shares with an offer price of 0.69. After execution in these markets, and when no other offers meet the 0.69 limit with discretion price, a post to any suitable market (such as the most-quoted market as illustrated) may be made for any remaining size, a limit price of 0.68, and a display size of 500. This post may remain in the suitable market until all size is executed, or until the end of the TIF.

Figure 27:
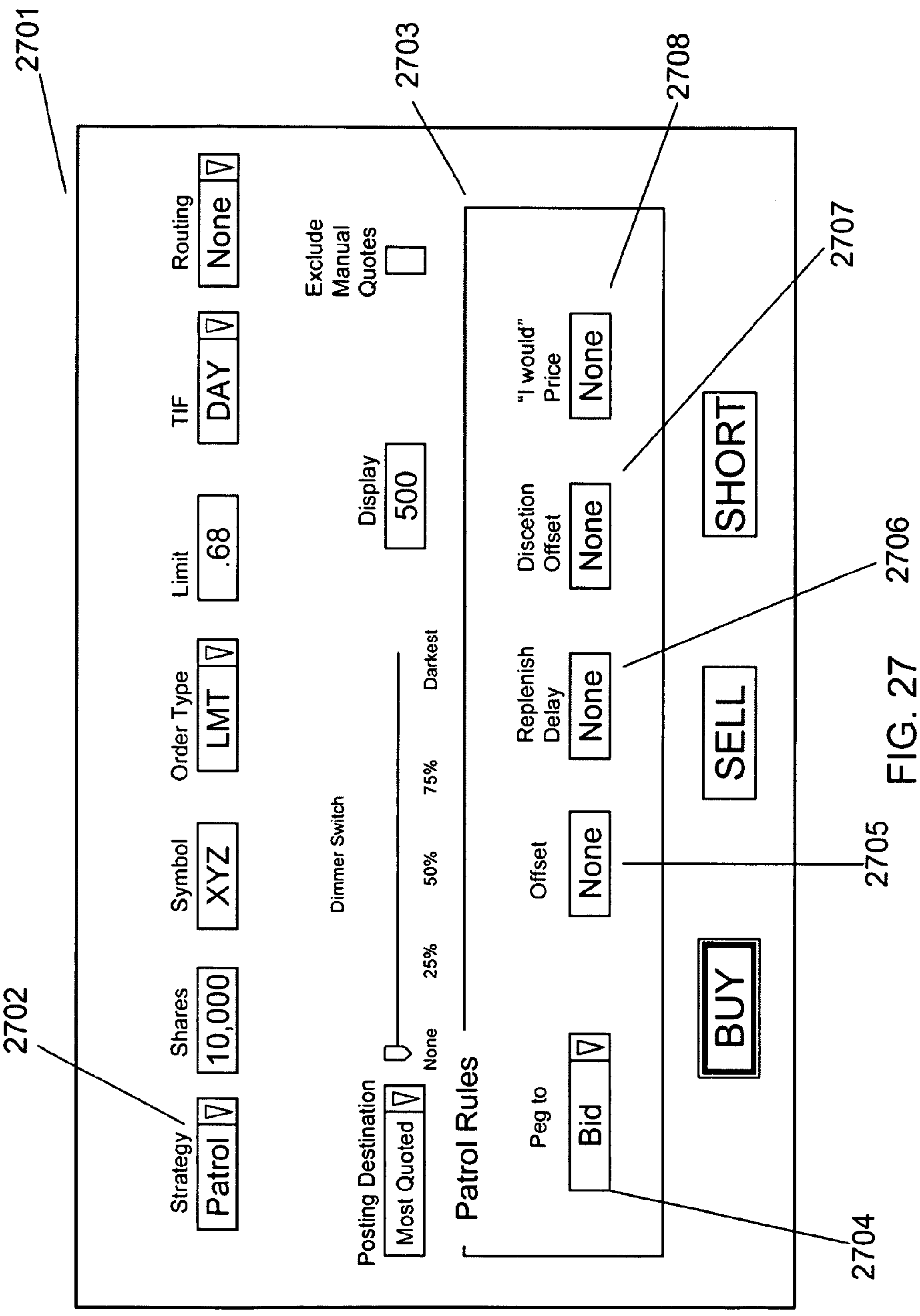
FIG. 27 is a diagram of a user interface for a patrol strategy in accordance with some embodiments of the invention.

Turning to FIG. 27, yet another user interface 2701 in accordance with some embodiments is illustrated. As shown, in strategy menu 2702, a "Patrol" option has been selected. This selection may result in patrol rules options 2703 being presented. As can be seen, these options may include a peg-to menu 2704, an offset field 2705, a replenish delay field 2706, a discretion offset field 2707, and an "I would" price field 2708. Peg-to menu 2704 may allow a user to select one or more relative or absolute prices to which an order will be pegged. For example, as shown, the user may select to peg prices for an order to the best bid price in the corresponding security. Offset field 2705 may enable a user to enter an offset to be applied to the peg-to price. For example, a user may elect to add an offset of 0.02 to the best bid price. Replenish delay field 2706 may enable a user to specify how many seconds of a delay should be applied before attempting to re-execute an order with a destination that previously executed part of the order. Discretion offset field 2707 may enable a user to specify an amount of discretion in pricing that may be applied to the user's order to facilitate executing a trade without showing that price. "I would" price field 2708 may enable a user to specify a price at which the user is willing to execute a trade, even if that price is worse than the price otherwise specified for the order.

Figure 28:
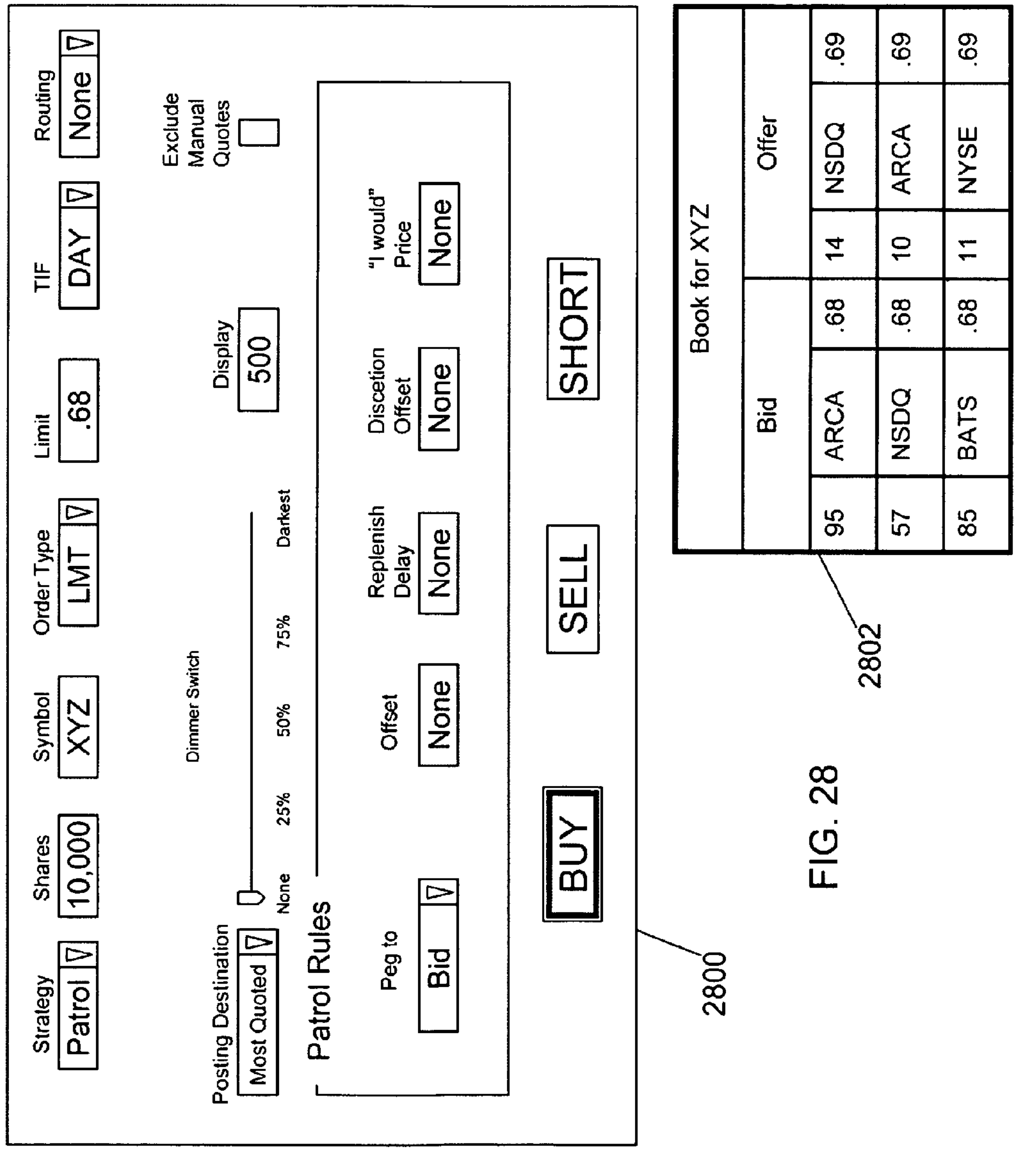

For example, using a user interface 2800 illustrated in FIG. 28, a user may be able to enter an order to buy 10,000 shares of a security with a limit price of 0.68, a peg to the bid, a TIF of DAY, and a display size of 500. Because the routing is set to "none," a post for the full size of 10,000 shares at the price of 0.68 based on the peg (based on a best bid price of 0.68 in book 2802) may initially be made to any suitable market (such as the most-quoted market, as illustrated).

Figure 29:
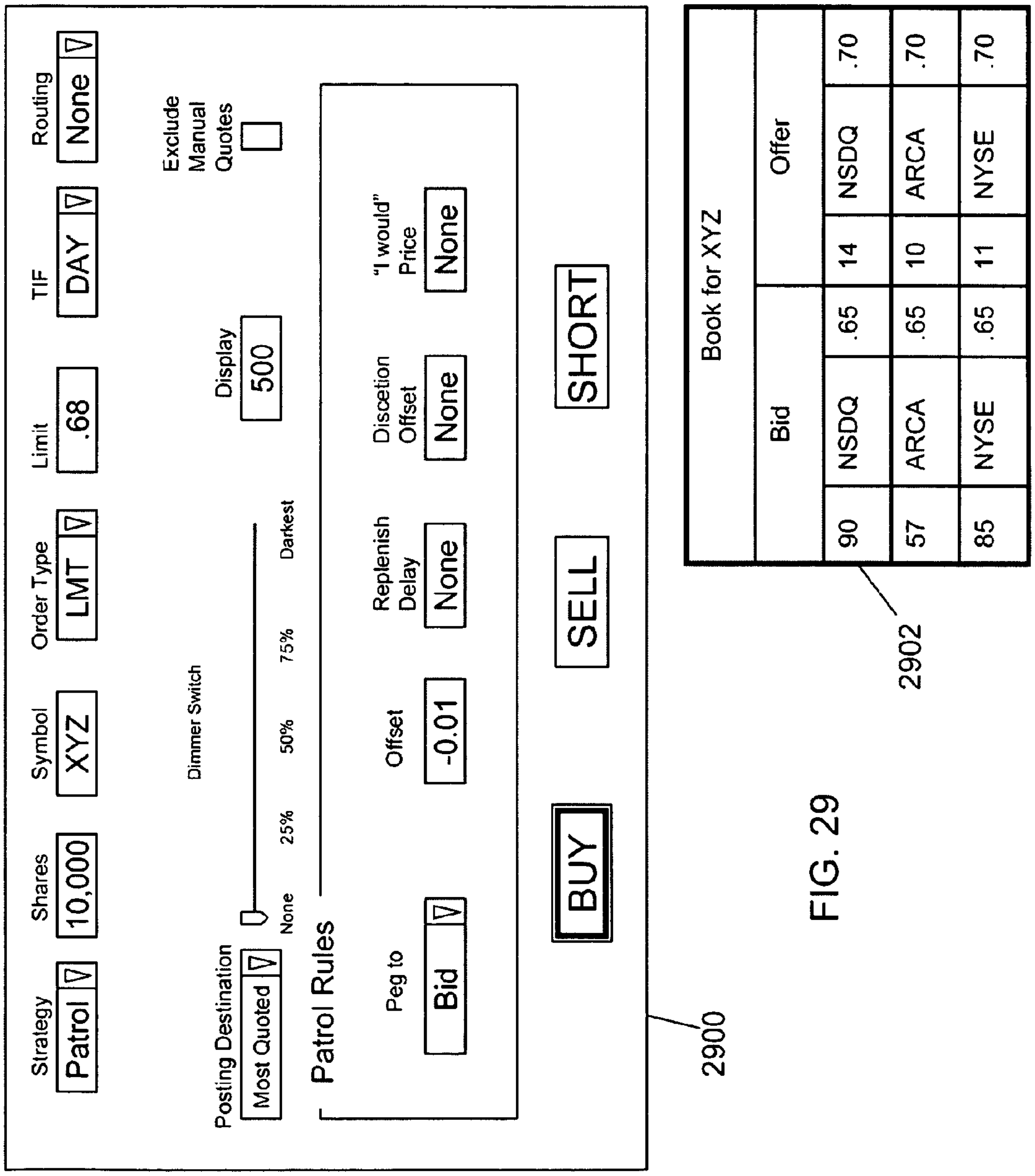

For example, using a user interface 2900 illustrated in FIG. 29, a user may be able to enter an order to buy 10,000 shares of a security with a limit price of 0.68, a peg to the bid, a peg offset of −0.01, a TIF of DAY, and a display size of 500. Because the routing is set to "none," a post for the full size of 10,000 shares at a price of 0.64 based on the peg (based on a best bid price of 0.65 in book 2902) plus the peg offset may initially be made to any suitable market (such as the most-quoted market, as illustrated).

For example, using a user interface 3000 illustrated in FIG. 30, a user may be able to enter an order to buy 10,000 shares of a security with a limit price of 0.68, a peg to the bid, a peg offset of 0.01, a TIF of DAY, and a display size of 500. Because the routing is set to "none," a post to buy the full size of 10,000 shares at a price of 0.66 based on the peg (based on a best bid price of 0.65 as shown in book 3002) plus the peg offset may initially be made to any suitable market (such as the most-quoted market, as illustrated). If the best bid price (other than the posted order) changes, the posted order's price may reset to the current peg price plus peg offset upon the post replenishing (e.g., after 5 seconds as illustrated).

Figure 31:
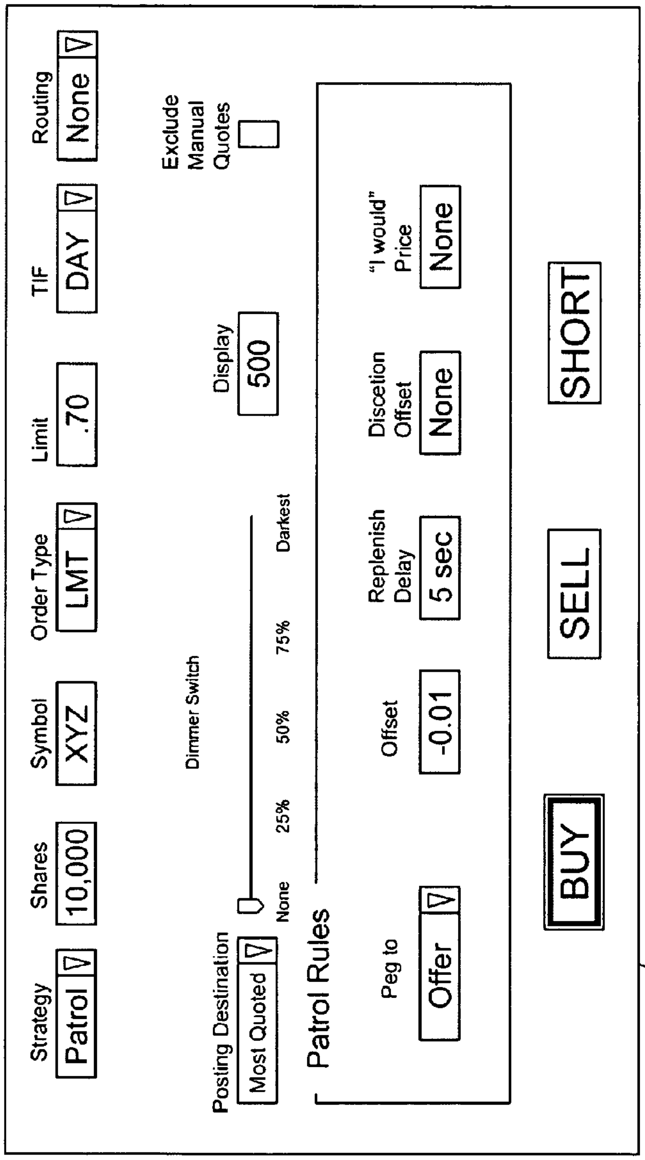

For example, using a user interface 3100 illustrated in FIG. 31, a user may be able to enter an order to buy 10,000 shares of a security with a limit price of 0.70, a peg to the offer, a peg offset of −0.01, a TIF of DAY, a display size of 500. Because the routing is set to "none," a post to buy the full size of 10,000 shares at a price of 0.69 based on the peg (based on a best offer price of 0.70 as shown in book 3102) plus the peg offset may initially be made to any suitable market (such as the most-quoted market, as illustrated). If the best offer price changes to match or be better than the peg plus peg offset, the posted order may execute against the new offer price, and the posted order's price may reset to the current peg price plus peg offset upon the post replenishing (e.g., after 5 seconds as illustrated).

Figure 32:
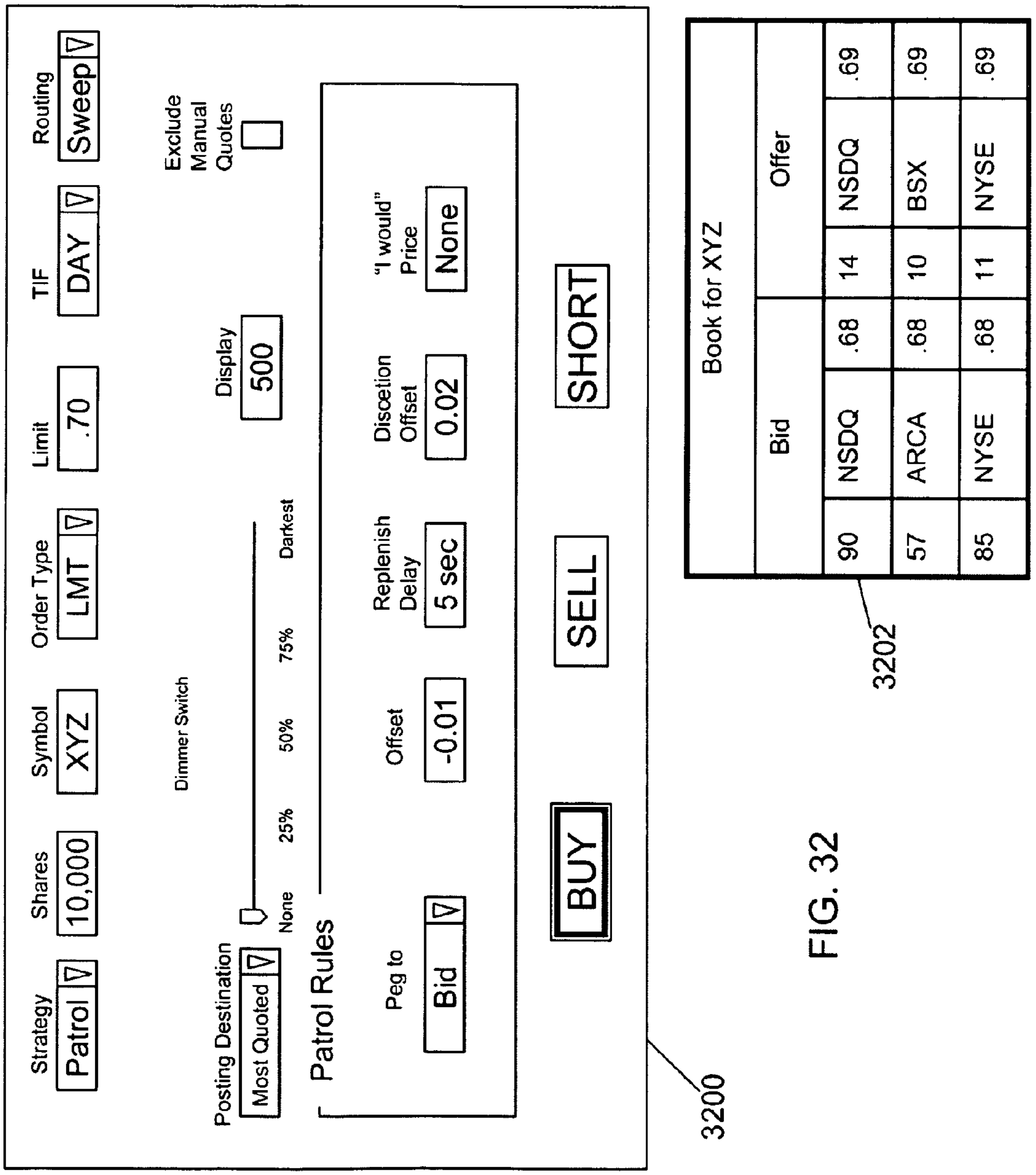

For example, using a user interface 3200 illustrated in FIG. 32, a user may be able to enter an order to buy 10,000 shares of a security with sweep routing, a limit price of 0.70, a peg to the bid, a peg offset of −0.01, a discretion offset of 0.02, a TIF of DAY, a display size of 500. In such a case, the order may be processed so that orders for the entire unexecuted size (initially 10,000) get sequentially routed to the best offers in the open markets with a maximum price of 0.69 based on the limit price and the discretion offset. For example, as shown in book 3202, a first oversized order of 10,000 shares with a limit price of 0.69 may be sent to the top market (in a book of markets for the security) (e.g., NSDQ) showing 1,400 shares with an offer price of 0.69. After an execution in that market for 3,000 shares, a second oversized order of 7,000 shares with a limit price of 0.69 may be sent to the next highest market (e.g., BSX) in the book showing 1,000 shares with an offer price of 0.69. After an execution in that market for 2,000 shares, a third oversized order of 5,000 shares with a limit price of 0.69 may be sent to the next highest market (e.g., NYSE) in the book showing 1,100 shares with an offer price of 0.69. After an execution in that market for 1,500 shares, and when no other quotes in the book meet the price requirement, a post to buy the full size of 500 shares at a price of 0.67 based on the peg (based on a best bid price of 0.68 in book 3202) plus the peg offset may be made to any suitable market (such as the most-quoted market, as illustrated). If the best bid price changes to match or be better than the peg plus peg offset, the posted order may execute against the new offer price, and the posted order's price may reset to the current peg price plus peg offset upon the post replenishing.

Figure 33:
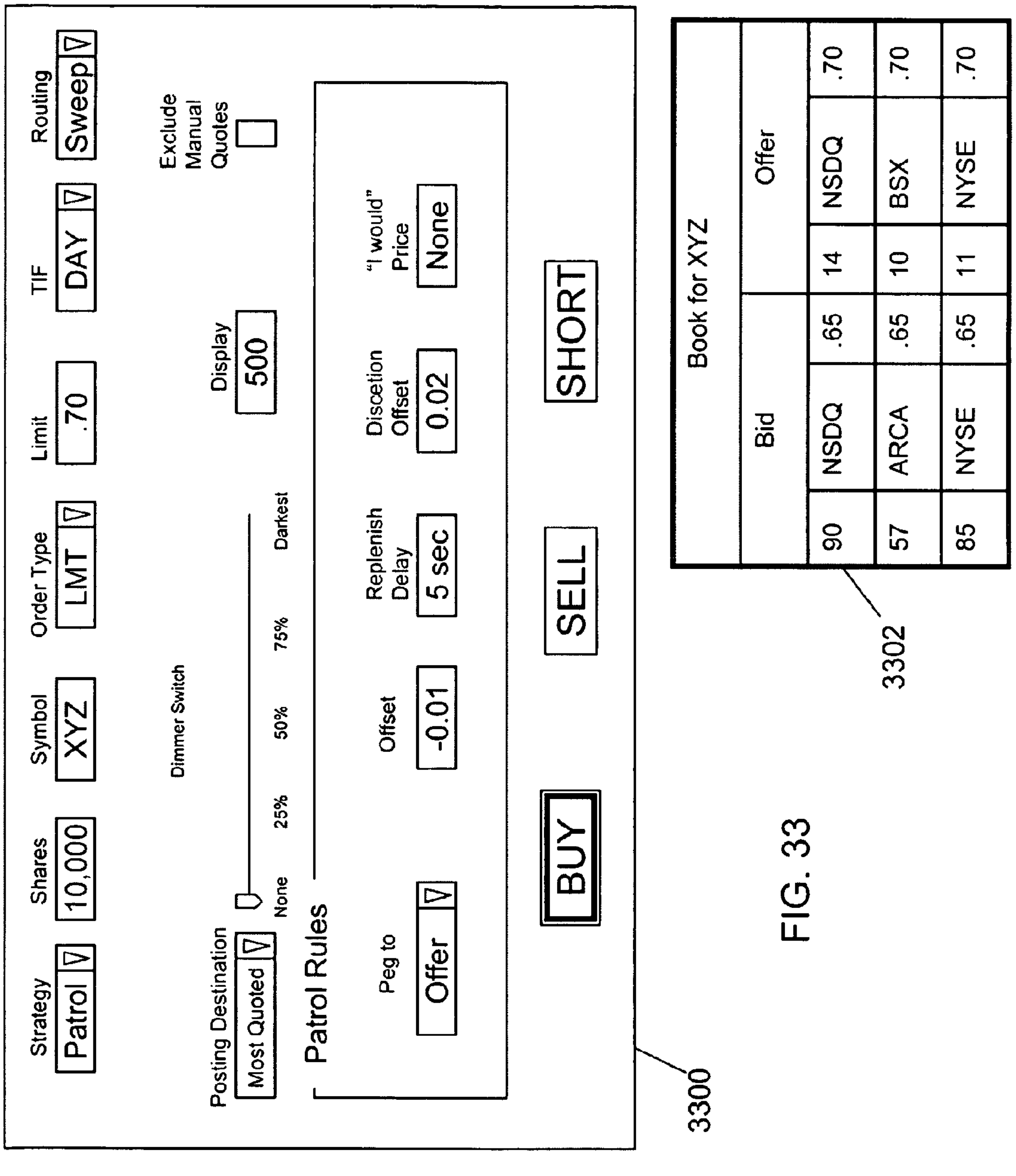

For example, using a user interface 3300 illustrated in FIG. 33, a user may be able to enter an order to buy 10,000 shares of a security with sweep routing, a limit price of 0.70, a peg to the offer, a peg offset of −0.01, a discretion offset of 0.02, a TIF of DAY, a display size of 500. In such a case, the order may be processed so that orders for the entire unexecuted size (initially 10,000) get sequentially routed to the best offers in the open markets with a maximum price of 0.70 based on the limit price plus the discretion price. For example, a first oversized order of 10,000 shares with a limit price of 0.70 may be sent to the top market (in a book of markets for the security) (e.g., NSDQ) showing 1,400 shares with an offer price of 0.70. After an execution in that market for 3,000 shares, a second oversized order of 7,000 shares with a limit price of 0.70 may be sent to the next highest market (e.g., BSX) in the book showing 1,000 shares with an offer price of 0.70. After an execution in that market for 2,000 shares, a third oversized order of 5,000 shares with a limit price of 0.70 may be sent to the next highest market (e.g., NYSE) in the book showing 1,100 shares with an offer price of 0.70. After an execution in that market for 1,500 shares, and when no other quotes in the book meet the price requirement, a post to buy the full size of 500 shares at a price of 0.70 based on the peg (based on a best offer price of 0.71 (not shown in book 3302)) plus the peg offset may be made to any suitable market (such as the most-quoted market, as illustrated). If the best bid price changes to match or be better than the peg plus peg offset, the posted order may execute against the new offer price, and the posted order's price may reset to the current peg price plus peg offset upon the post replenishing.

Figure 34:
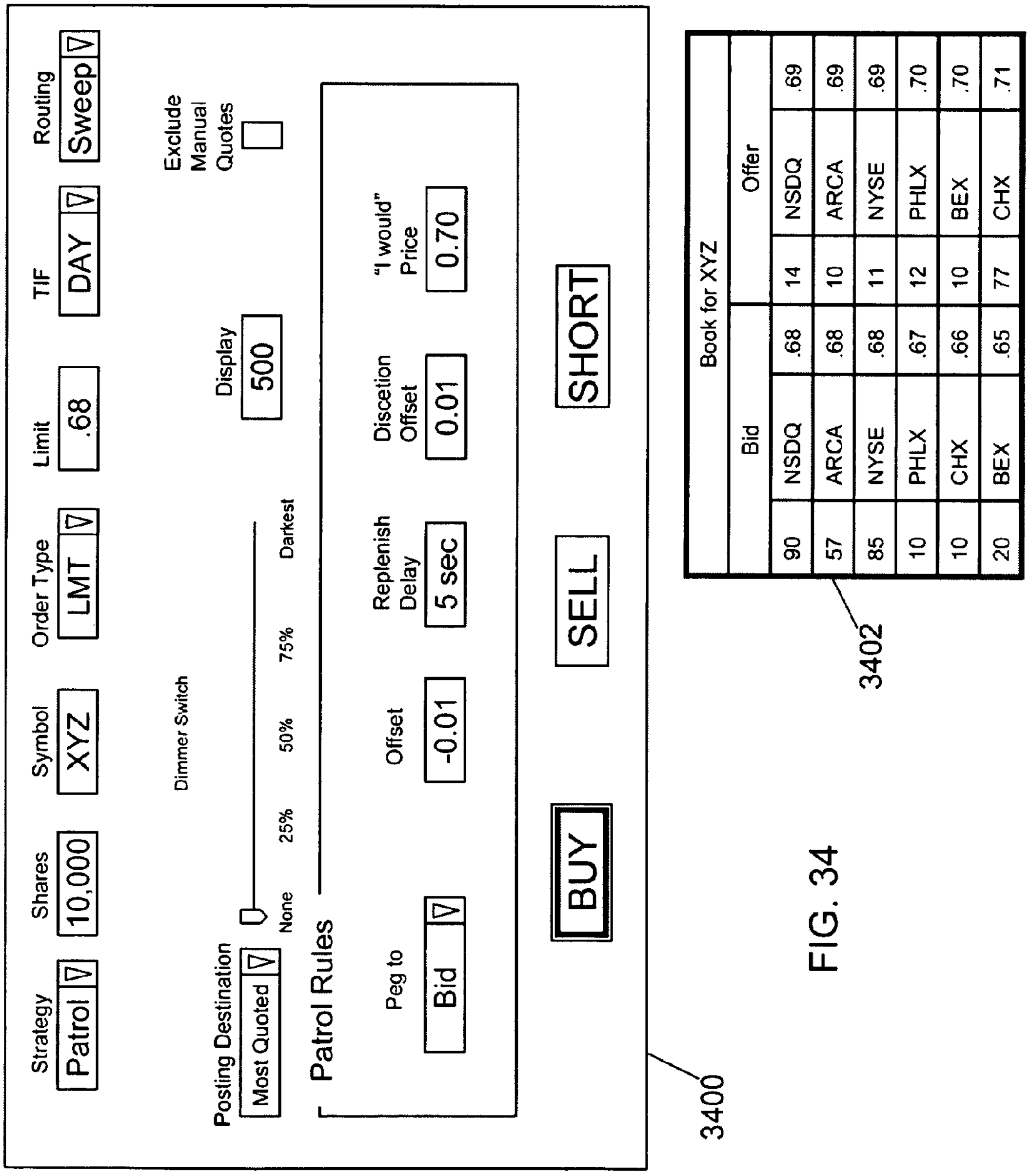

For example, using a user interface 3400 illustrated in FIG. 34, a user may be able to enter an order to buy 10,000 shares of a security with sweep routing, a limit price of 0.68, a peg to the bid, a peg offset of −0.01, a discretion offset of 0.01, a TIF of DAY, a display size of 500. In such a case, the order may be processed so that orders for the entire unexecuted size (initially 10,000) get sequentially routed to the best offers in the open markets with a maximum price of 0.69 based on the limit price plus discretion. For example, as shown in book 3402, a first oversized order of 10,000 shares with a limit price of 0.69 may be sent to the top market (in a book of markets for the security) (e.g., NSDQ) showing 1,400 shares with an offer price of 0.69. After an execution in that market for 3,000 shares, a second oversized order of 7,000 shares with a limit price of 0.69 may be sent to the next highest market (e.g., ARCA) in the book showing 1,000 shares with an offer price of 0.69. After an execution in that market for 2,000 shares, a third oversized order of 5,000 shares with a limit price of 0.69 may be sent to the next highest market (e.g., NYSE) in the book showing 1,100 shares with an offer price of 0.69. After an execution in that market for 1,500 shares, the order may be processed so that orders for the size displayed in each top market get sequentially routed to the best offers in the open markets with a maximum price of 0.70 based on the "I would" price. For example, a first order of 3,500 shares with a limit price of 0.70 may be sent to the top market (in a book of markets for the security) (e.g., PHLX) showing 1,200 shares with an offer price of 0.70. After an execution in that market for 1,200 shares, a second oversized order of 2,300 shares with a limit price of 0.70 may be sent to the next highest market (e.g., BEX) in the book showing 1,000 shares with an offer price of 0.70. After an execution in that market for 1,000 shares, and when no other quotes in the book meet the price requirements, a post to buy 500 shares at a price of 0.67 based on the peg (based on a best bid price of 0.68) plus the peg offset may be made to any suitable market (such as the most-quoted market, as illustrated). If the best bid price changes to match or be better than the peg plus peg offset, the posted order may execute against the new offer price, and the posted order's price may reset to the current peg price plus peg offset upon the post replenishing.

Figure 35:
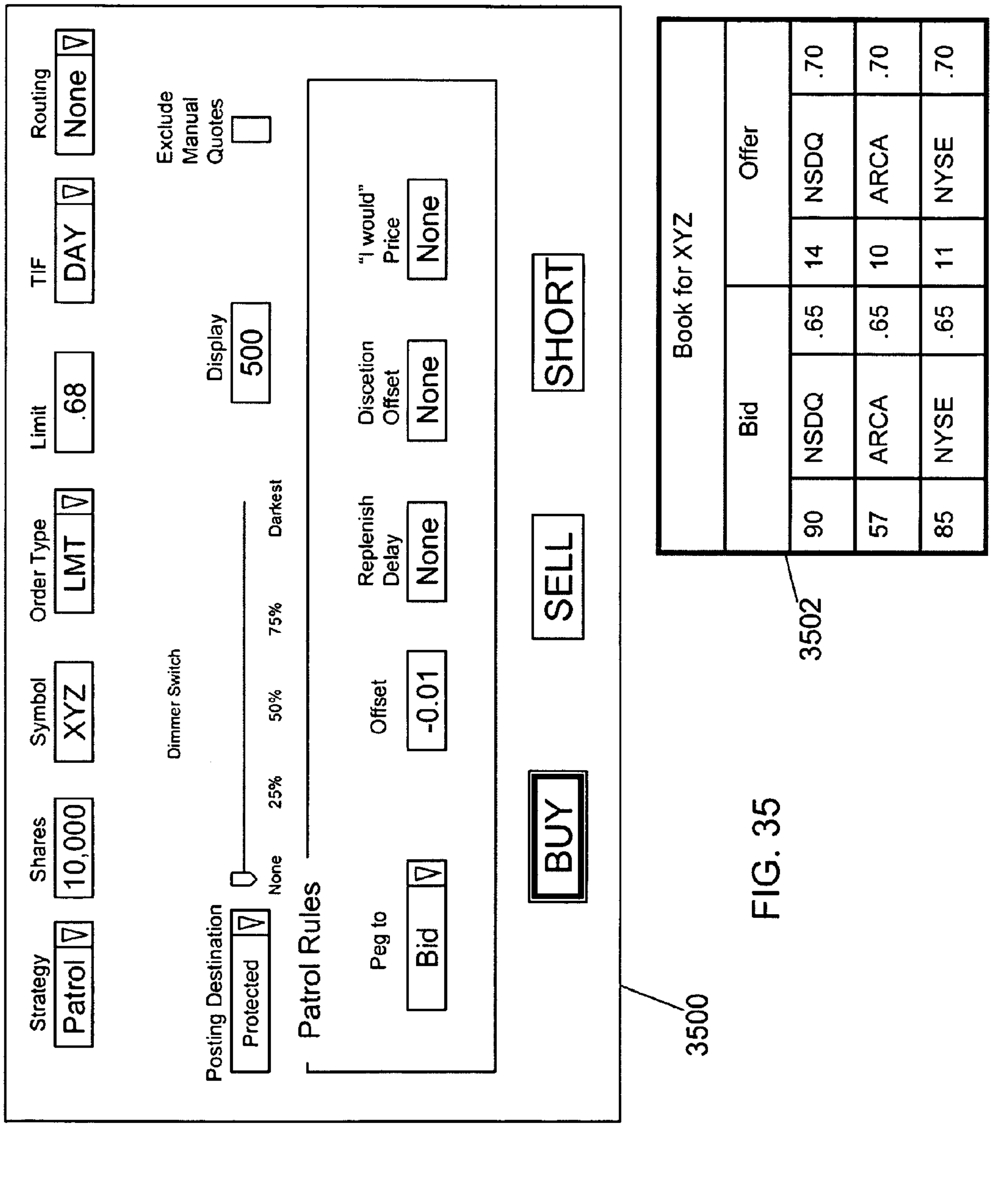

For example, using a user interface 3500 illustrated in FIG. 35, a user may be able to enter an order to buy 10,000 shares of a security with a limit price of 0.68, a peg to the bid, a peg offset of −0.01, a TIF of DAY, a display size of 500. Because the routing is set to "none," a post to buy the full size of 10,000 shares at a price of 0.64 based on the peg (based on a best bid price of 0.65 as shown in book 3502) plus the peg offset may initially be made to any suitable market (such as a protected market, as illustrated). For example, when selecting a protected market for the post, the market may be selected so that the post will be a protected quote. If a new bid arrives at the selected market that results in the quote no longer being protected, the quote may be moved to another protected market where the post will be a protected quote.

Figure 36:
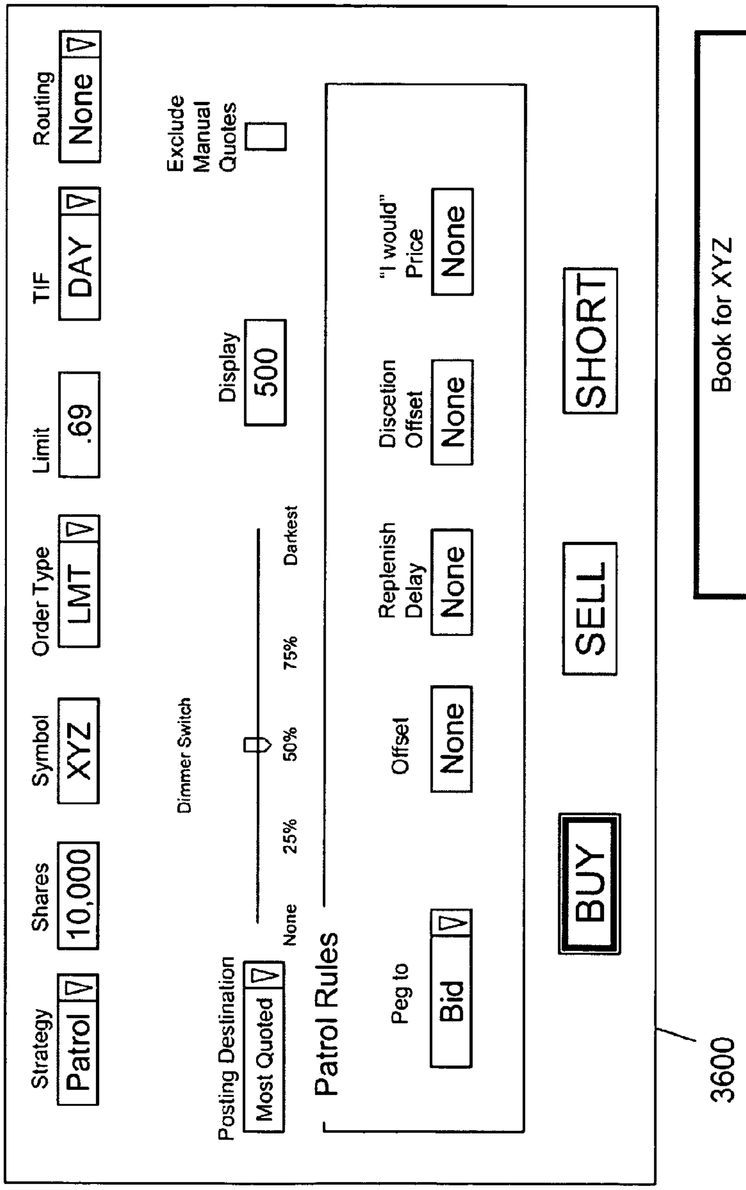

As another example, using a user interface 3600 illustrated in FIG. 36, a user may be able to enter an order to buy 10,000 shares of a security with a limit price of 0.69, a peg to the bid, and a TIF of DAY. Because the routing is set to "none" and the dimmer switch is set to "50%," orders for 50% (or any other suitable percentage) of the entire size (10,000) may be nearly simultaneously posted to any suitable market (such as the most-quoted market, as illustrated) and to one or more ATSs (e.g., such as one or more dark pools). For example, as shown in book 3602, 50% of the size of the user's order may be sent to the most-quoted market as a bid to buy 5,000 shares at a price of 0.68 (based on the peg to the best bid price of 0.68). At nearly the same time, an order for 50% of the size of the user's order may be sent to an ATS. The price for these quotes may also be pegged to the bid price of 0.68. If the best bid price in the open markets changes, the price of the quote posted in the most-quoted market and the price of the order to the ATS may be changed to reflect the new bid price. These prices may be prevented from exceeding the limit price, however.

Figure 37:
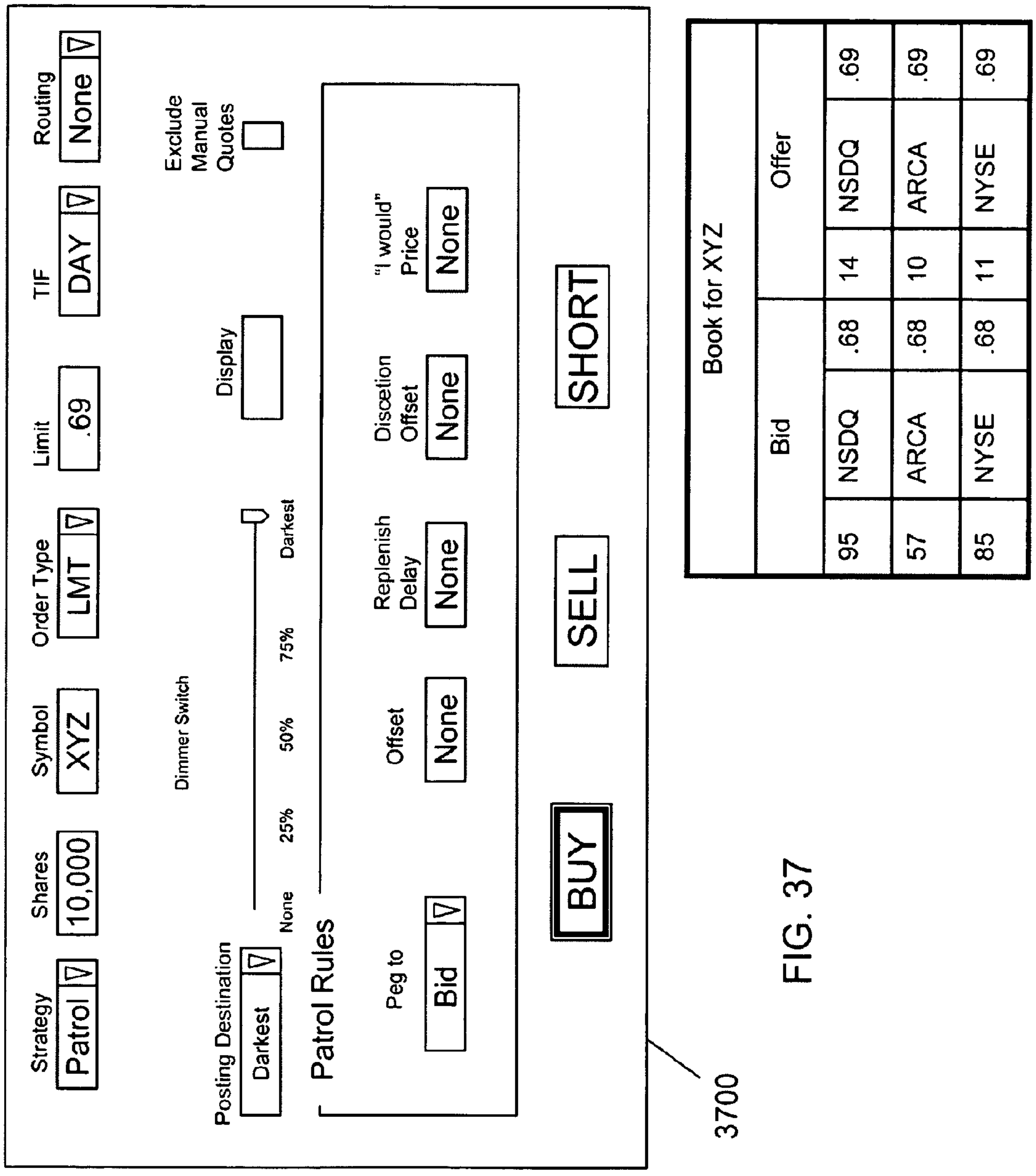

As another example, using a user interface 3700 illustrated in FIG. 37, a user may be able to enter an order to buy 10,000 shares of a security with a limit price of 0.69, a peg to the bid, and a TIF of DAY. Because the routing is set to "none," orders for the entire size (10,000) may be nearly simultaneously posted to one or more ATSs (e.g., such as one or more dark pools) and none to the open markets because of the "Darkest" post destination and "100%" (Darkest) dimmer switch settings. For example, 100% of the size of the user's order may be sent to an ATS. The price for this quote may be pegged to the bid price.

Figure 38:
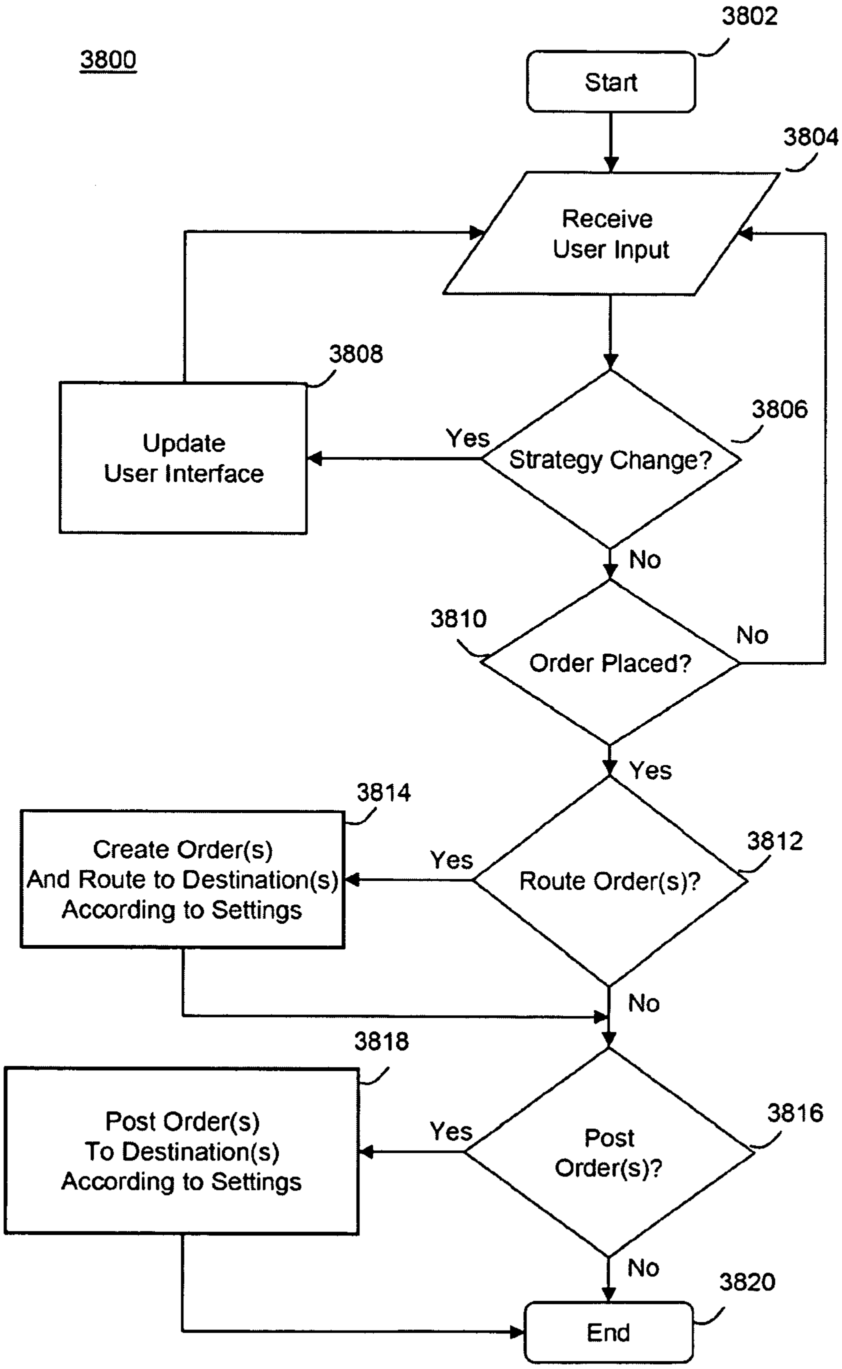
FIG. 38 is a flow diagram of a process for responding to user inputs from a user interface in accordance with some embodiments of the invention.

Examples of a process for 3800 for responding to inputs entered in the user interfaces of FIGS. 2-37 and 39-43 is shown in FIG. 38. As illustrated, after process 3800 begins at 3802, the process may receive user inputs at 3804. These user inputs may include any changes to the user interface select by the user selecting a new entry from a menu, entering data in a field, pressing a button, etc. At 3806, process 3800 may next determine whether the strategy has been changed. For example, a strategy may be changed from "basic" to "flank" as by changing the value in menu 202 of FIG. 2. If the strategy is determined to have been changed, then the user interface may be updated at 3808 and process 3800 may loop back to 3804 to receive new input. If the strategy has not been changed, process 3800 may then determine at 3810 whether an order has been placed by the user pressing buttons 213, 214, or 215 or FIG. 2. If an order has not been placed, then process 3800 may loop back to 3804. Otherwise, it may next be determined at 3812 whether order(s) are to be routed. Orders may be determined as to be routed if routing menu 208 (FIG. 2) does not have "none" selected. If order(s) are to be routed, process may then, at 3814, create and route order(s) to the appropriate destination(s) according to the settings in the user interface (for example, as describe in connection with FIGS. 2-37 and 39-43). After routing the order(s), or if no orders are to be routed, process 3800 may next determine at 3816 if any order(s) are to be posted at 3816. Order(s) may be to be posted if there is any size remaining after orders have been routed, or if no routing was specified. If orders are to be posted, the process may, at 3818, post order(s) at destination (s) according to the user settings. After posting order(s), or if no orders are to be posted, process 3800 may complete at 3820.

Figure 39:
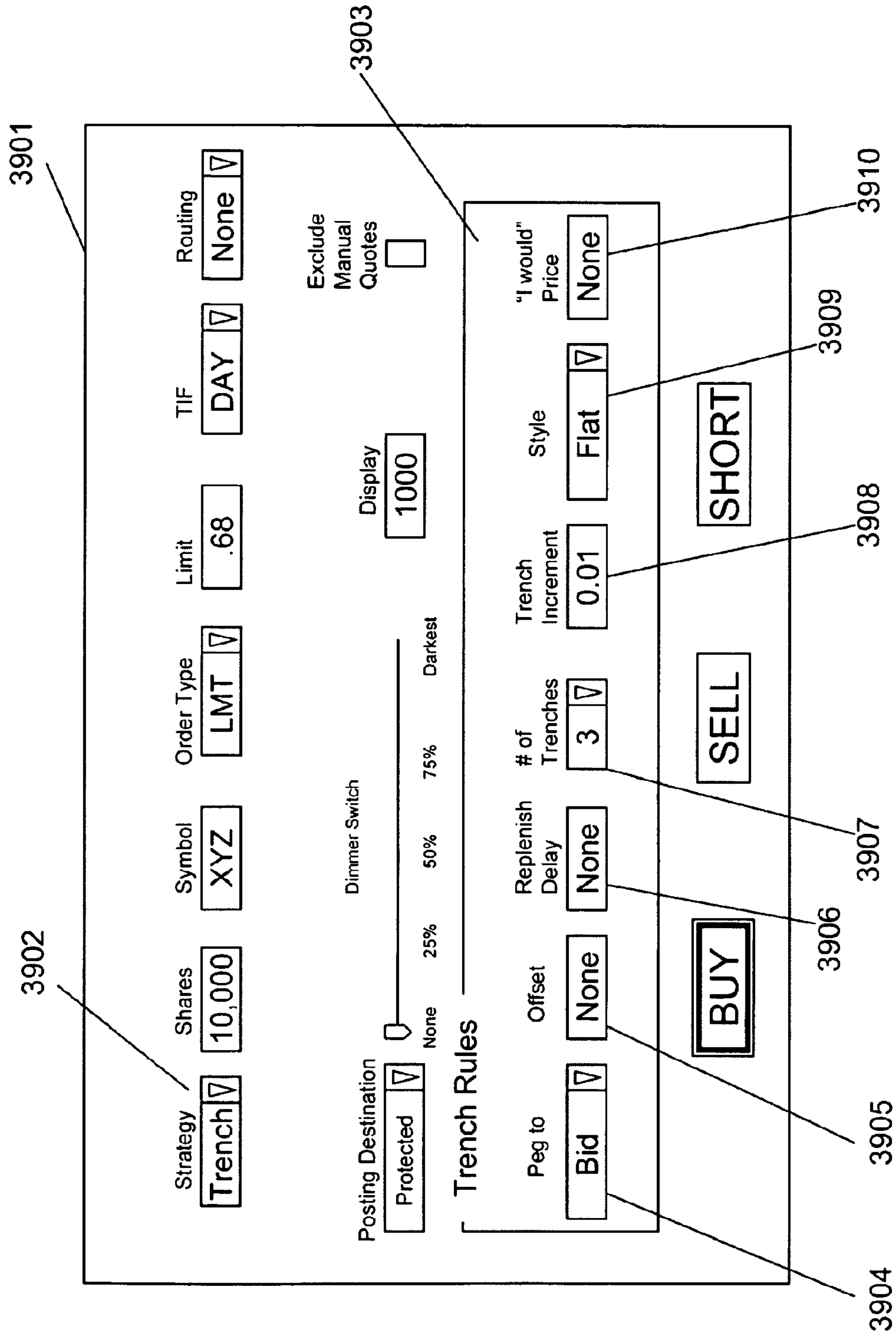
FIG. 39 is a diagram of a user interface for a trench strategy in accordance with some embodiments of the invention.

Turning to FIG. 39, still another user interface 3901 in accordance with some embodiments is illustrated. As shown, in strategy menu 3902, a "Trench" option has been selected. A trench strategy may give the user the ability to execute trades at different price points in the hope of achieving price improvement. This selection may result in trench rules options 3903 being presented. As can be seen, these options may include a peg-to menu 3904, an offset field 3905, a replenish delay field 3906, a number-of-trenches menu 3907, a trench increment field 3908, a style menu 3909, and an "I would" price field 3910. Peg to menu 3904, offset field 3905, replenish delay field 3906, and "I would" price field 3910 may be similar to the menu and fields shown and described in connection with FIG. 27. Number of trenches menu 3907 may enable a user to specify the number of "trenches" that will represent a price and size combination for the purchase or sale of a security. Trench increment field 3908 may enable a user to specify the increment between trenches. Style menu 3909 may enable a user to specify the style of trenches to be used. For example, the trench style may be weighted, flat, or any other suitable style. As a more particular example, a weighted style may weight the number of shares in trenches with better prices weighted more heavily. As another more particular example, a flat style may size the number of shares in all trenches equally.

For example, using a user interface 4000 illustrated in FIG. 40, a user may be able to enter an order to buy 10,000 shares of a security with a limit price of 0.68, a peg to the bid, three trenches, a trench offset of 0.01 in a flat style, and a TIF of DAY. Initially, the sizes and prices of the three trenches may be calculated. For example, because the style of the trenches is "flat," the sizes of the three trenches may be nearly equal or equal. The first trench may be priced at the best bid price based on the peg to bid. Each other trench may be cumulatively improved in price by the trench offset. As a more particular example, a first trench may have a size of 3,400 shares and a price of 0.68 (the best bid price due to the peg as shown in book 4002). The second trench may have a size of 3,300 shares and a price of 0.67 (the previous trench price improved by the trench increment). The third trench may have a size of 3,300 shares and a price of 0.66 (the previous trench price improved by the trench increment). A quote for each trench may then be posted in any suitable market (such as protected markets as illustrated). For example, a protected market may be selected where a quote will be protected, and a new protected market may be selected for the quote when the quote becomes no longer protected. The combined size (1,000 displayed plus 2,400 reserve for the first trench, for example) indicated in a quote may be the full size of the trench when the replenish delay is set to none as illustrated.

As another example, using a user interface 4100 illustrated in FIG. 41, a user may be able to enter an order to buy 10,000 shares of a security with a limit price of 0.68, a peg to the bid, three trenches, a trench offset of 0.01 in a flat style, and a TIF of DAY. Initially, the sizes and prices of the three trenches may be calculated. For example, because the style of the trenches is "flat," the sizes of the three trenches may be nearly equal or equal. The first trench may be priced at the best bid price based on the peg to bid. Each other trench may be cumulatively improved in price by the trench offset. As a more particular example, a first trench may have a size of 3,400 shares and a price of 0.68 (the best bid price due to the peg as shown in book 4102). The second trench may have a size of 3,300 shares and a price of 0.67 (the previous trench price improved by the trench increment). The third trench may have a size of 3,300 shares and a price of 0.66 (the previous trench price improved by the trench increment). A quote for each trench may then be posted in any suitable market (such as protected markets as illustrated). For example, a protected market may be selected where a quote will be protected, and a new protected market may be selected for the quote when the quote becomes no longer protected. The size for each quote may be set to the display size (or the unexecuted size if less than the display size) because the replenish delay is not set to "none." Upon a replenishment of the quotes, the price for each trench may be recalculated and the size may be once again set to the display size, or the unexecuted size if less than the display size.

As another example, using a user interface 4200 illustrated in FIG. 42, a user may be able to enter an order to buy 10,000 shares of a security with a limit price of 0.68, a peg to the bid, a peg offset of −0.01, three trenches, a trench offset of 0.01 in a flat style, and a TIF of DAY. Initially, the sizes and prices of the three trenches may be calculated. For example, because the style of the trenches is "flat," the sizes of the three trenches may be nearly equal or equal. The first trench may be priced at the best bid price based on the peg to bid and the peg offset. Each other trench may be cumulatively improved in price by the trench offset. As a more particular example, a first trench may have a size of 3,400 shares and a price of 0.67 (the best bid price due to the peg (0.68, as shown in book 4202) and peg offset (−0.01)). The second trench may have a size of 3,300 shares and a price of 0.66 (the previous trench price improved by the trench increment). The third trench may have a size of 3,300 shares and a price of 0.65 (the previous trench price improved by the trench increment). A quote for each trench may then be posted in any suitable market (such as protected markets as illustrated). For example, a protected market may be selected where a quote will be protected and a new protected market may be selected for the quote when the quote becomes no longer protected. The size for each quote may be set to the display size (or the unexecuted size if less than the display size) because the replenish delay is not set to "none." Upon a replenishment of the quotes, the price for each trench may be recalculated and the size may be once again set to the display size, or the unexecuted size if less than the display size.

Figure 43:
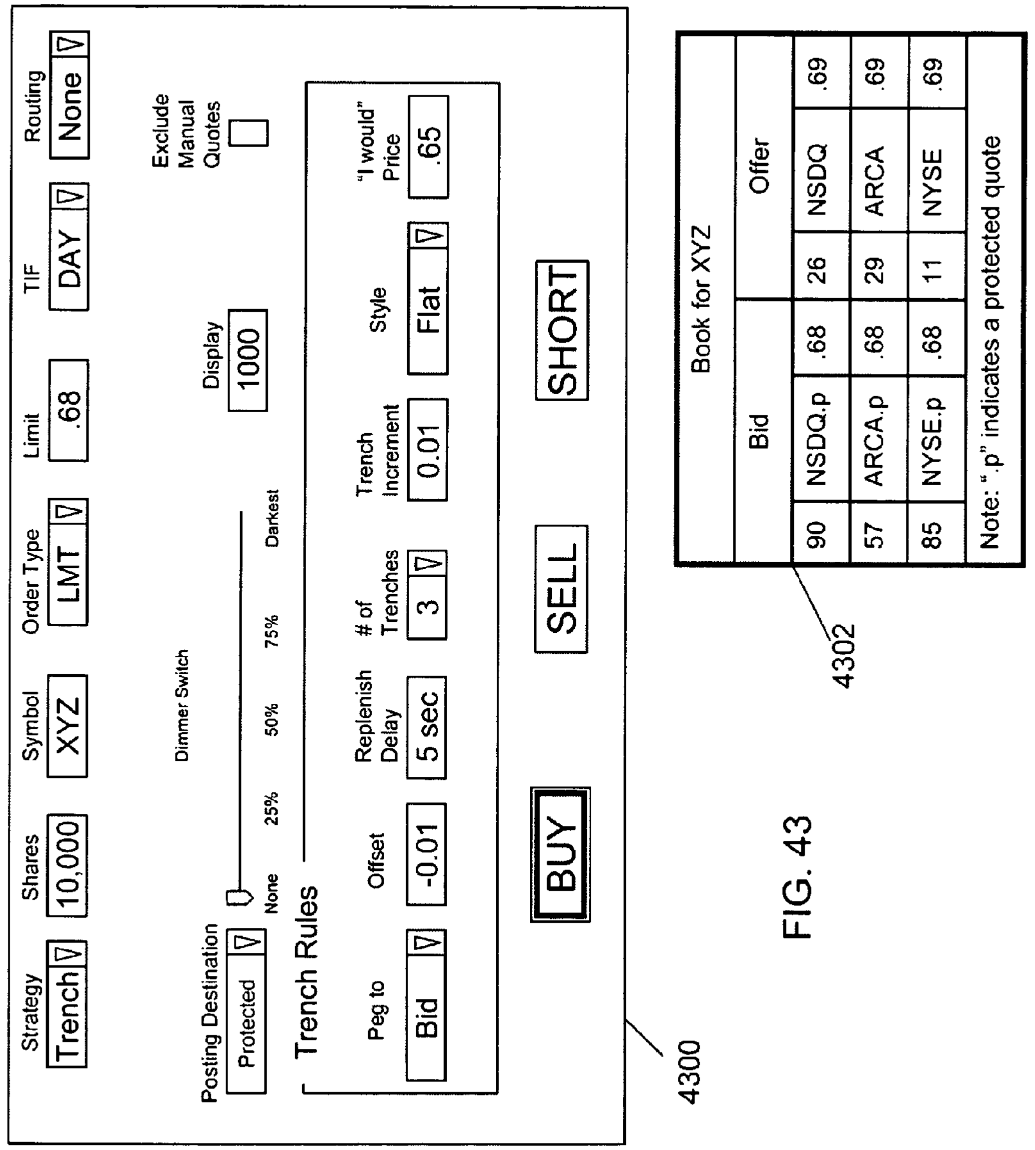

As another example, using a user interface 4300 illustrated in FIG. 43, a user may be able to enter an order to buy 10,000 shares of a security with a limit price of 0.68, a peg to the bid, a peg offset of −0.01, three trenches, a trench offset of 0.01 in a flat style, an "I would" price of 0.65, and a TIF of DAY. Initially, the sizes and prices of the three trenches may be calculated. For example, because the style of the trenches is "flat," the sizes of the three trenches may be nearly equal or equal. The first trench may be priced at the best bid price based on the peg to bid and the peg offset. Each other trench may be cumulatively improved in price by the trench offset. As a more particular example, a first trench may have a size of 3,400 shares and a price of 0.67 (the best bid price due to the peg (0.68, as shown in book 4302) and peg offset (−0.01)). The second trench may have a size of 3,300 shares and a price of 0.66 (the previous trench price improved by the trench increment). The third trench may have a size of 3,300 shares and a price of 0.65 (the previous trench price improved by the trench increment). A quote for each trench may then be posted in any suitable market (such as protected markets as illustrated). For example, a protected market may be selected where a quote will be protected and a new protected market may be selected for the quote when the quote becomes no longer protected. The size for each quote may be set to the display size (or the unexecuted size if less than the display size) because the replenish delay is not set to "none." Upon a replenishment of the quotes, the price for each trench may be recalculated and the size may be once again set to the display size, or the unexecuted size of less than the display size.

Figure 44:
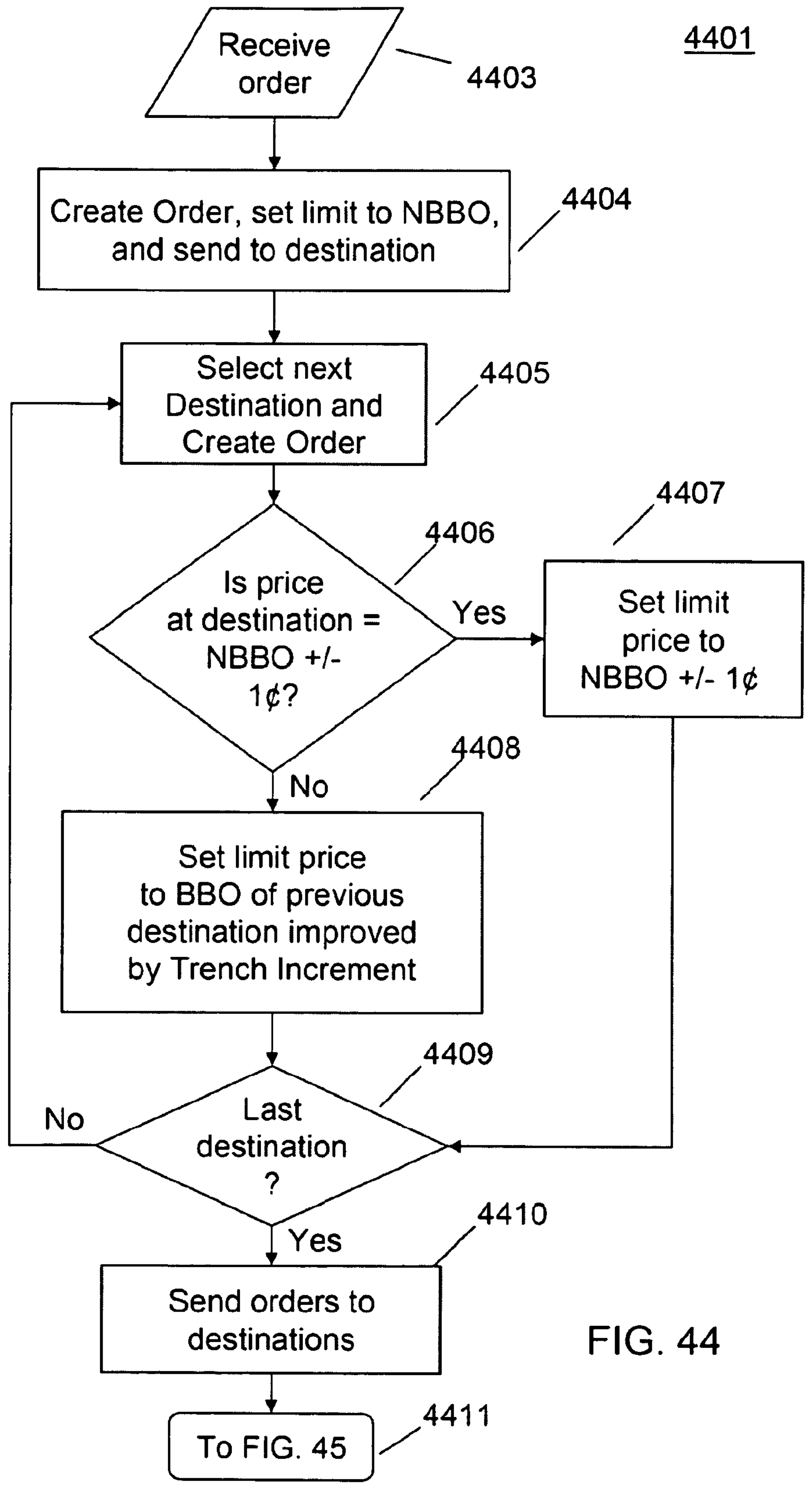
FIGS. 44-45 are flow diagrams of processes for performing trench posting in accordance with some embodiments of the invention.
Figure 45:
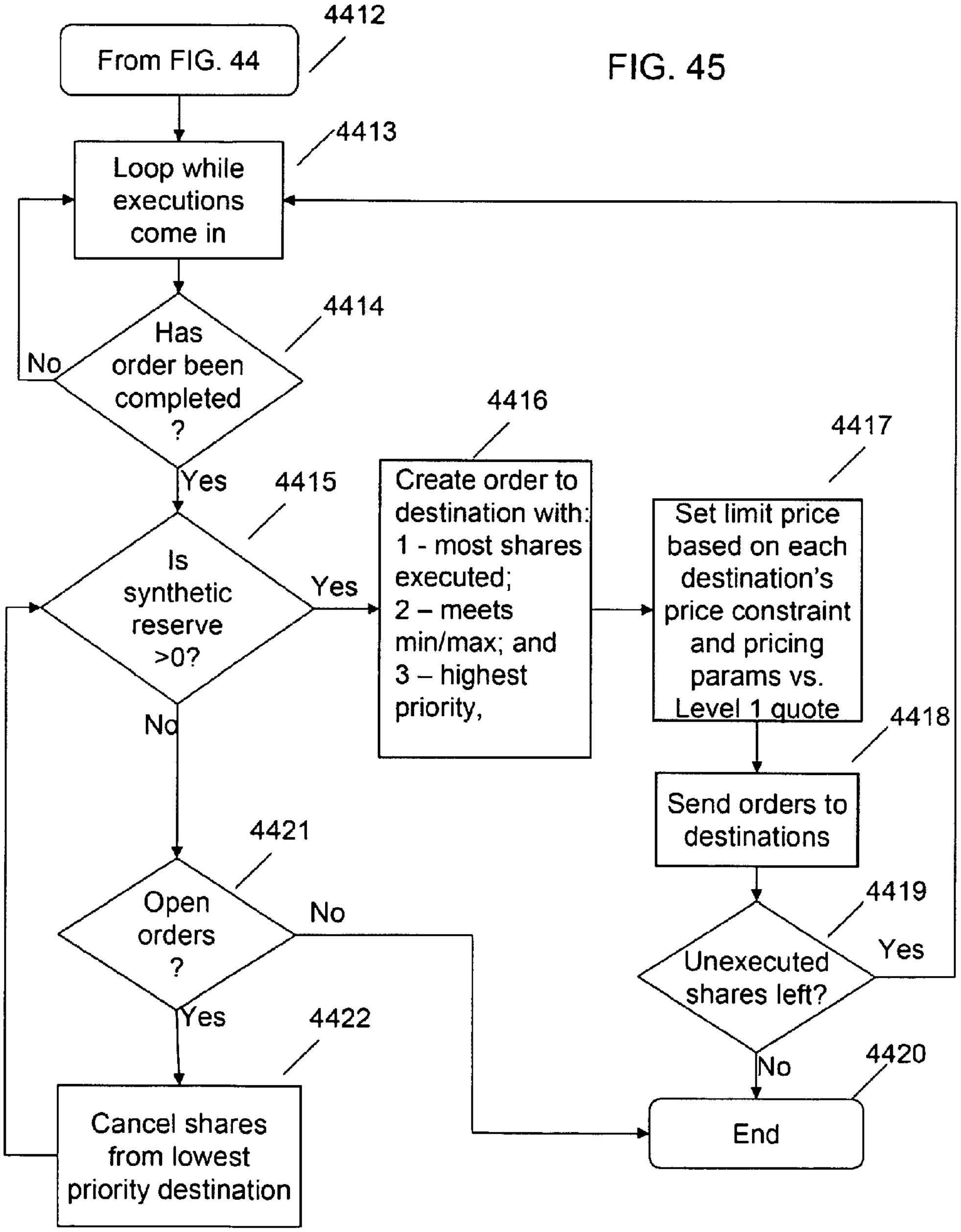

A particular example of a process for posting orders in 3818 of FIG. 38 under a trench strategy in accordance with some embodiments are illustrated in FIGS. 44 and 45 as processes 4401 and 4402. As shown, after a trench order is received at 4403, for a first trench, a destination order can be created and sent at 4404 to a destination selected in a posting destination menu. The price limit for the order can be set to the NBBO or any other suitable value. The size for the order can be set to an equal portion of the total number of shares divided by the number of trenches specified, to a price-weighted size, or to any other suitable size. Additionally, or alternatively, the size can be set equal to the displayed size available for the specified security at the destination, for example when the destination does not support reserve. A destination for each route can be selected according to any suitable criteria. For example, the destination can be set to be the market showing the best bid price in the given security, an ATS (such as a mechanism for matching a resting or streaming order to a resting or streaming order), or an ELP (such as a dark pool).

At 4405, the next destination for the next trench can be selected and a new order created. Next, at 4406, the price for the security at the destination can be compared to the NBBO to determine if there is a one cent difference. If there is, then, at 4407, the limit price for the order to that destination may be set to be the NBBO improved by one cent—that is, for buy orders, the limit price may be one cent below the NBBO, and for sell orders, the limit price may be one cent above the NBBO. Otherwise, at 4408, the limit price for the order to that destination may be set to be the best bid or offer of the previous destination improved by the trench increment. At 4409, it may then be determined whether the current destination is the last destination. If not, process 4401 may loop back to 4405. Otherwise, the process may send the orders to the destinations at 4410 and then proceed to process 4402 at 4411 of FIG. 45.

As shown in FIG. 45, after transitioning from process 4401 of FIG. 44 at 4412, process 4402 may loop at 4413 and 4414 until an order has completed. Once this occurs, process 4402 may determine if the synthetic reserve is greater than zero at 4415. The synthetic reserve may be greater than zero as a result of orders not being placed or not being executed. If the synthetic reserve is greater than zero, then one or more orders may be created for one or more new or existing destinations at 4416. The one or more destinations may be selected based on which has the most shares executed, which meets and minimum or maximum number of shares criteria or criterion, which has the highest priority, and/or any other suitable criteria or criterion. At 4417, the limit price for the new order(s) may be set based on each destination's price constraint and pricing parameters versus Level 1 quotes. Next, at 4418, the order(s) may be sent out to the destination(s). Any order(s) that are rejected or cannot reach the corresponding destination may be added back to the synthetic reserve. At 4419, it may be determined if there are any unexecuted shares left. If not, then process 4402 may end at 4420. Otherwise, process 4402 may loop back to 4413.

If, at 4415 it is determined that the synthetic reserve is not greater than zero, however, then, at 4421, it may be determined whether there are any open orders. If there are no open orders, then process 4402 may end at 4420. Otherwise, shares from the lowest priority destination may be cancelled at 4422. The lowest priority destination may be selected based upon the destination with the least amount of shares executed and/or any other suitable criteria or criterion. Process 4402 may then loop back to 4415.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for processing orders in an electronic trading system, comprising:

receiving, by a hardware processor, a user selection of a size of a security to be traded;

receiving, by a hardware processor, a user selection of a routing style specifying a manner in which a plurality of routing style orders, each to trade at least a portion of the size of the security, are to be executed;

receiving, by a hardware processor, a user selection of a post destination to which a posting order for at least a portion of the size of the security is to be posted after the plurality of routing style orders are routed according to the routing style;

routing, by a hardware processor, the plurality of routing style orders according to the routing style; and posting, by a hardware processor, the posting order at the posting destination selected by the user.

2. The method of claim 1, wherein the routing style causes the plurality of routing style orders to be sequentially sent to different markets.

3. The method of claim 1, wherein the routing style causes the plurality of routing style orders to be simultaneously at different markets.

4. The method of claim 1, wherein the routing style cause the plurality of routing style orders to be sequentially sent to different markets and sent to dark pools.

5. The method of claim 1, wherein the routing style causes the plurality of routing style orders to be simultaneously at different markets and sent to darks pools.

6. The method of claim 1, wherein the routing style causes the plurality of routing style orders to be routed only to dark pools.

7. The method of claim 1, wherein the routing style causes the plurality of routing style orders to be routed only to markets having manual quotes.

8. The method of claim 1, wherein the routing style causes the plurality of routing style orders to be routed only to one or more primary markets for the security.

9. The method of claim 1, wherein the routing style causes the plurality of routing style orders to be routed only to ECNs.

10. The method of claim 1, wherein the posting destination is an explicit destination.

11. The method of claim 10, wherein the posting destination is a specific open market.

12. The method of claim 1, wherein the posting destination is a synthetic destination.

13. The method of claim 12, wherein the posting destination is a destination that is most-quoted.

14. The method of claim 12, wherein the posting destination is a destination that is the last to post a quote in the security.

15. The method of claim 12, wherein the posting destination is a destination that is a primary market for the security.

16. The method of claim 12, wherein the posting destination is a destination that has protected quotes in the security.

17. The method of claim 12, wherein the posting destination is a destination showing orders at the National Best Bid and Offer (NBBO) in the security.

18. The method of claim 12, wherein the posting destination is a destination that is an alternative trading system.

19. The method of claim 12, wherein the posting destination is a dark pool.

20. The method of claim 12, further comprising:

receiving a user selection of a percentage at which at least a portion of the size of the security will be posted to dark pools; and posting the percentage of the size of the security at one or more dark pools.

21. A system for process orders, comprising:

at least one processor that:

receives a user selection of a size of a security to be traded;

receives a user selection of a routing style specifying a manner in which a plurality of routing style orders, each to trade at least a portion of the size of the security, are to be executed;

receives a user selection of a post destination to which a posting order for at least a portion of the size of the security is to be posted after the plurality of routing style orders are routed according to the routing style;

routes the plurality of routing style orders according to the routing style; and posts the posting order at the posting destination selected by the user.

22. The system of claim 21, wherein the routing style causes the plurality of routing style orders to be sequentially sent to different markets.

23. The system of claim 21, wherein the routing style causes the plurality of routing style orders to be simultaneously at different markets.

24. The system of claim 21, wherein the routing style cause the plurality of routing style orders to be sequentially sent to different markets and sent to dark pools.

25. The system of claim 21, wherein the routing style causes the plurality of routing style orders to be simultaneously at different markets and sent to darks pools.

26. The system of claim 21, wherein the routing style causes the plurality of routing style orders to be routed only to dark pools.

27. The system of claim 21, wherein the routing style causes the plurality of routing style orders to be routed only to markets having manual quotes.

28. The system of claim 21, wherein the routing style causes the plurality of routing style orders to be routed only to one or more primary markets for the security.

29. The system of claim 21, wherein the routing style causes the plurality of routing style orders to be routed only to ECNs.

30. The system of claim 21, wherein the posting destination is an explicit destination.

31. The system of claim 30, wherein the posting destination is a specific open market.

32. The system of claim 21, wherein the posting destination is a synthetic destination.

33. The system of claim 32, wherein the posting destination is a destination that is most-quoted.

34. The system of claim 32, wherein the posting destination is a destination that is the last to post a quote in the security.

35. The system of claim 32, wherein the posting destination is a destination that is a primary market for the security.

36. The system of claim 32, wherein the posting destination is a destination that has protected quotes in the security.

37. The system of claim 32, wherein the posting destination is a destination showing orders at the National Best Bid and Offer (NBBO) in the security.

38. The system of claim 32, wherein the posting destination is a destination that is an alternative trading system.

39. The system of claim 32, wherein the posting destination is a dark pool.

40. The system of claim 32, wherein the at least one processor also:

receives a user selection of a percentage at which at least a portion of the size of the security will be posted to dark pools; and posts the percentage of the size of the security at one or more dark pools.

* * * * *